US007761843B2

(12) United States Patent
Ortscheid

(10) Patent No.: US 7,761,843 B2
(45) Date of Patent: Jul. 20, 2010

(54) COMPUTER SOURCE CODE GENERATOR

(76) Inventor: Ronald Ortscheid, 6N 860 Foley La., St. Charles, IL (US) 60175

( * ) Notice: Subject to any disclaimer, the term of this patent is extended or adjusted under 35 U.S.C. 154(b) by 1418 days.

(21) Appl. No.: 11/173,081

(22) Filed: Jul. 1, 2005

(65) Prior Publication Data

US 2007/0005342 A1 Jan. 4, 2007

(51) Int. Cl.
*G06F 9/45* (2006.01)
(52) U.S. Cl. .................................................. 717/106
(58) Field of Classification Search .................. 717/106, 717/149
See application file for complete search history.

(56) References Cited

U.S. PATENT DOCUMENTS

| 5,175,684 | A | * | 12/1992 | Chong | 704/3 |
| 5,497,319 | A | * | 3/1996 | Chong et al. | 704/2 |
| 5,555,169 | A | | 9/1996 | Namba et al. | 364/419.08 |
| 5,742,836 | A | * | 4/1998 | Turpin et al. | 715/224 |
| 5,760,788 | A | * | 6/1998 | Chainini et al. | 345/474 |
| 6,104,872 | A | | 8/2000 | Kubota et al. | 395/701 |
| 6,263,375 | B1 | | 7/2001 | Ortega | 709/275 |
| 6,317,871 | B1 | | 11/2001 | Andrews et al. | 717/5 |
| 6,334,107 | B1 | | 12/2001 | Gale et al. | 705/10 |
| 6,690,392 | B1 | | 2/2004 | Wugoski | 345/744 |
| 7,272,821 | B2 | * | 9/2007 | Chittar et al. | 717/116 |
| 7,536,294 | B1 | * | 5/2009 | Stanz et al. | 704/3 |
| 2003/0033446 | A1 | * | 2/2003 | Noden | 709/328 |
| 2005/0034100 | A1 | * | 2/2005 | Liu | 717/105 |
| 2005/0081141 | A1 | * | 4/2005 | Jonsson | 715/503 |
| 2005/0102652 | A1 | * | 5/2005 | Sulm et al. | 717/115 |
| 2005/0125767 | A1 | * | 6/2005 | Hawley et al. | 717/100 |

* cited by examiner

*Primary Examiner*—John Chavis
(74) *Attorney, Agent, or Firm*—Marshall, Gerstein & Borun LLP

(57) ABSTRACT

A programming editor and creator allows users with minimal knowledge of a computer language syntax to generate computer source code using a structured rather than freeform process. A predefined command sentence is provided representing at least a portion of a programming command, and includes words, which may be defined as constant or enterable words. Enterable words may be required or optional, and correspond to entry components. Each word may be defined according to word types, including list words, variable list words, variable words, mathematical words, condition words or Boolean words. Enterable words may include repeatable words which may be inserted multiple times within a command to create conditional statements, mathematical equations and string concatenations. Input values are provided for the entry components. The predefined command sentence with the input values is converted to a completed command sentence corresponding to the programming command, which is translated to a target programming language.

65 Claims, 64 Drawing Sheets

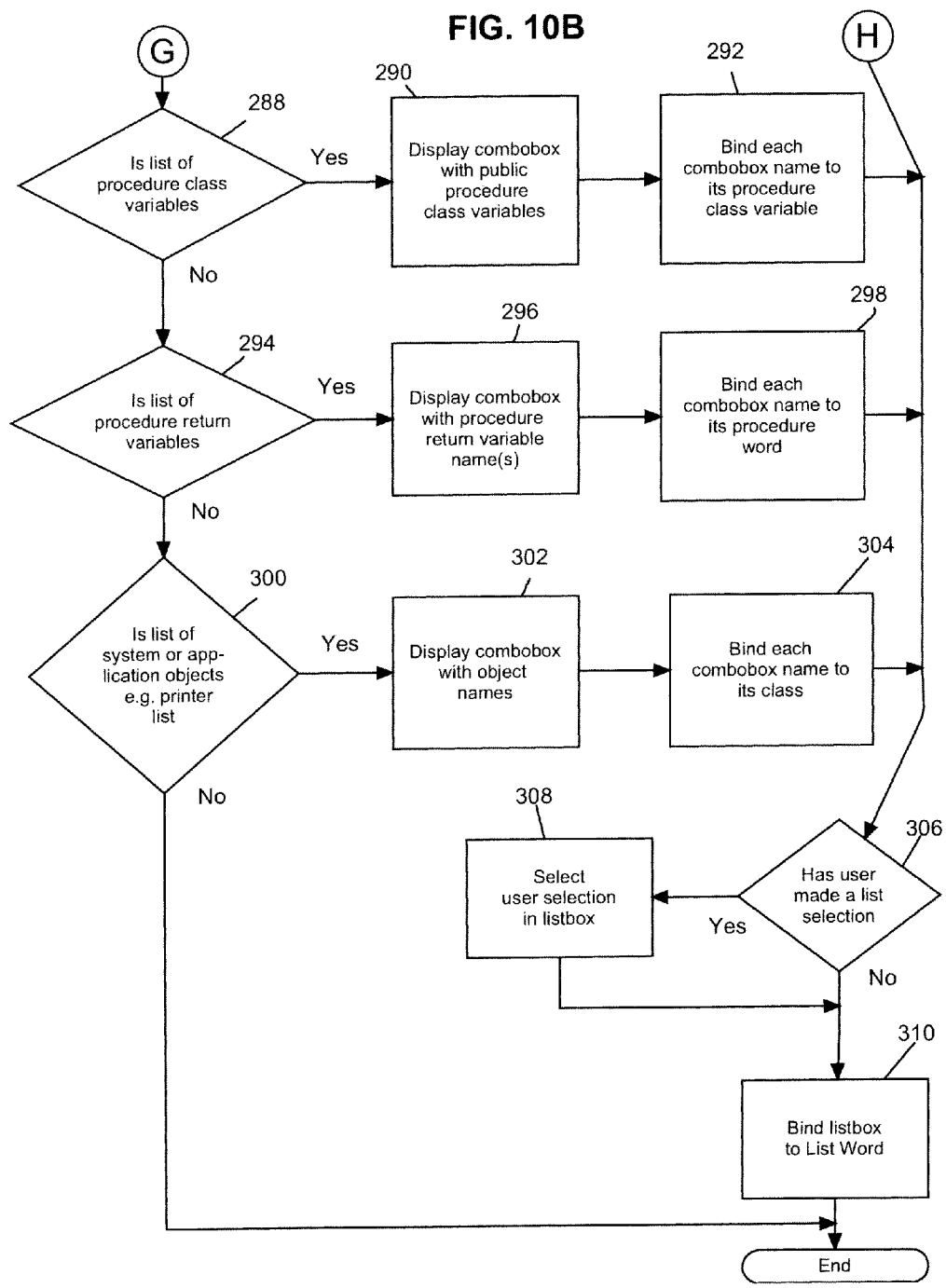

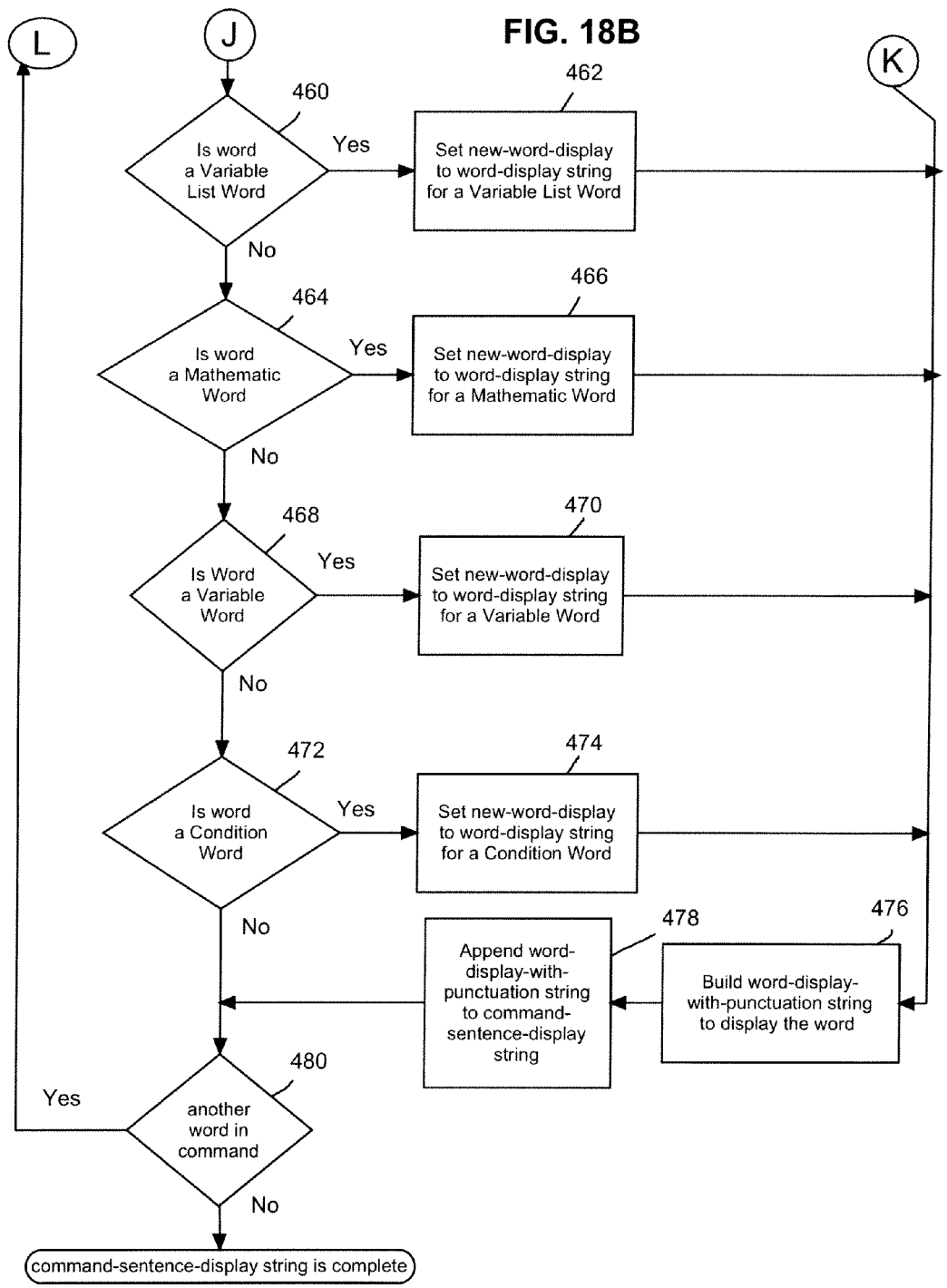

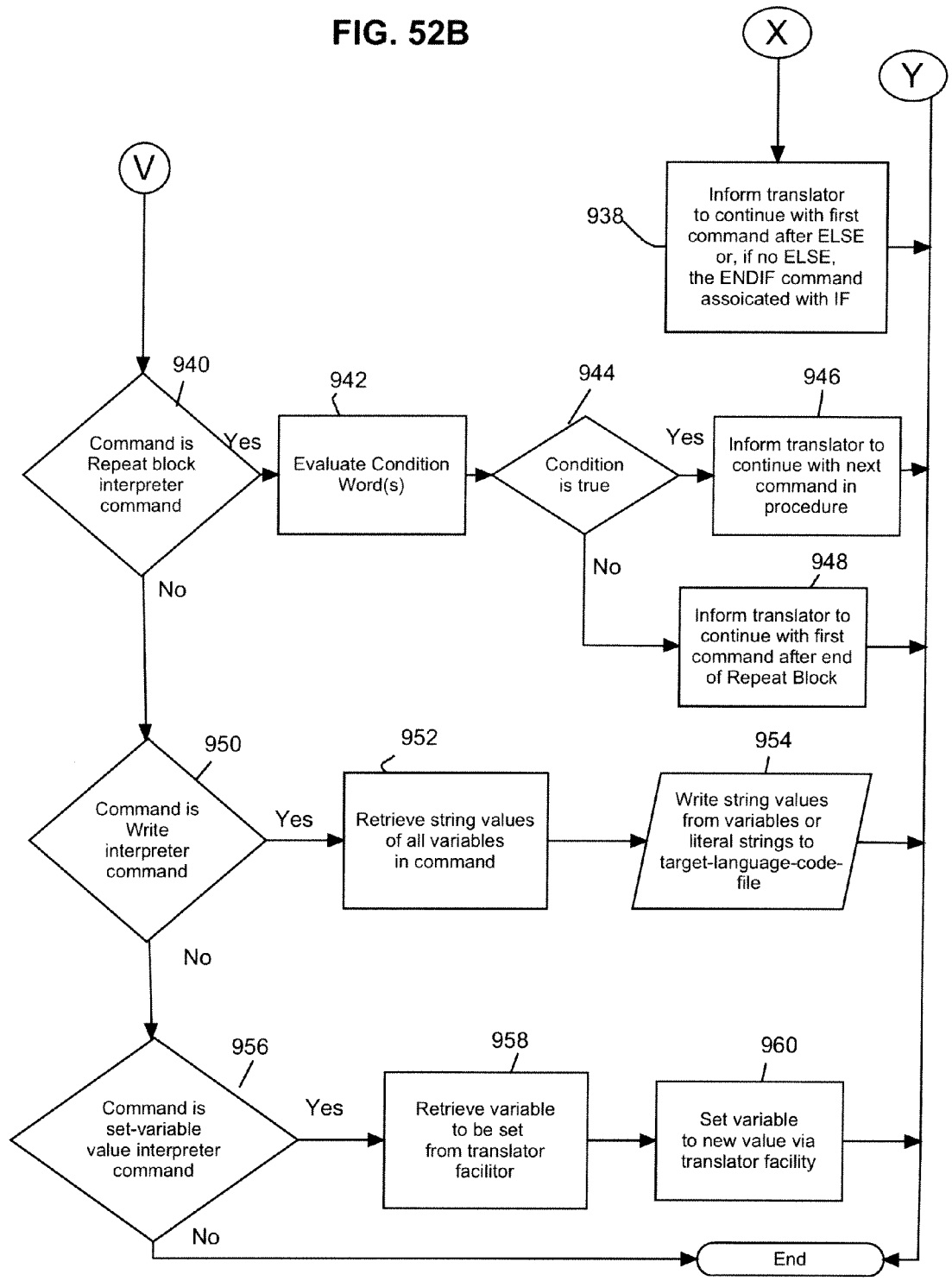

COMPUTER SOURCE CODE GENERATOR

TECHNICAL FIELD

This disclosure relates generally to computer source coding and more specifically, to a computer source code editor supporting code generation by allowing the writing of macros, scripts, computer documents and other forms of software.

DESCRIPTION OF THE RELATED ART

Currently, the process for macro, script or other computer language coding is challenging and error prone, requiring extensive education and expertise. In currently known systems, computer code is generally composed in a freeform editor. However, coded instructions must conform to strict and often poorly documented rules of syntax. Compilers or interpreters verify the code by reporting syntax errors in cryptic error messages. Furthermore, code instructions are often low level "building blocks," so that a set of interrelated instructions must be coded to achieve even the smallest element of computer functionality.

Two methods are currently used in an effort to simplify the computer coding process. First, code generators may be used to generate a block of code. Typically, code generators include a form which must be filled in by a user. Based on the entries in the form, a custom program generates source code of some desired nature or format, and this source code is then included within the user's larger program or executed as a stand alone program. While code generators are helpful, they are generally limited and are typically used to generate only a small fraction of the total computer source coded generated daily.

Second, end user coding (as opposed to professional programmer coding) may be facilitated by use of window-type forms. Macro Express® for Windows®, for example, allows the user to select a command from a static menu. The user completes the form which is then converted into a statement and is displayed in the Macro Express® editor. At the user's request, the macro is executed by the Macro Express® program(s). This method works only in specific, limited domains to write very simple macros.

SUMMARY OF THE DESCRIPTION

A computer source code editor and a method of creating computer source code allows for sophisticated coding entirely or mostly using point-and-click actions within the editor and thereby generally allows a user with no or very limited knowledge of computer language syntax to generate computer source code. The computer source code editor and method of creating computer source code provides a structured, as opposed to a freeform, process that "codes" high level commands. Generally speaking, using the disclosed editor, a user first selects a command from a command menu wherein the command is displayed as a sentence or a sentence fragment comprised of words, also known as a command format. The command is then presented to the user as a form with input entry components called the command form. The command form is then displayed and completed by the user in the editor. Once completed, the command form with the values entered by the user is converted to text, called the command sentence, which allows the command form to be displayed as a natural language sentence, along with other commands in the editor. The editor thereby simplifies the coding process by enabling a user to generate a natural language like sentence defining a computer operation or code. Of course, the command form used by the editor is flexible, and thereby allows the user to code a wide variety of command sentences and thus a wide variety of computer codes.

If desired, the command format may have required and/or optional words or phrases which must be selected or specified by the user to create a command sentence. The selectable words in the command format may be displayed in the command form as input entry components and, thus, some input entry components must be entered (if the component represents a required word) while other input entry components may be optional. As the user enters input entry components for optional words, the optional words may become required. A command form is considered valid when all of the required input entry components have a valid value.

In one embodiment, the options available to the user in the command form may be presented to the user on the command form as a list or as a "variable list". The variable list allows the user to make a general selection from the list and to then refine the selection when, based upon the choice selected, a new panel on the form is opened. Also, the user may add words to the command form so that a more complex sentence may be created and coded. This feature allows, for example, the coding of complex sentences, mathematical statements or conditional statements.

Additionally, the editor may make complex statements clearer and easier to read by, for example, coding complex conditional statements in an outline format. Likewise, the editor may include a translator that translates the command sentence as coded within the command form to a specific target computer language. In one embodiment, the editor may include a built-in code generator that allows the commands coded by the user to be high level commands, which require the use multiple source code instructions to implement. For example, in a third generation language like C or VB, a page of code may be used to send a file to a printer. Using the editor described herein, a print command could be represented as a command form that looks similar to a Windows® word processor print dialog box, and the user may complete the print command form allowing the translator to generate the many code statements used in the target code which are actually required to perform a print function.

As will be understood, a standardized framework may be used to enable the development and usage of the code generator described herein with the objective of such a framework being to simplify the coding of macros, scripts, markup language documents, third, fourth or fifth generation source code, object code, machine code, interpreted code, computer document or any other type of computer code. The framework includes a structured editor which codes and translates high level command sentences as described above and includes processes which makes the framework extensible by enabling new or existing command formats on the command menu to be defined and used.

Defining a particular command is completed by drafting a sentence or sentence fragment (which creates the command form) and then defining each word within the sentence or sentence fragment. The resultant sentence or sentence fragment which is a generic command is referred to as the command format sentence. Using the command format sentence, the editor has the parameters required to display the command form, accept and validate user entries in the command form, display from the command form the command sentence in the editor and translate the command sentence to the target computer language or other computer code.

The result of the command definition process is the command format sentence, in which each word is defined. Some words in a command format sentence may be defined as constant because they cannot be assigned a value during the coding process. However, words to which the user can assign a value are called enterable words which make up the input entry components discussed above, and enterable words represent values that the user is to provide during coding. The meaning and function of enterable words are generally defined so that:

1) the user understands how to code a value in the form—generally speaking, an input entry component, which may be a textbox, a list, a checkbox and the like, can be created by the framework editor on the command form to enable the user to enter a value;

2) the word value as entered by the user can be displayed as part of the command sentence in a scrollable area of the editor; and 3) the word can be used in the command translation process.

In one embodiment, an enterable word may be defined as a type of a list from which the user selects; a variable list which is similar to a list, except that enterable words can be embedded within the selected list item text; a numeric value field with specified validation; a text value field with specified validation; a date, or a path. Some enterable words, called repeater words, are repeatable. Generally speaking, repeater words can be inserted into the command sentence by the user when completing the command form and repeater words may be represented by input entry components on the command form called repeatable components. By inserting or removing repeatable components, the user can write complex conditional statements, mathematical equations and alphanumeric concatenations without the knowledge of computer language syntax.

DETAILED DESCRIPTION

Figure 1:
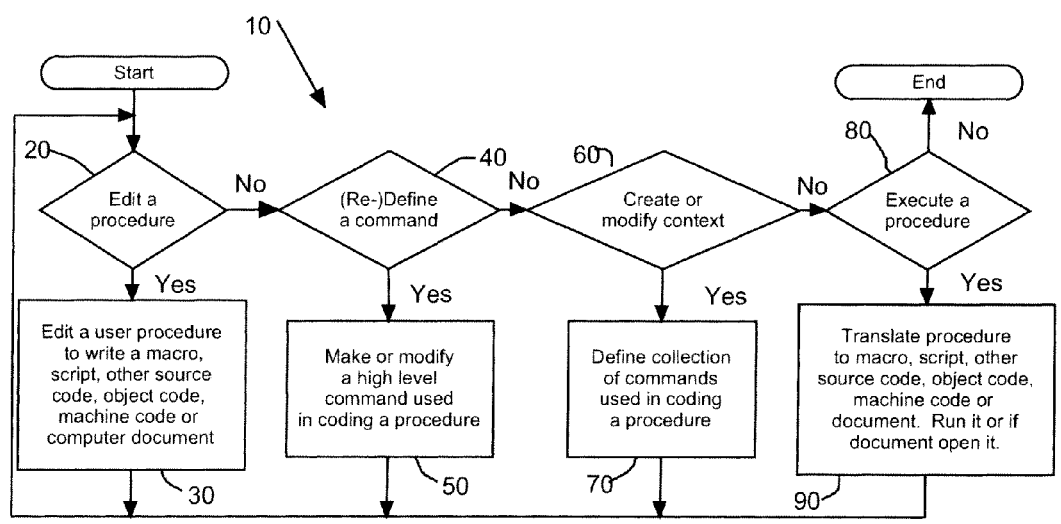
FIG. 1 is a flow diagram of an example of a coding process.

A block diagram depicting an example of a method of a coding process 10 for creating and editing computer source code is shown generally in FIG. 1. The coding process 10 disclosed herein is indicative of the types of procedures and information flow that may be used to define a code generator, edit code, translate and run the code. As will be understood, the coding process 10 provides a structured method of creating and editing code to create a procedure. Generally, a procedure is computer programming containing several lines of computer code according to a particular computer program language. When coding a procedure, a user may select a command to be coded into the procedure. The command may initially be represented as an generic sentence or sentence fragment referred to as a command format. The command format includes constant and enterable words. While the constant words are not modified, the user may specify values for the enterable words. In some cases, enterable words are required and the user is required to enter a value, whereas in other cases the enterable words are optional. The resulting combination of the command format and the entered values may be displayed as a command sentence which represents the coded command. A user may continue to select commands and enter values to develop a series of command sentences which define the procedure, and the coding process translates the command sentences to the desired computer program language to develop the computer program for the procedure.

Referring to FIG. 1, in order to create or edit a procedure, the coding process 10 determines whether a procedure will be edited at block 20, in which case a procedure may be edited at block 30 to write a macro, script, other source code, object, machine code or computer document. Generally, a procedure is any group of commands which, when translated to a target computer language, represents a block of code within that computer language.

The coding process 10 also determines whether a command will be defined or re-defined at block 40, in which case a high level command is created or modified at block 50. Generally, a command is a group of words wherein each word is defined, and may be represented as a sentence or sentence fragment. The command represents a useful computer instruction, set of computer instructions or text within a document, though it should be understood that because the coding process is extensible, a command may represent additional elements as defined by the user.

At block 60, the coding process 10 determines whether to create or modify a context, in response to which the coding process 10 defines a list of commands 70 to be used in coding a procedure. The context generally refers to a code generator for the target computer language.

The coding process 10 further determines whether to execute a procedure at block 8, in which case the procedure is translated to macro, script, other source code, object code, machine code or a document at block 90.

Each determination 20, 40, 60, 80 during the coding process 10 may be the result of an input provided by a user indicating a desired course of action. Having created code for a new procedure or having edited code for an existing procedure, the resulting code may be executed or the resulting document may be opened.

During operation, a user is likely to choose to code a new procedure or modify an existing procedure within the procedure editing process 30. After completion of editing, the user may choose to execute the edited code using the command translation process 90. The procedure editing process 30 and command translation process 90 together are comprised of methods which are used to generate code. To generate code for a specific computer language, a context is defined using a context definition process 70, wherein a context is the overall definition of a code generator. Because a command is key to code generation, the commands are defined using the command definition process 50.

As part of the coding process 10, a graphical user interface (GUI) may be provided and integrated with the coding process 10 described herein to facilitate a user's interaction with the various capabilities provided by the coding process 10. It should be recognized that the GUI may include one or more software routines that are implemented using any suitable programming languages and techniques as part of the coding process 10. Further, the software routines making up the GUI may be stored and processed within a single processing unit, such as, for example, a computer, or, alternatively, the software routines of the GUI may be stored and executed in a distributed manner using a plurality of processing units that are communicatively coupled to each other via a network.

Preferably, but not necessarily, the GUI may be implemented using a familiar graphical windows-based structure and appearance, in which a plurality of interlinked graphical views or pages include one or more pull-down menus that enable a user to navigate through the pages in a desired manner to view, retrieve and edit a procedure, define or redefine a command, create or modify a context, translate a procedure and execute the procedure. The features and/or capabilities of the coding process 10 described herein may be represented, accessed, invoked, etc. through one or more corresponding pages, views or displays of the GUI. Furthermore, the various displays making up the GUI may be interlinked in a logical manner to facilitate a user's quick and intuitive navigation through the displays to perform the various functions offered by the coding process 10.

Figure 2:
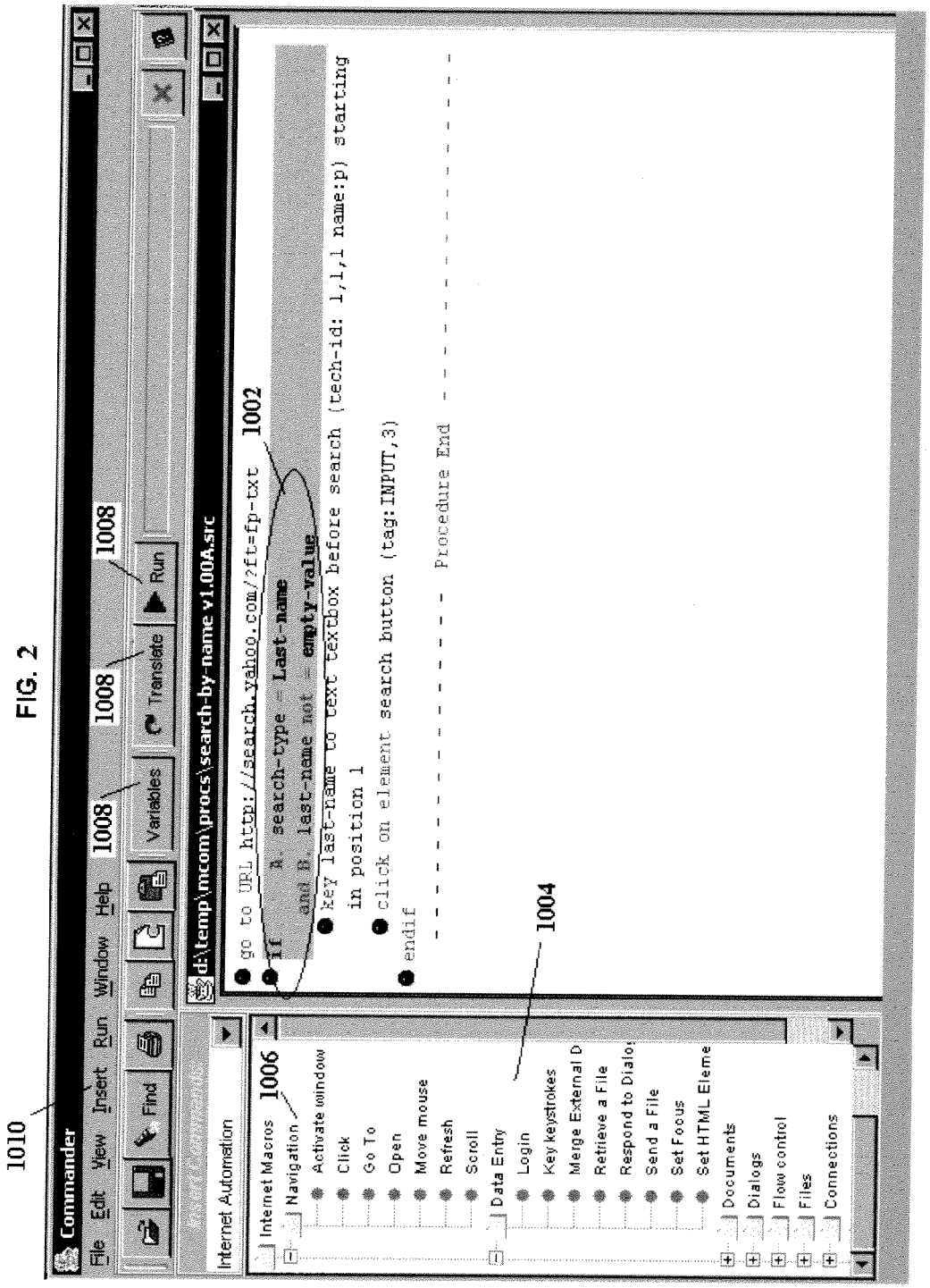
FIG. 2 is an exemplary depiction of a display that may be displayed by a graphical user interface during the procedure editing process of FIG. 3.

FIG. 2 is an exemplary depiction of a display representing a procedure editing screen that may be displayed during performance of the editing process 30 shown schematically in FIG. 1. As illustrated in FIG. 2, the procedure editing screen includes a display of commands 1002. The commands 1002 may be selected by the user for deletion, modification, copying, etc. A command 1002 may be selected by clicking with a mouse or using cursor keys, for example. A context menu 1004 on the left side of the procedure editing screen allows a user to include new commands by selecting the command from the context menu 1004. Branches 1006 are provided within the context menu 1004 to assist in the organization of the various commands. Function buttons 1008 are provided to execute various functions, such as translating or executing a procedure, for example. A function bar 1010 is further provided to allow the user to perform a variety of functions, such as saving, printing, copying, etc.

Figure 3A:
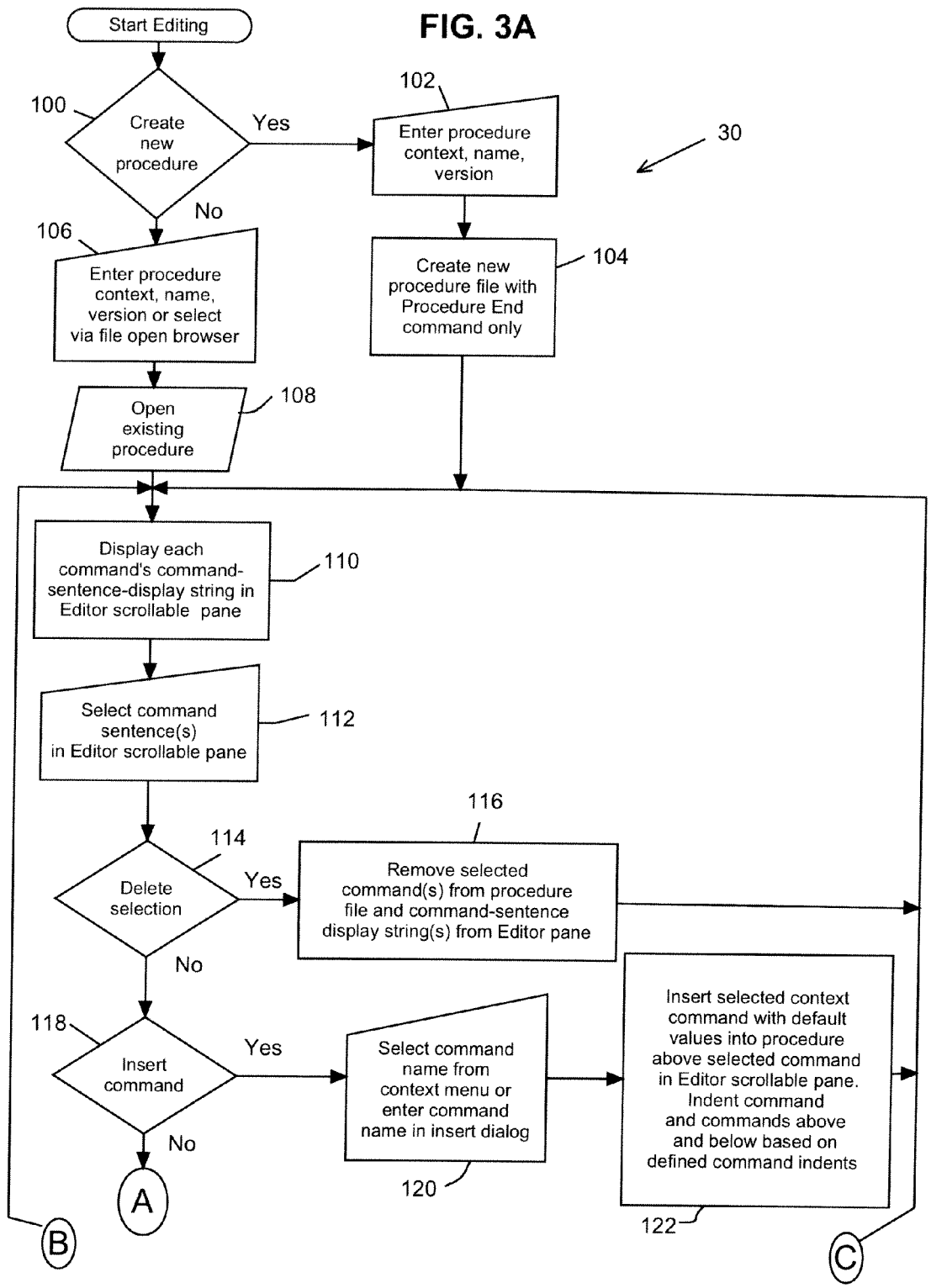
FIG. 3 is a flow diagram of a procedure editing process as shown schematically in FIG. 1.
Figure 3B:
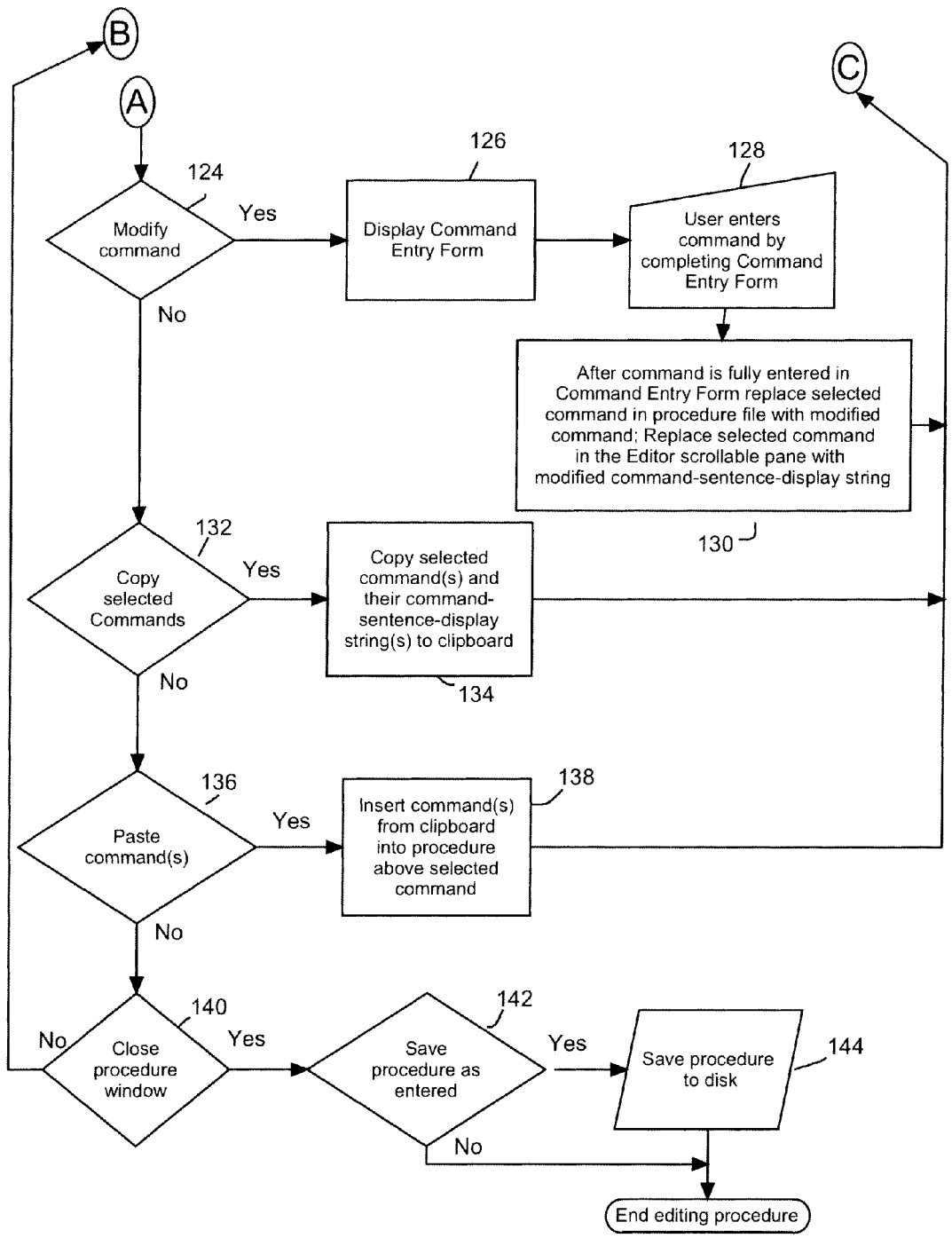

FIG. 3 is a flow diagram depicting an example of a method of editing a procedure 30 shown schematically in FIG. 1, which may be used to create a new procedure or edit an existing procedure. As referred to above, a procedure is any group of commands which represents a block of code when translated to the target computer language. The target computer language may be any computer language such as C, C++, Javascript® or the like or any low-level assembly or machine language. In C, the procedure (and resulting block of code) is a function, whereas in C++ the procedure is a method. A set of translated procedures may result in a macro, a script, a document, a class, an application program or other type of program. A special form of procedure is called a translation procedure. The translation procedure converts a command as entered by the user in the command form to the desired target language. The translation procedure includes interpreter commands which are executed to produce a file with the translated language.

At block 100, the procedure editing process 30 may either create a new procedure or edit an existing procedure, the determination of which is provided by the user. To create a new procedure, the procedure editing process 30 receives procedure identifying keys provided by the user in a dialog box at block 102. The procedure identifying keys may include a context name to identify the code generator, a procedure name and the procedure version number. The context name refers to the code generator for the target computer language (e.g., C, C++, Javascript®, etc.). The procedure name may be any name provided by the user for the procedure. The procedure version number may be any unique combination of numbers or letters identifying this procedure as unique from other versions of the same procedure. For example, the first procedure could be assigned version 1.0A. At block 104, the procedure editing process 30 creates a source file based on the procedure identifying keys. The newly created source file includes only one standard command, the Procedure End command, which marks the last command in the procedure.

In order to edit an existing procedure, the procedure editing process 30 retrieves an existing procedure at block 106, which may be stored in a file, library member dictionary or other forms of computer repository. The existing procedure may be retrieved by entering the identifying keys associated with the procedure into the open procedure dialog box, namely the context name, procedure name and procedure version number. Alternatively, the procedure editing process 30 may allow the user to search for the procedure's source file via a source file browser, which is similar to the open dialog box. Source file browsers are generally understood by those of ordinary skill in the art and will not be described further herein. At block 108, the retrieved procedure is opened and displayed to the user.

Whether a new procedure is created at block 104 or an existing procedure is retrieved at block 108, commands that have been previously inserted into the procedure are displayed to the user by the procedure editing process 30 at block 110.

The visible display for a command is referred to as its command sentence. The command sentence is a representation of what the user has coded. In other words, the command sentence is a command format combined with values entered by the user on the command form. An example of a method for formatting and displaying the command sentence is described further below with reference to FIG. 18. The command sentence for each command within the procedure is stored in and retrieved from computer memory, and made available for display on a computer monitor by the procedure editing process 30 in the scrollable pane of the procedure screen display. The user may scroll through the command sentences within the procedure editing process 30 using a mouse or keyboard cursor keys.

Referring again to FIG. 3, in order to edit a command, the command is selected at block 112. The command may be selected by clicking with the mouse or highlighting the command with cursor keys. For example, as seen in FIG. 2, the highlighted command is the selected command. The selected command may be deleted from the procedure at block 114 or modified at block 124. If command deletion is chosen at block 114, the command sentence is removed from the procedure editing process 30 and the command itself is removed from the procedure at block 116.

Further, a new command may be inserted at block 118, which may be inserted above the selected command. If command insert is chosen at block 118, the user selects the new command to be inserted from the context menu 1004 or enters the new command name in an insert dialog box at block 120. Upon selection, the new command sentence is drawn in the procedure editing process 30 scrollable pane above the selected command and the command form is opened at block 122. For example, as shown in FIG. 2, a user could select the word "click" on the Insert Commands context menu 1004. This would result in a click command inserted above the selected command 1002 (and below the go to command) in the procedure editing process 30 scrollable pane. Once inserted, the new command can be selected for modification just like any other command in the scrollable pane.

In order to modify a selected command, including any newly added commands, as determined at block 124, a command form is displayed at block 126. To enter a command, the user completes the command form at block 128 by entering text data, selecting entries from a list and interacting with other entry components, including GUI components or any form of entry component including voice activated components. When the form is complete, at block 130 the modified command replaces the original command in the procedure and a new command sentence is created from the command form, which replaces the original command sentence in the procedure editing process 30 scrollable pane.

Command sentences above and below the inserted command sentence may have their indention adjusted based on the defined indents of the inserted command. An indention refers to the number of tabs used to indent or shift a block of code from the left margin, so as to visibly mark the code belonging to the code block. A block of code belonging to an "if" command, for example, starts with the first command below the "if" command and ends with the first command above the matching "endif" command. The block will be marked visibly by indenting the block.

The procedure may also be modified by copying selected commands as determined at block 132. For example, at block 134 a user may copy the selected commands and their command-sentence-display strings to a temporary storage, such as a computer clipboard. The command structure, as well as the displayed command sentence, are copied. Commands previously copied to the clipboard may be pasted above the selected command at block 136. The pasted commands are inserted into the procedure and their command sentences are inserted into the procedure editing process 30 scrollable pane at block 138. Using the procedure editing process 30, the user may continue to insert, modify or delete commands to edit the procedure.

When complete, the procedure may be closed at block 140 and saved as entered at block 142. In particular, the user may also choose to save the procedure on a memory device, such as a semiconductor memory, a magnetically readable memory, an optically readable memory, including, but not limited to removable memories such as flash memories, and magnetic or optical disks. The procedure may be saved at block 144. Whether or not the procedure is saved, the editing procedure 30 may subsequently be terminated.

Figure 4:
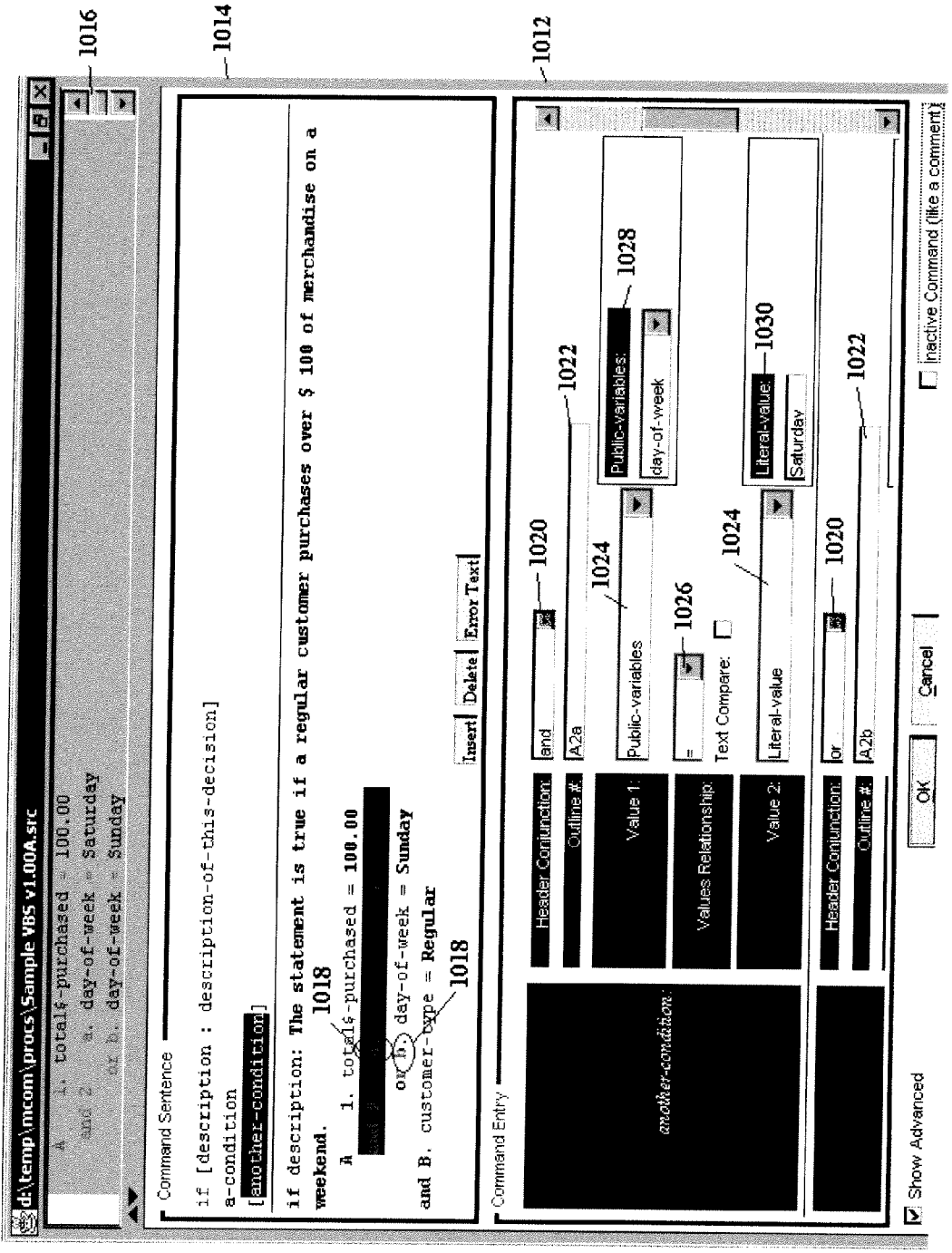
FIG. 4 is an exemplary depiction of a display that may be displayed by a graphical user interface when modifying a conditional statement during the command form display process of FIG. 3.

FIG. 4 is an exemplary depiction of a display representing a command form during performance of the command form display process 126 shown schematically in FIG. 3. The command form may be used to code commands during the procedure editing process 30. As illustrated in FIG. 4, command form includes two sections or frames: a command sentence frame 1014 and a command entry frame 1012. A scrollable display frame 1016 is also provided.

The display frame 1016 displays a basic definition of the command being coded, referred to as the command format or as the predefined command sentence. Generally, the command format is a generic sentence or sentence fragment. Initially, the command format is a display of the command as it was originally defined and illustrates a well-formed command sentence. The command format documents which words are to be assigned a value, called enterable words. The command format further indicates which enterable words are required to be entered and which enterable words are optional. The command sentence frame 1014 displays the command sentence as it is being modified so the user can see the effect of form entries on the command sentence. The command entry frame 1012 includes a variety of input entry components which may be displayed as GUI components, such as textboxes, dropdown menus, checkboxes, etc. Each enterable word in the command format sentence is represented by an input entry component rendered in the command entry frame 1012 as a GUI component. Selections made from the GUI components are used to enter values for the enterable words of the command format and code the command. For example, an enterable word may be rendered as a dropdown list from which the user may make a selection. Constant words, on the other hand, cannot be changed and are not represented in the command entry frame 1012.

The display of the command entry frame 1012 may differ depending on the command sentence displayed in the command sentence frame. For example, the command form shown in FIG. 4 depicts a modification of a conditional statement, which is a type of command that includes conditional words inserted into the command. In particular, FIG. 4 depicts entry of a repeater word within a conditional statement. As a result, the command entry frame 1012 may include a header conjunction 1020 to indicate the relationship with the previous condition word in the condition word statement, an outline number 1022 to indicate the heads/subheads of the condition statement and to organize the words into groups, a first and second value 1024 for the condition statement, definitions of the first and second values 1028, 1030, and value relationships 1026 indicating the relationship between the first and second values. After completing the command entry frame 1012, the values from the command entry frame 1012 are displayed in the command sentence frame 1014, including the subheads 1018 of the newly modified conditional statements. The conditional statement in its final form is displayed in the display frame 1016.

Figure 5:
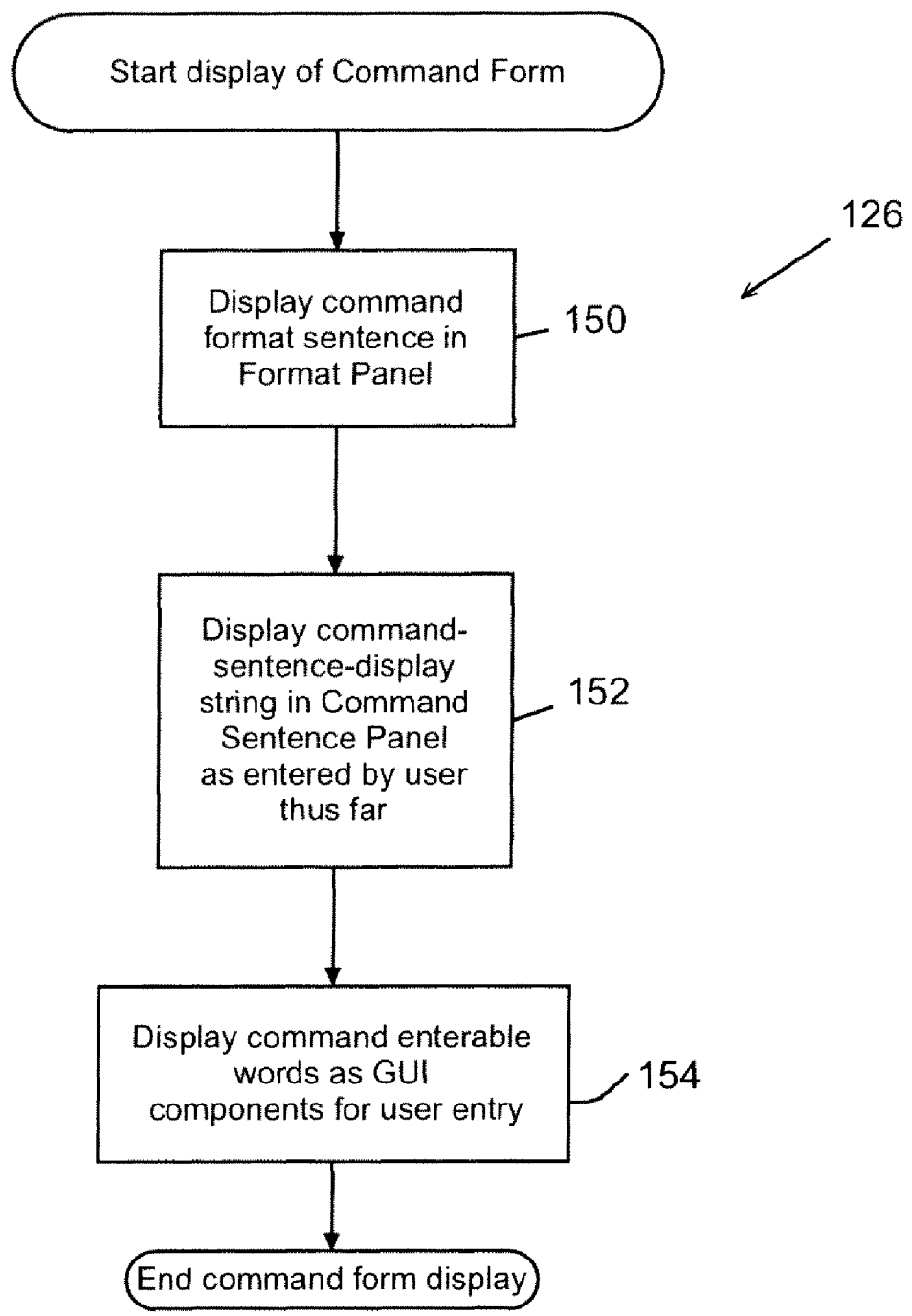
FIG. 5 is a flow diagram of a command form display process as shown schematically in FIG. 3.

FIG. 5 is a flow diagram depicting an example of a command form display process 126 shown schematically in FIG. 3. As explained above, commands are coded within the procedure editing process 30 using the command form. In order to begin coding, a command form is displayed. At block 150, the command form display process 126 displays the display frame 1016 and the command format. At block 152, the command sentence frame 1014 is displayed, such that each modification to the form is displayed as a sentence so the user can see the effect of form entries on the command sentence 152. The process 126 displays the GUI components of the command entry frame 1012 at block 154, whereby each enterable word of the command format is rendered with a GUI component. After entry is complete, the command form is fully displayed.

Figure 6:
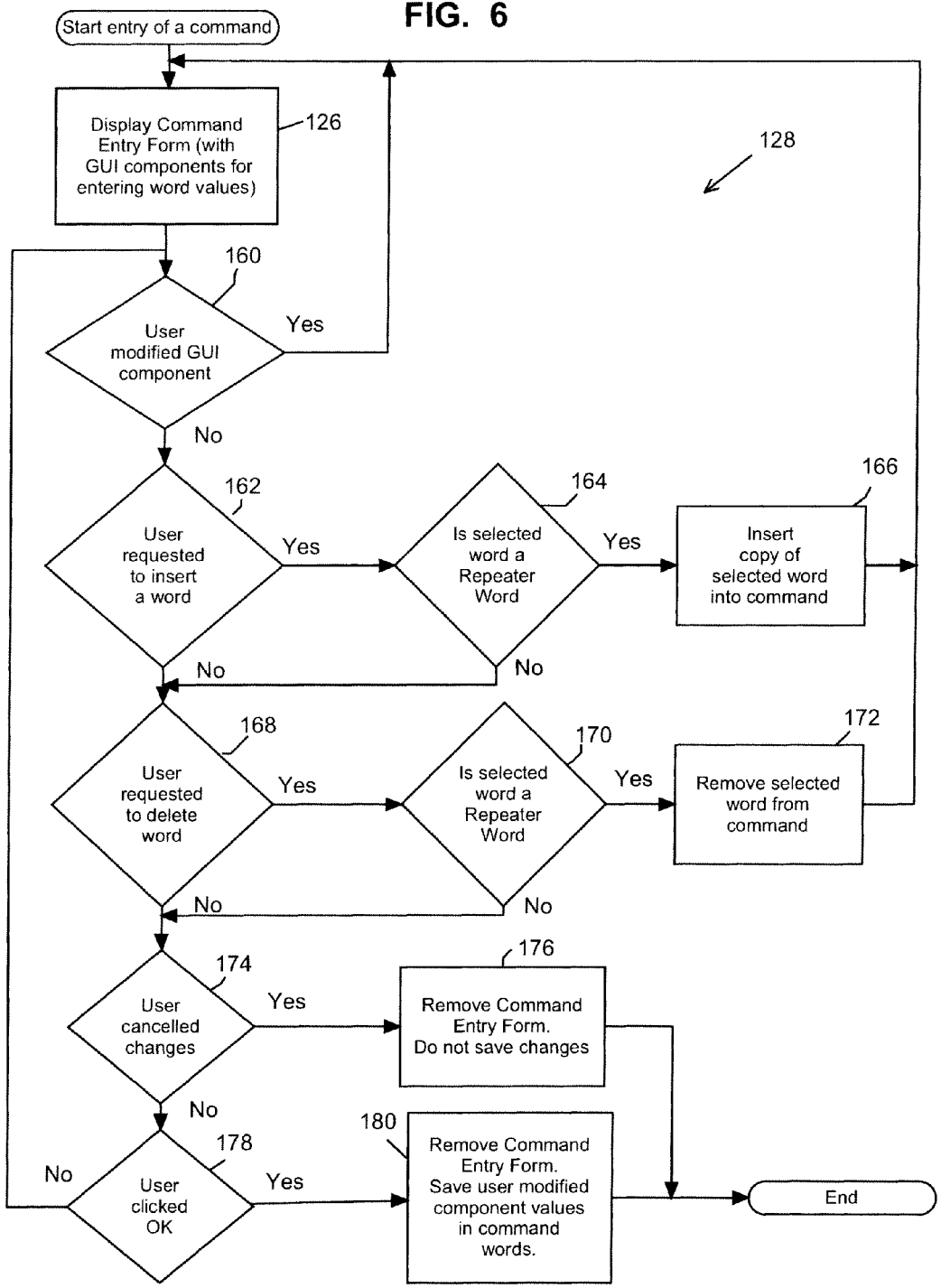
FIG. 6 is a flow diagram of a command modification process as shown schematically in FIG. 3.

FIG. 6 is a flow diagram depicting an example of a command modification process 128 shown schematically in FIG. 3. The command modification process 128 may be used to enter and modify a command. Generally, a GUI for the command modification process 128 may include the command form display of FIG. 4 which presents the command as a command form. The command form includes input entry components presented as GUI components. The user may enter and modify a command by modifying the input entry components of the command form. When the user interacts with or modifies an input entry component (for example, enters or dictates text in a textbox, selects from a list, checks a checkbox, etc.), the command form is modified. After modification, the values within all GUI components of the form are validated and the command sentence within the command form is updated.

As disclosed above, the command is displayed as a sentence or sentence fragment. The sentence or sentence fragment is made of words. In the command sentence or sentence fragment, some words are constant words and other words are enterable words. Constant words may include any word defined in the command format for which the user does not have to enter a value, and may be prevented from entering a value or otherwise modifying the word. On the other hand, an enterable word may include any word defined in the command for which the user may specify a value.

Each of the input entry components may relate to an enterable word within the command. In some cases, the enterable words are required words where the input entry component must be entered into the command, whereas other enterable words are optional words. Optional words may become required words as the user enters input entry components for optional words. The enterable words may be provided as Boolean words, procedure variables, variable list words, lists, repeater words, condition words or mathematical words.

Figure 7:
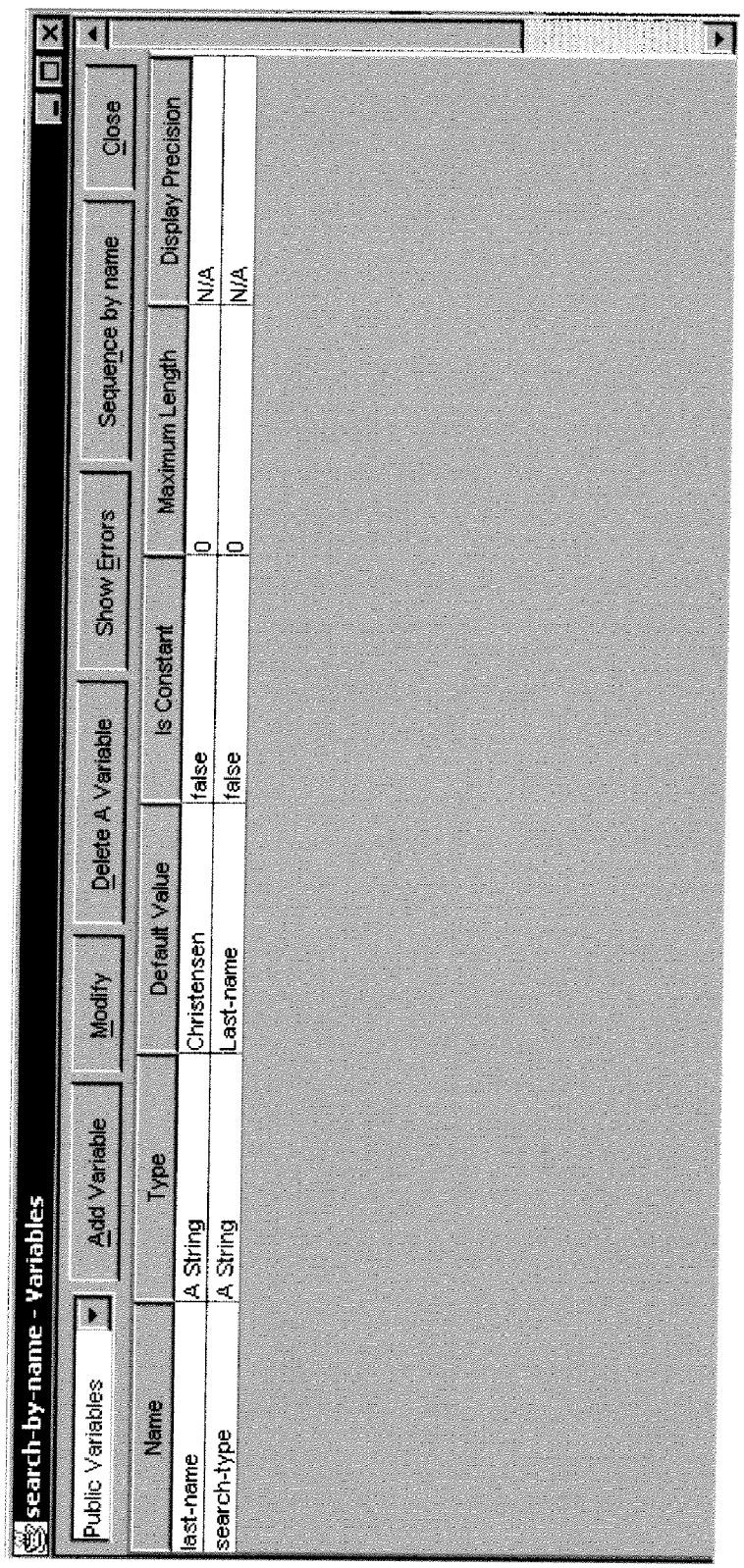
FIG. 7 is an exemplary depiction of a display that may be displayed by a graphical user interface when declaring variables for a procedure variable table for public variables during the command modification process of FIG. 6.

A procedure variable is a variable data field or class that is used within a procedure. FIG. 7 is an exemplary depiction of a display representing the display of a variable table screen for public variables to be declared by the user, and may include several fields which may be populated by inputting the data into the fields. Procedure variables may be either global by scope or local in scope. The user declares a global procedure variable by making a line entry in a public variable table as shown in FIG. 7. Procedure variables whose scope is local to the procedure are declared in a procedure variable table which has a similar format as the public variable table. A procedure variable declared in one of these tables represents a variable or field in the target language code to which the user may assign a value.

Enterable words may be defined as a list or a variable list from which the user may select choices. A list includes a list of choices, where each choice is a string of constant words.

Each list choice may represent a procedure variable, a public variable or a repeat block loop variable. By contrast, a variable list includes variable list choices that include constant and/or enterable words, such that the variable list choice represents a sentence or sentence fragment within the command sentence. The enterable words may be embedded within the selected list item text. A variable list may contain a variable word, a list, a Boolean word or any other form of enterable word. When defining a variable list, each word within each variable list choice is defined as a constant word or an enterable word. During coding, if the user selects a variable list choice that includes an enterable word, the user is prompted to enter a value for the enterable word.

Repeater words are enterable words which can occur repeatedly (or not at all) within a sentence, and can be inserted into the sentence as often as may be needed in the command being coded. Any enterable word can be defined within a command or variable list choice as repeatable. The repeater word is represented on the command form as an input entry component (or set of components) called a repeatable input entry component. The GUI for the command modification process 128 may include an insert button and a delete button, whereby the user may add repeater words to or delete repeater words from the command form. In particular, the user may add a copy of the repeater word to the command sentence or remove individual instances of repeater words. Examples of a repeater word include mathematical equations and string concatenations. A further example of a repeater word is a conditional statement which may include one or more interrelated conditions. Referring to FIG. 4 for example, four conditions are show in the conditional statement, each represented by a condition word.

A condition word represents a truth clause where one value is related to another value. The relationship between the values may be any logical relationship (e.g., equal, not equal, greater than, less than, etc.). The condition word is evaluated to determine if it is true or false by comparing the values as defined by their relationship. In some instances, a condition word is used in conjunction with other condition words to form a compound condition. In a compound condition each condition word is related by a conjunction (and, or) and an outline number. The outline number is used to group condition words to form more complex conditions. For example, referring to FIG. 4, a first condition word associated with the outline number A2$a$, and a second condition word is associated with the outline number A2$b$. The first and second condition words are related with the conjunction "or". Either condition word may be true so that outline header A2 is true. The condition word (or condition words) form a conditional statement when placed into a command, such as the "if" command or repeat (until or while) block command. A conditional word is represented on the command form by a set of repeatable input entry components.

A mathematical word is an enterable word whose value is entered on the command form as a numeric value of any mathematic format and a mathematic sign such as +,−,* (multiple) or / (divide). The mathematical word may be combined with other mathematical words to form an equation. In the equation, mathematical words may be grouped using parentheses to provide order to the calculation of the equation.

Referring again to FIG. 6, in order to modify a command sentence, a command form is opened to begin entry of a command. The command form may be opened using the command form display process 126 as explained above. The command to be modified may be selected, such as by clicking on the command or highlighting the command via cursor keys. After selecting the command to modify, the command form is displayed at block 160.

During the command modification process 128, the user may insert words at block 162 or delete words at block 168. At block 164, the command modification process may determine whether the selected word is a repeater word. If the user would like to insert a word and if the selected word is a repeater word, a copy of the selected word is inserted into the command at block 166. If the user would like to delete a word and the selected word is a repeater word, as determined at block 170, the selected word is removed from the command at block 172.

As mentioned above, a repeater word may be a conditional statement which may include one or more interrelated conditions. To add or remove repeater condition words, a condition word is selected from the command format or command sentence as displayed on the command form. A user may select the GUI insert or delete buttons to insert or remove the repeater condition words, respectively. Referring again to FIG. 4, to add one or more conditions between conditions A2$b$ and B, the B condition word in the command sentence is selected and the user selects the insert button. A new conditional word is inserted in the command form above the B condition so the user can modify its input entry components. If the user selects the delete button, the selected word within the command sentence is removed from the command sentence, if the selected word is a repeater word, and the GUI components are removed from the command form.

When command modifications are complete, the user is provided with the opportunity to cancel the command modifications at block 174, which may be performed by selecting a cancel button on the command form. Consequently, the form is removed at block 176 and no changes are made to the command or the command sentence display. Alternatively, the user may accept the modifications at block 178, and the form is removed from the screen and the modified command sentence is updated within the scrollable pane of the procedure editing process 30, thereby replacing the original command sentence at block 180. The modified command sentence may be updated with or without errors. The command itself is saved with changes thereby replacing the original command, and the command modification process may be terminated.

Figure 8A:
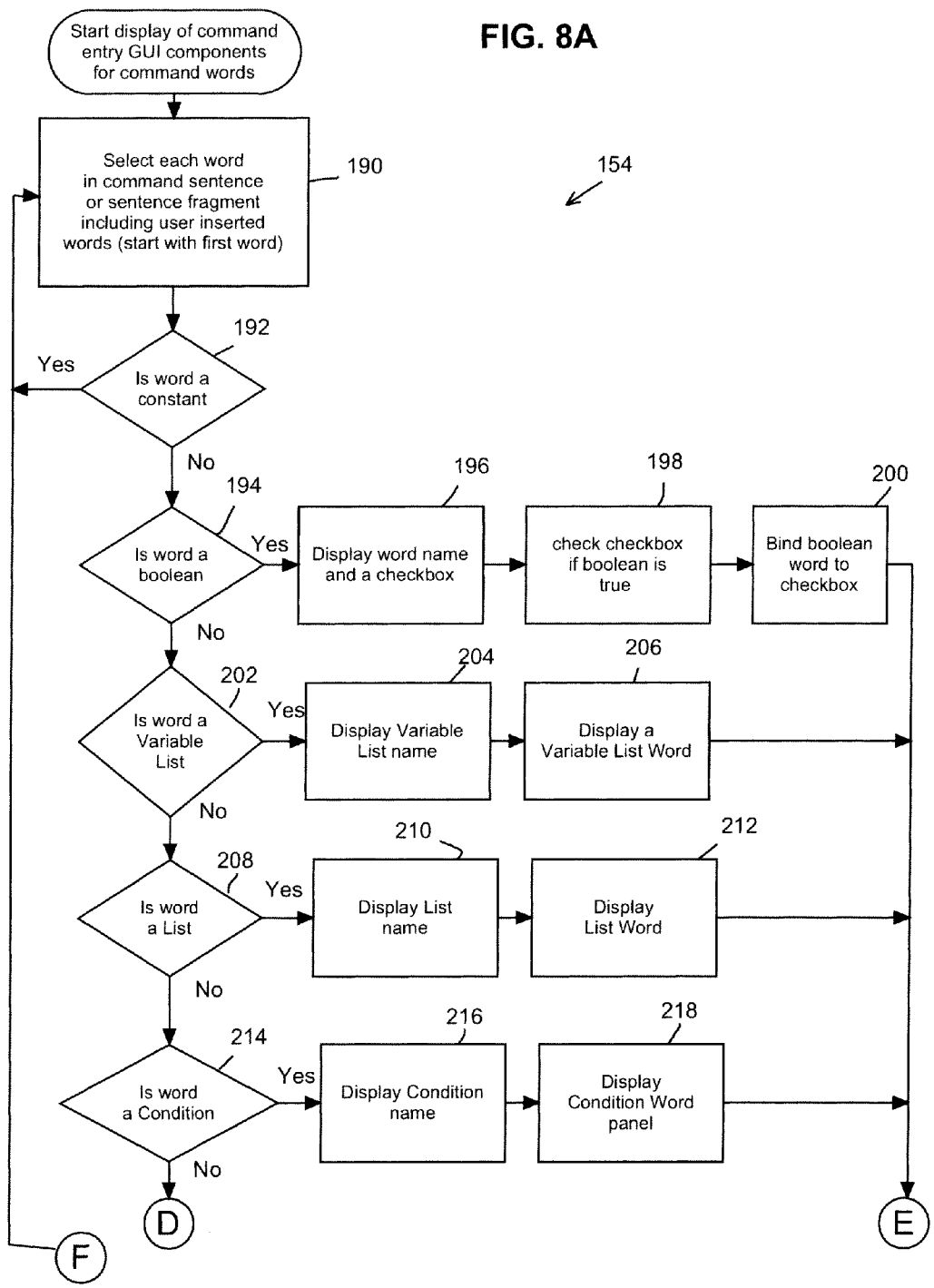
FIG. 8 is a flow diagram of an enterable word display process as shown schematically in FIG. 5.
Figure 8B:
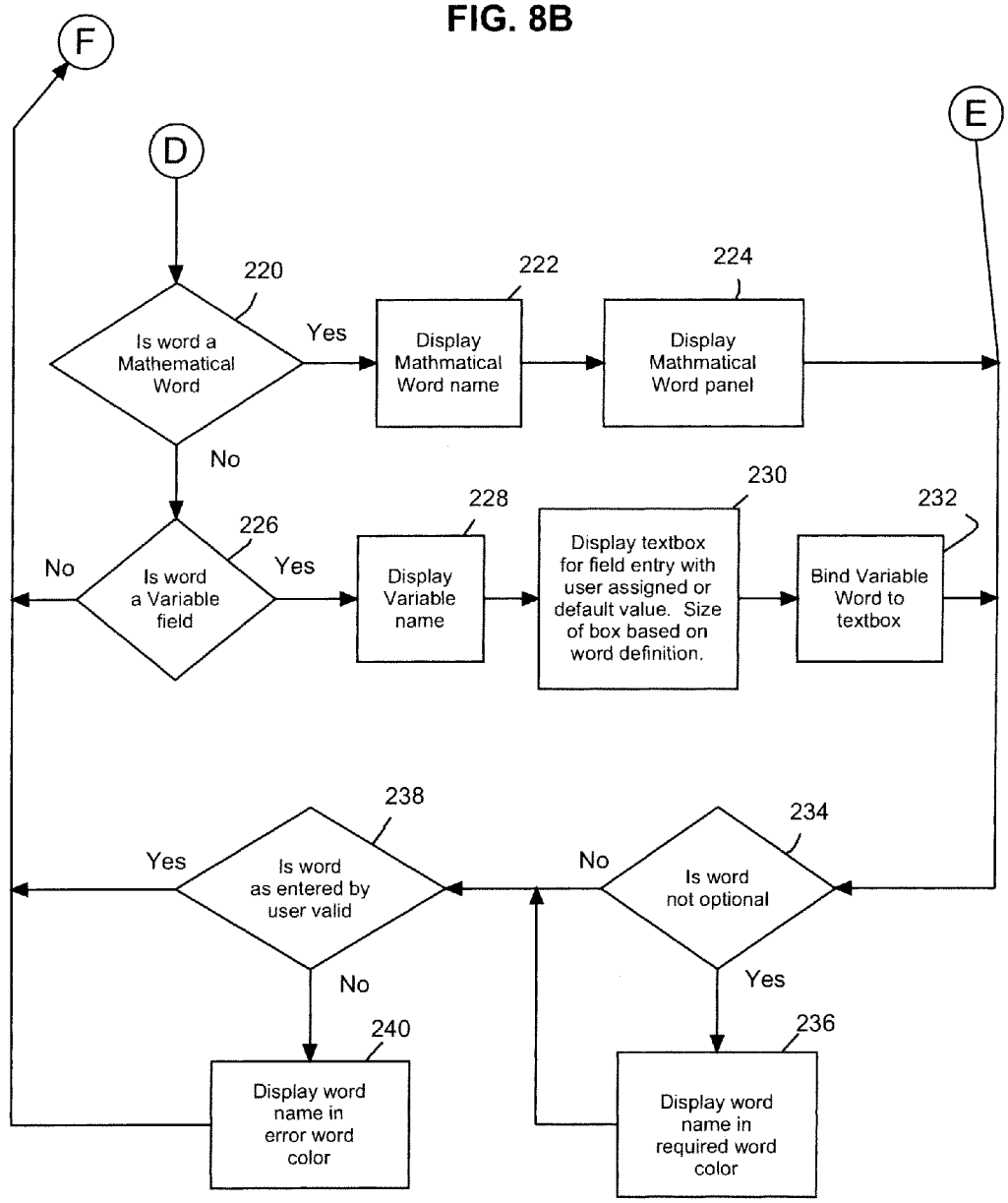

FIG. 8 is a flow diagram depicting an example of a method for displaying enterable words in a command form using GUI components 154, shown schematically in FIG. 5. The enterable word display process 154 may be used to process each enterable word in a command sentence or sentence fragment. As previously explained, the command form of FIG. 4 may include a command entry frame 1012 which displays input entry components represented as various GUI components (e.g., text boxes, dropdown menus, checkboxes, etc.). These input entry components correspond to the enterable words of the command sentence or sentence fragment as displayed in the command sentence frame 1014, but do not correspond to constant words. In other words, constant words are not displayed in the command entry frame 1012.

The enterable word display process 154 includes the display of the GUI components representing the input entry components to be displayed in the command entry frame 1012. At block 190, each word of the command sentence or sentence fragment displayed in the command sentence frame 1014 is selected. The enterable word display process 154 displays enterable words in the command entry frame 1012, but ignores constant words. In order to distinguish enterable words from constant words, the enterable word display process 154 determines whether each selected word is a constant word at block 192. If so, the enterable word selects a new word at block 190. Otherwise, the process 154 proceeds to determine the type of enterable word.

If the enterable word is a Boolean, that is, a word whose assigned value is true or false (yes or no), as determined at block 194, the Boolean word is displayed on the command form in the command entry frame 1012 at block 196. The Boolean word is displayed as its word name along with an associated GUI component, such as a checkbox. The Boolean word name as defined in the command format may be displayed to the side of the GUI checkbox. The word name is the word displayed in the command format for that word. For example, in FIG. 4, "a-condition" as shown in the command sentence frame 1014 is the word name for the first condition word in the "if" command format and "another-condition" is the second condition word. Depending on whether the Boolean is true or false, the checkbox may checked or uncheck respectively at block 198. The GUI checkbox is bound to the Boolean word in the command at block 200 such that changes to the checkbox will modify the Boolean word in the command. The command sentence or sentence fragment may be updated according to changes to the Boolean word and displayed in the command sentence frame 1014.

If the enterable word is a variable list word as determined at block 202, the variable list word name is displayed in the command entry frame 1012 at block 204. The variable list choices are displayed in the command entry frame 1012 at block 206, along with a variable list word panel showing the selected variable list choice. The GUI component for the variable list word may be a dropdown list with the variable list word name displayed in proximity to the dropdown list. If any variable list choice has been previously selected, the choice is selected within the list and each enterable word within the selected choice is displayed in the variable list word panel.

If the enterable word is a list word as determined at block 208, the list word name is displayed in the command entry frame 1012 at block 212. The list choices are displayed in the command entry frame 1012 at block 206. As with the variable list, the GUI component for the list word may be a dropdown list with the list word name displayed in proximity to the dropdown list. Any previously selected list choice is the selected item in the dropdown list.

If the enterable word is a condition word as determined at block 214, several GUI components are used to display its condition word name at block 216 and to display a condition word panel at block 218. As previously explained, coding a condition word uses, at a minimum, the entry of two values and the relationship between them. A value may be a literal alphanumeric or numeric value (e.g., "PTO", "12345"). Alternatively, a value may refer to the value of any type of variable, including procedure variables or any enterable word within the command sentence. Each value is represented by an input entry component depicted as a GUI component. As an example, referring to FIG. 4, two values names are displayed as "Value 1" and "Value 2" in the command entry frame 1012 with the values selected from a dropdown list 1024. A relationship is represented by a dropdown list 1026.

If the enterable word is a condition word as determined at block 214, several GUI components are used to display its condition word name at block 216 and to display a condition word panel at block 218. If the enterable word is a mathematical word as determined at block 220, several GUI components are used to display its mathematical word name at block 222 and to display a mathematical word panel at block 224. As explained above, coding a mathematical word uses, at a minimum, the entry of one value and the numerical operator (ex. plus sign) to operate on the proceeding mathematical word in an equation. A value may be a numeric value (e.g., "12345"). Alternatively, a value may refer to the value of any type of variable with a numeric value, including procedure variables or any enterable word within the command sentence. The operator may be represented by a dropdown list showing +, -, *, /, to represent operators. Each value is represented by an input entry component depicted as a GUI component.

If the enterable word is variable word as determined at block 226, the variable name is displayed in the command entry frame 1012 at block 228. A variable word represents one value which can be entered using a single GUI component, such as a textbox which displays the value at block 230. The value displayed in the textbox may be assigned a value or may be a default value. The variable word definition allows for the variable word value to be validated when entered. The variable word value may be validated as a string, a numeric value, a positive numeric value, an integer, a floating point number, an alphanumeric, a data file location (file/path), an array, an object, a Boolean (true/false) value displayed as a GUI list or checkbox, a date and/or time. In the command form, the variable word name is displayed adjacent the textbox to allow entry of a value. The GUI component is bound to the variable word in the command at block 232 such that changes to the GUI component modifies the variable word in the command. The command sentence or sentence fragment may be updated according to changes to the variable word and displayed in the command sentence frame 1014.

When a value is assigned to the enterable word by inputting the value to the associated input entry component represented by the GUI component, the value is validated based on the definition of the enterable word. Further, all values for all enterable words in the command sentence are re-validated because the entry of one value may affect the validity of others. In particular, optional words may become required words, as determined at block 234. For example, an optional word may become required if it belongs to an optional phrase and a value is assigned to an enterable word within the phrase. In other words, if any enterable word within an optional phrase is assigned a value, all words within the phrase become required and are displayed as such at block 236 (e.g., in a color assigned to required words).

It is noted that a phrase is a group of optional words in a command sentence. A phase may be defined by bracketing (e.g., [ ]). Phrases can be embedded within other phrases. For example, in a command format "print what-document [to printer-name [on network-name]]", the printer-name and network words are optional enterable words. The printer-name could be entered without entering the network-name.

The validity of each enterable word is determined at block 238. If the value of any enterable word is invalid, its word name, as displayed adjacent the GUI component, is displayed as such to signify an error at block 240 (e.g., highlight in a color assigned to errors).

Figure 9:
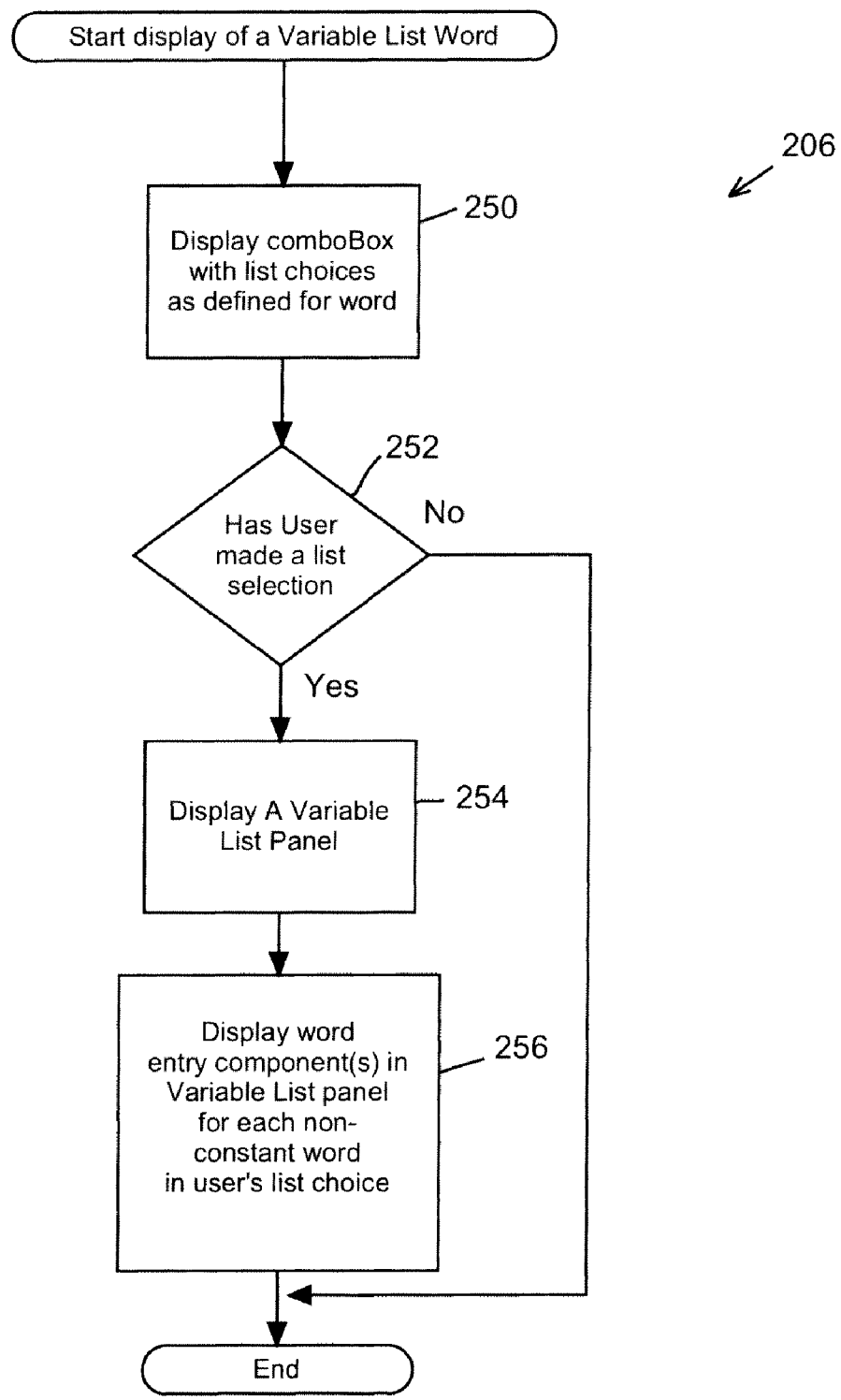
FIG. 9 is a flow diagram of a variable list word display process as shown schematically in FIG. 8.

FIG. 9 is a flow diagram depicting an example of a method for displaying a variable list word in a command form 206, shown schematically in FIG. 8. The variable list word display process 206 may be used to display each variable list word of a command sentence or sentence fragment in the command entry frame 1012 of the command form. As referred to above, a variable list word is defined as a list of choices, where the choices themselves may contain enterable words. If a variable list choice having an enterable word is selected, the user is prompted to assign a value to the new enterable word.

Initially, the variable list word is displayed. In particular, because the variable list is a type of list, the variable list is displayed in a GUI combobox at block 250. The combobox is a form of dropdown list which shows each variable list choice.

If a variable list choice has been selected from the combobox as determined at block 252, the variable list panel is displayed at block 254 adjacent to the combobox such that enterable words within the selected choice can be displayed for entry. The word name and GUI component(s) representing each enterable word of the selected variable list choice are displayed in the variable panel at block 256. Constant words are generally not displayed. The variable list choice may contain all the enterable words that a command sentence can contain except a command word. As a result, the enterable word display process 154 of FIG. 5 is applied to each word of the selected variable list choice. As with the enterable choices of FIG. 5, each GUI component is bound to the enterable word within the variable list choice, such that entries are reflected in the command sentence of the command sentence frame 1014.

Figure 10A:
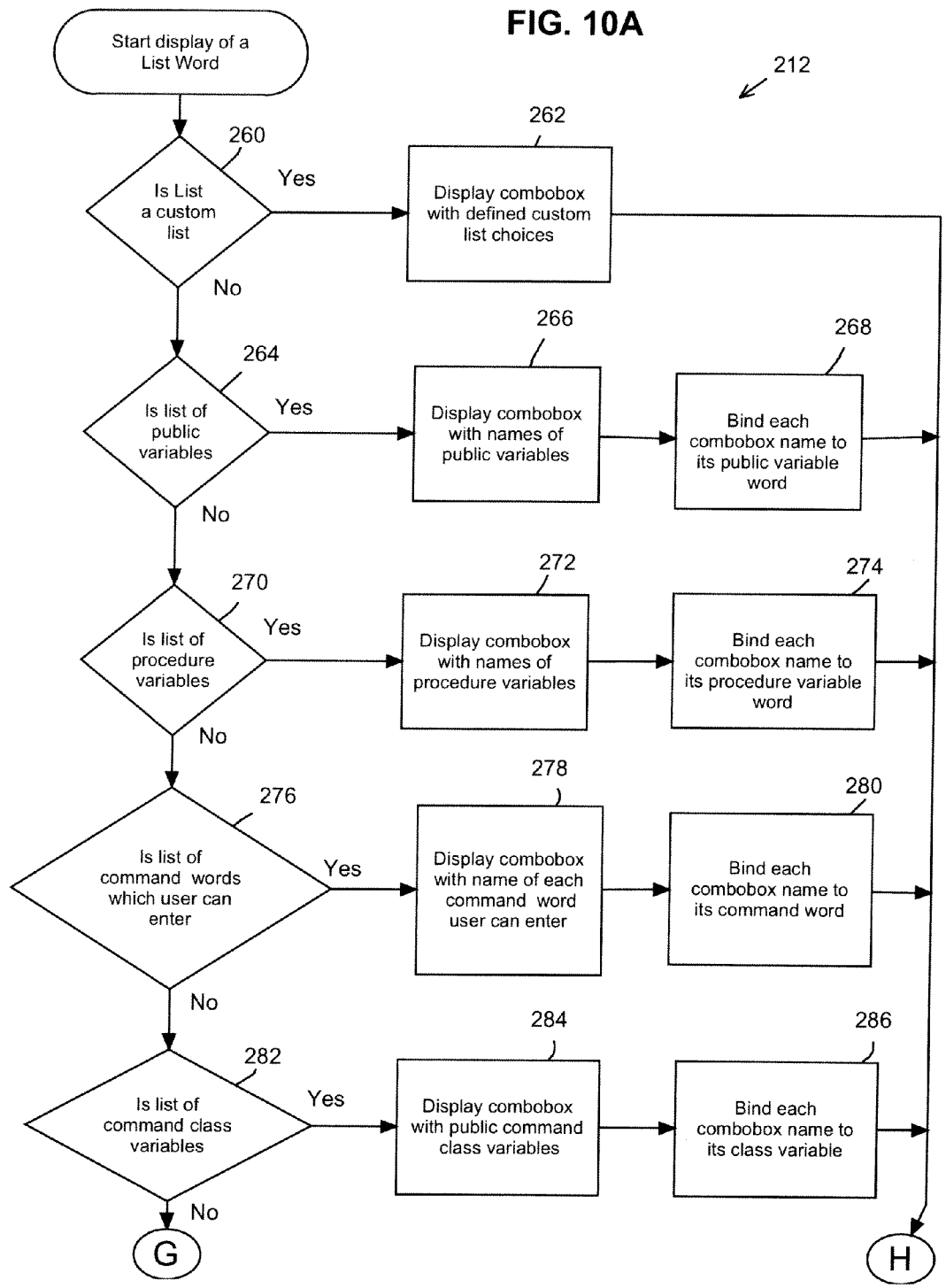
FIG. 10 is a flow diagram of a list word display process as shown schematically in FIG. 8.

FIG. 10 is a flow diagram depicting an example of a method for displaying a list word in a command form 212, shown schematically in FIG. 8. The list word display process 212 may be used to display each list word of a command sentence or sentence fragment in the command entry frame 1012 of the command form. List words may be defined according to many different list types, including custom lists, public variable lists, procedural variable lists, enterable command word lists, command class variable lists, procedure class variable lists, procedure return variable lists, system or application object lists, etc.

The list types of enterable command words, command class variables, procedure class variables, procedure return variables and system of application objects are particularly useful in writing translation procedures. For example, a word has properties which identify or describe the word. The value assigned to an enterable word can be accessed by requesting the properties of the word. The name property of a word is the name of the word as it is shown in the command form. In a command word list all the properties of enterable words are listed as choices in the following format: WORD-NAME-.PROPERTY-NAME, where WORD-NAME is the name of the word and PROPERTY-NAME is the name of its property. For example, a variable word named "total-$" may be represented as a textbox on the command form. The previously entered text value can be retrieved using the value property. In a command enterable word list for the total-$ value, the corresponding choice is: "total-$.value". Of course, it should be understood that there are several other formats for list choices. For example, referring to FIG. 4, the word named "another-condition" has a variable list word representing a first value ("Value 1"). The first value has a value property which is the selected variable list choice. Using this example, the command enterable word list combobox would include the following list choice: "another-condition [1].value1.selection-string", where "[1]" refers to the first occurrence of another-word because another-word is a repeater word. In a translation procedure, the actual selected list choice can be retrieved using the selection-string property as a text string. In the command enterable word list each list choice is bound to its command enterable word for later use for when a list choice is selected.

The list word display process 212 initially displays a list word. If the list is a custom list as determined at block 260, the custom list is displayed as a combo list box at block 262. Each choice within the combo list box is a string of words as defined for each word.

If the list is a list of public variables as determined at block 264 a list of public variables is displayed as a combo list box at block 266. The list choices of the public variable list is the name of each public variable as declared by the user in the public variable table. Each list choice, that is each variable name, is bound to the variable structure declared in the public variable table at block 268, such that the selection of a public variable name from the list choices is associated with the table variable.

If the list is a list of procedure variables as determined at block 270, a list of procedure variables is displayed as a combobox at block 272. The list choices of the public variable list is the name of each procedure variable declared by the user in the procedure variable table. Each list choice, that is each procedure variable name, is bound to the variable declared in the procedure variable table at block 274 such that the selection of a procedure variable name from the list is associated with the table variable.

If the list is a list of command words in the user coded command sentence as determined at block 276, a list of enterable words is displayed at block 278 to access the words and their assigned values. Like other lists, the names of the enterable words are displayed in a combo box at block 280, and each list choice is bound to the variable word that it represents.

If the list is a list of command class variables as determined at block 282, then the public command class variables are displayed in a combobox at block 284 and are bound to the class variable each represents at block 286. The command written in the command form is represented as a class. Some class variables are exposed in the command class variables list, which is represented as a pull down combo list box. Each variable is represented in the list by its properties. All the properties of exposed variables are listed as list choices in the following format: VARIABLE-NAME.PROPERTY-NAME, where VARIABLE-NAME is the name of the command class variable and PROPERTY-NAME is the name of the variable property. For example, if a command class has a version # variable, a translation procedure can obtain the version # by selecting the list choice "version Number.value" from the command class variable list. Each list choice is bound to its class variable for later use if selected.

If the list is a list of procedure class variables as determined at block 288, then the public procedure class variables are displayed in a combobox at block 290 and are bound to the procedure class variable each represents at block 292. The previously written procedure is represented as a class. Some class variables are exposed in the procedure class list of variables, which is represented as a pull down combobox. Each variable is represented in the list by its properties. All the properties of exposed variables are listed as choices in the following format: VARIABLE-NAME.PROPERTY-NAME, where VARIABLE-NAME is the name of the procedure class variable and PROPERTY-NAME is the name of the variable property. For example, if a procedure class has a version # variable, a translation procedure can obtain the version # by selecting the list choice "versionNumber.value" from the procedure class variable list. Each list choice is bound to its class variable for later use if selected.

If the list is a list of procedure return variables as determined at block 294, then the procedure return variable names are displayed in a combobox at block 296 and are bound to the class variable each represents at block 298.

If the list is a list of system or application objects as determined at block 300, the list is displayed as a combobox at block 302, where each choice is the name of the object. For example, a system object list may be a printer list, and the combobox lists each printer name. An application object list is a list of any type of object created by an application program. At block 304, each list choice is bound to its class. In particular, each combo list box choice is bound to the related application object or, in the case of a system object, the choice is bound to an object created by the invention to represent the system object.

After binding at any of blocks 268, 274, 280, 286, 292, 298 or 304, if a list selection is made as determined at block 306, the selection is selected in the list at block 308. After the list is fully displayed, its display is bound to the list word at block 310 so selections can be saved. In the examples given above, all forms of lists are represented as a dropdown combobox.

Figure 11:
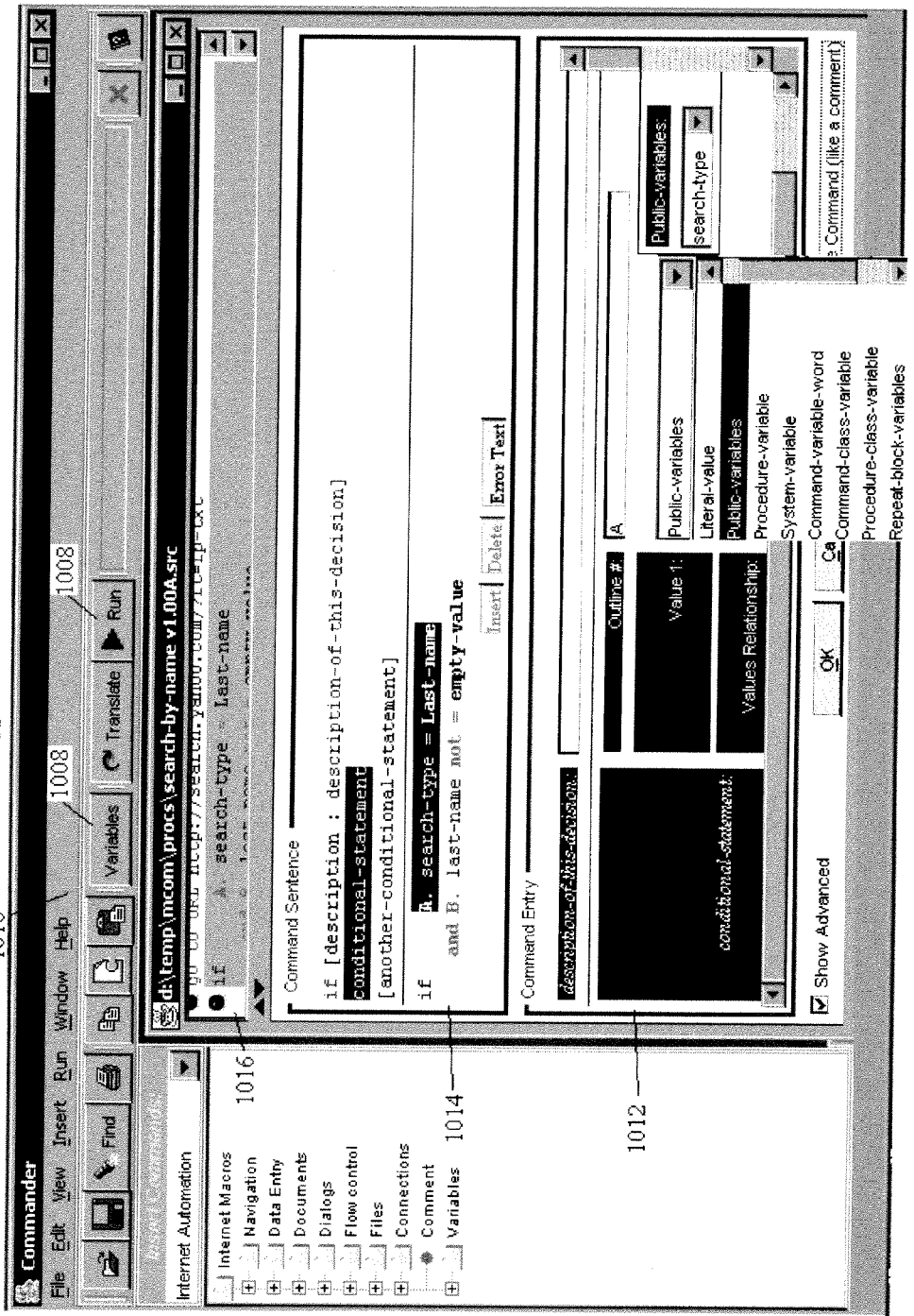
FIG. 11 is an exemplary depiction of a display of a command form that may be displayed by a graphical user interface when entering a variable list word during the condition word display process of FIG. 12.

FIG. 11 is another exemplary depiction of a display showing a command form for modifying condition words of a command with a variable list screen which may be displayed during the command form display process 218 described below. As previously explained, a condition word includes two values having a logical relationship. The first condition word ("a-condition") in the command sentence frame 1014 is defined as required because at least one condition is necessary. The second condition word ("another-condition") is defined as optional and repeatable. Each value is a represented by a variable list in the command entry frame 1024. In one example, the variable list choices representing the first or second values include a literal string entry as well as references to all lists of variables (for example, a public variable list) from which a value is retrieved. The variable list for the first and second values are displayed according to the variable list word display process 206 of FIG. 9. In addition, condition words may be grouped by an outline number.

Condition words numbered A2*a* and A2*b* in the command sentence frame 1014 are related by an "or" so either one may be true for all of outline head A2 to be true. Outline head A2 is related to head number A1 by an "and" so both head A1 and A2 must be true for the condition sentence to be true. Each condition word in the command, regardless of the number of repeater words, is tested during translation to determine if it is true. If all condition words are true, the condition sentence is true.

Figure 12A:
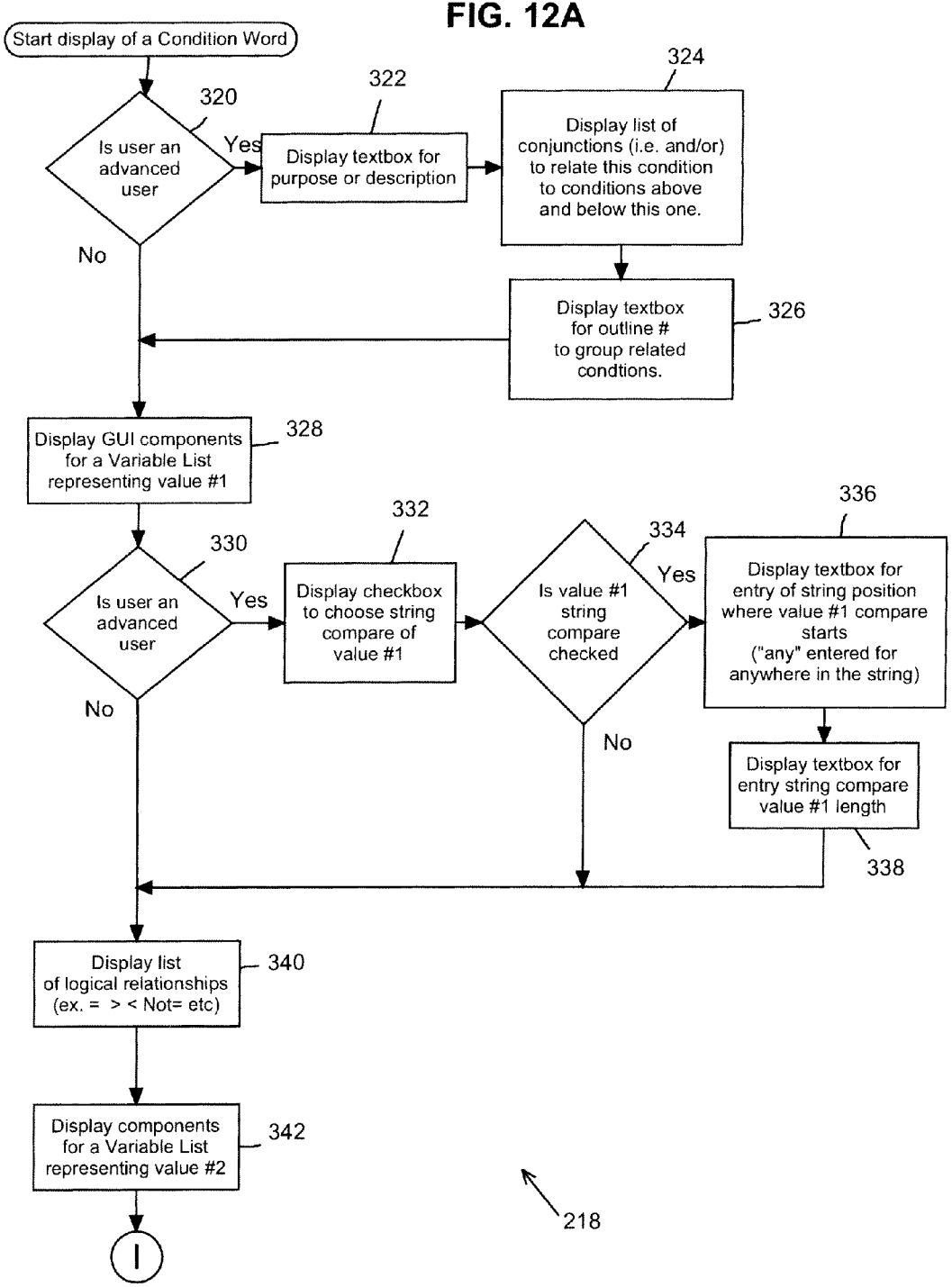
FIG. 12 is a flow diagram of a condition word display process as shown schematically in FIG. 8.
Figure 12B:
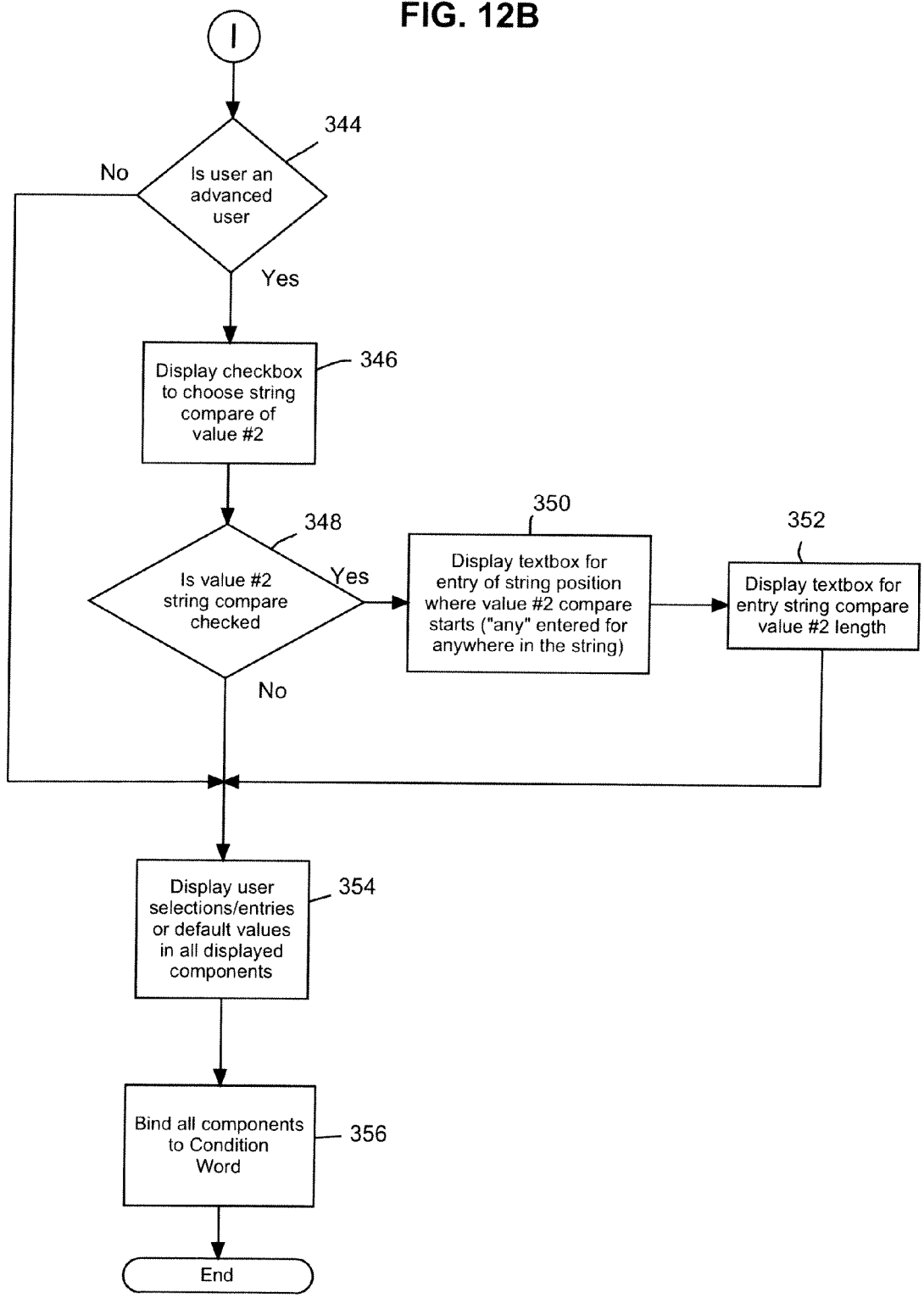

FIG. 12 is a flow diagram depicting an example of a method for displaying a condition word, including repeater condition words, in a command form 218, shown schematically in FIG. 8. The condition word display process 218 may be used to display each condition word of a command sentence or sentence fragment in the command entry frame 1012 of the command form through the use of a set of components referred to as repeatable condition components. A condition word is usually part of a condition sentence. A conditional sentence has a key command word such as "if" followed by one or more condition words. While "if" is a constant word, the condition words are enterable words and may be repeatable as need to state the full conditions of the command sentence. An example of a display of condition words is shown in FIG. 11 above.

Referring to FIG. 12, in order to simplify coding with condition words for basic users, the condition word display process 218 determines whether the user is configured as an advanced user at block 320 based on a user profile. As such, only advanced users may insert the repeater word, named "another-condition", whereas basic users are allowed to see, but not modify, the required condition word. Some GUI components are therefore not displayed to basic users. For example, the textbox for entry of an optional comment to describe the purpose or meaning of the condition word is only displayed for advanced users at block 322.

If the repeatable "another-condition" word is visible, each condition word is related by a conjunction such that its relationship to other conditions is clear. For example, a condition sentence with the required condition word and one instance of the repeatable condition word will be related with an "and" or "or" conjunction. The conjunctions are displayed at block 324, and are represented on the command form by a GUI list with list choices such as "and", "or". The conjunction is used during translation to determine if all conditions must be true for the condition sentence to be true. Further for advanced users, an outline number is entered in a textbox at block 326 to further designate the relationship of condition words.

In displaying the condition word, at least a first and a second value are displayed. At block 328, GUI components are displayed for a variable list representing the first value ("Value 1"). If the user is an advanced user, as determined again at block 330, a checkbox is displayed at block 332 to choose a string compare of the first value. If the first value string compare is checked, as determined at block 334, the textbox for entry of the position in the string where the compare starts is displayed at block 336. The start compare position may be specified (e.g., as a number) or entered as "Any" which means the compare value may be anywhere within the first value. The textbox for the entry string compare of the first value length is displayed at block 338.

In order to relate the two values of a condition words, a logical relationship of the two values is selected. The condition word display process 218 presents the logical relationship as a list with list items: equal, greater than, less than, not equal and so on at block 340. If a relationship has already been selected from the list, the list is displayed with the selection.

At block 342, GUI components are displayed for a variable list representing the second value ("Value 2"). As with the first value, if the user is an advanced user, as determined again at block 344, a checkbox is displayed at block 346 to choose a string compare of the second value. If the second value string compared is checked, as determined at block 348, the textbox for entry of the position in the string where the compare starts is displayed at block 350. The start compare position made be specified or entered as "Any" which means the compare value may be anywhere within the second value. The textbox for the entry string compare of the second value length is displayed at block 352.

Based on the above, advanced users may configure the relationship between the first and second values as a string comparison, such that both values are strings and any part of either string may be designated for the comparison. For example, the first value is entered as a literal value "John Henry" and the second value is a procedure variable with value "Henry". The two values are related with logical relationship equal. In this example, the first value start compare position is 6 and the second value start position is 1. The comparison will find the strings equal because only sub-string "Henry" within string 1 is used in the comparison. If a start position is not specified but rather entered as "any", the condition would be still true because "Henry" is contained within first value.

All GUI components on the command form are bound to the condition word at block 356 such that any interaction with the GUI components is saved within the condition word for validation and redisplay within the command sentence.

Figure 13:
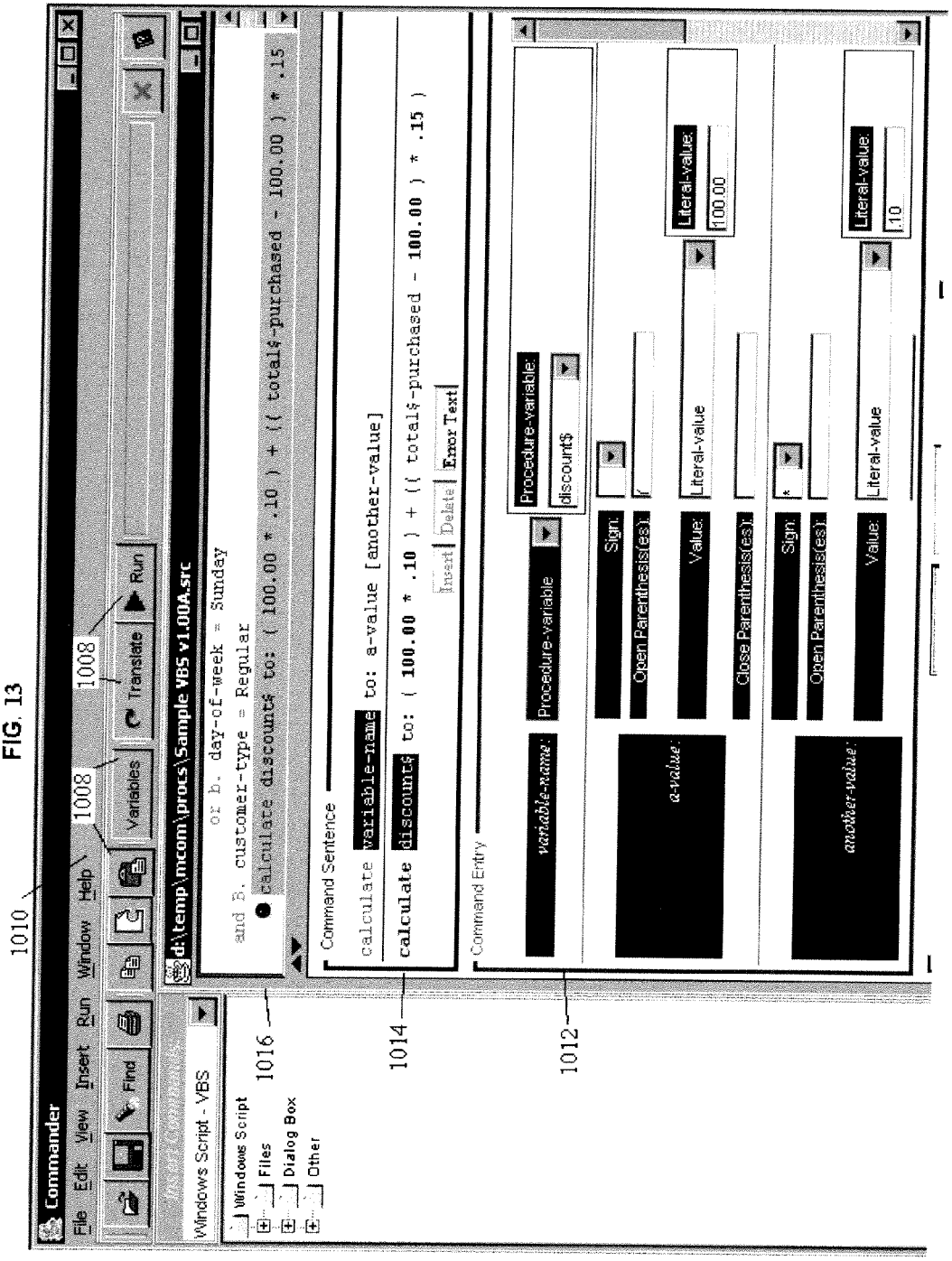
FIG. 13 is an exemplary depiction of a display that may be displayed by a graphical user interface when editing of a mathematical word in a compound formula screen during the mathematical word display process of FIG. 14.

FIG. 13 is an exemplary depiction of a display representing the display of mathematical words in a command form during performance of the enterable words display process shown schematically in FIG. 8 and may be displayed during the mathematical word display process 224 described below. In particular, FIG. 13 depicts the calculation of a discount of 10% on first $100 and 15% above $100. As illustrated in FIG. 13, the command form includes two sections or frames: a command sentence frame 1014 and a command entry frame 1012. A scrollable display frame 1016 may be further provided. Data is inputted into the appropriate input entry components, represented as GUI components, located within the command entry frame 1012 to create a mathematical word in a compound formula in the display frame 1016. Function buttons 1008 and a function bar 1010, similar to those of FIG. 2, are also provided.

Figure 14:
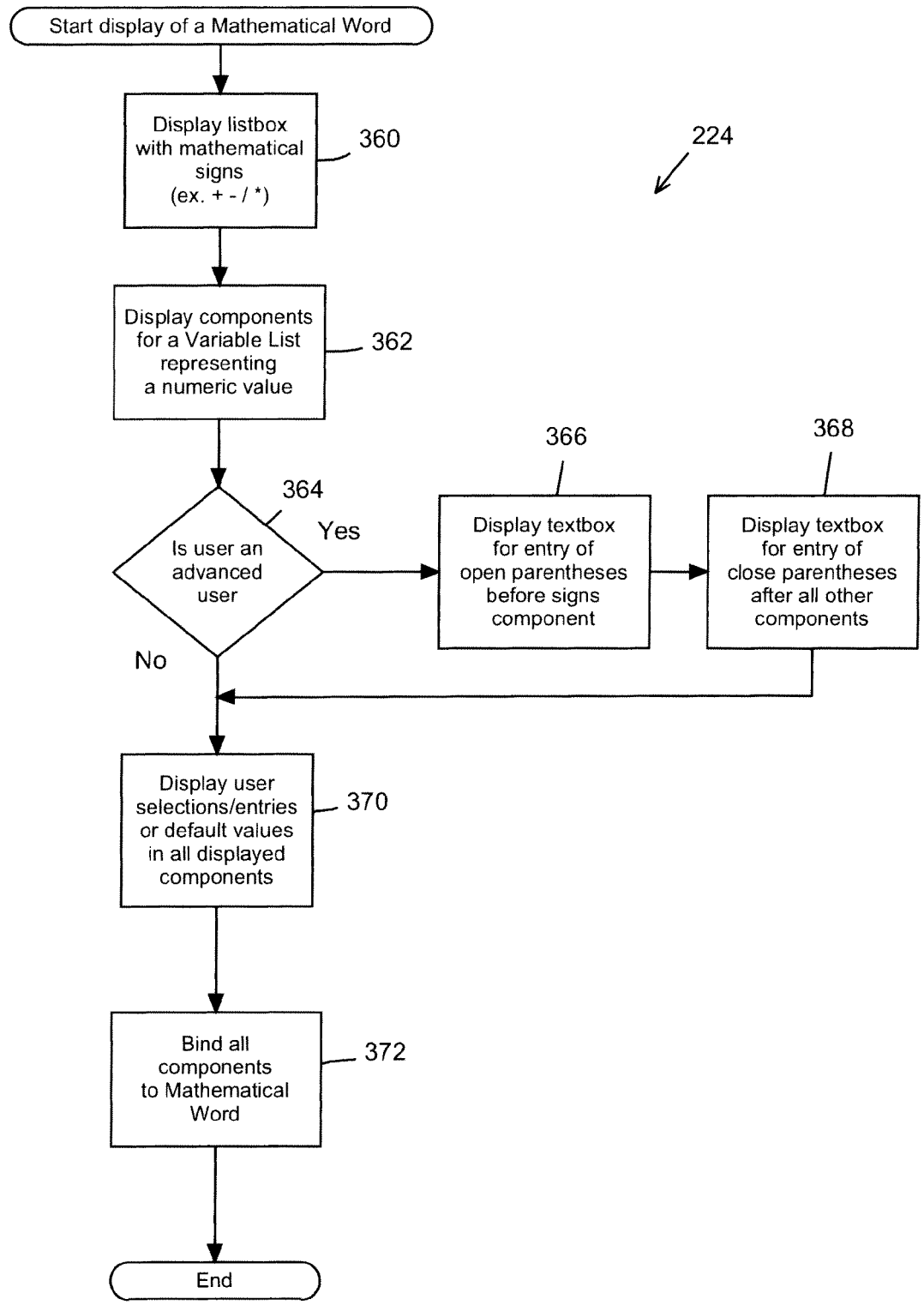
FIG. 14 is a flow diagram of a mathematical word display process as shown schematically in FIG. 8.

FIG. 14 is a flow diagram depicting an example of a method for displaying a mathematical word, including repeater mathematical words, in a command form 224, shown schematically in FIG. 8. The mathematical word display process 224 may be used to display each mathematical word of a command sentence or sentence fragment in the command entry frame 1012 of the command form. As explained above, a mathematical word encapsulates a numeric value in any numeric format (such as integer, float, double, decimal, currency, etc.) and a numerical operator (such as +,−,*,/ for divide).

The mathematical word display process 224 begins the display of a mathematical word. Because the operator precedes the value for the mathematical word, a listbox of operators is displayed at block 360, followed by a numerical value displayed at block 362. The numeric value is represented by a variable list with variable list choices. The variable list may include different forms of lists, such as a public variable list or a local variable list, for example, and the variable list choices may include a literal string.

In order to limit coding with mathematical words to advanced users, the mathematical word display process 224 determines whether the user is configured as an advanced users at block 364 based on a user profile. As such, only advanced users may group mathematical words into compound formulas as shown in FIG. 13, whereas basic users are allowed to see, but not modify, such formulas. Some GUI components are therefore not displayed to basic users. Mathematical words may be grouped into compound formulas when the mathematical word is defined as a repeater word, thereby allowing insertion of as many words as needed to express the formula.

If literal string is selected from a variable list representing the numeric value, a textbox is displayed where the numeric value can be entered at block 366. Mathematical words can be grouped by entering parentheses. Open parenthesis at the start of a group are entered into the open parentheses textbox at block 366 and closed parentheses at the end of the group are entered into the close parentheses textbox at block 368. The numeric value may have a leading + or − sign. The numeric value, if already entered, populates the textbox at block 370. If a list of variables is selected in the numeric value variable list, a pull-down list of variables names belonging to the selected list is displayed from which a numeric variable can be selected as the mathematical word numeric value. The sign, if already selected, is selected in the signs listbox. After making the preferred changes, all components are bound to the mathematical word at block 372.

Figure 15:
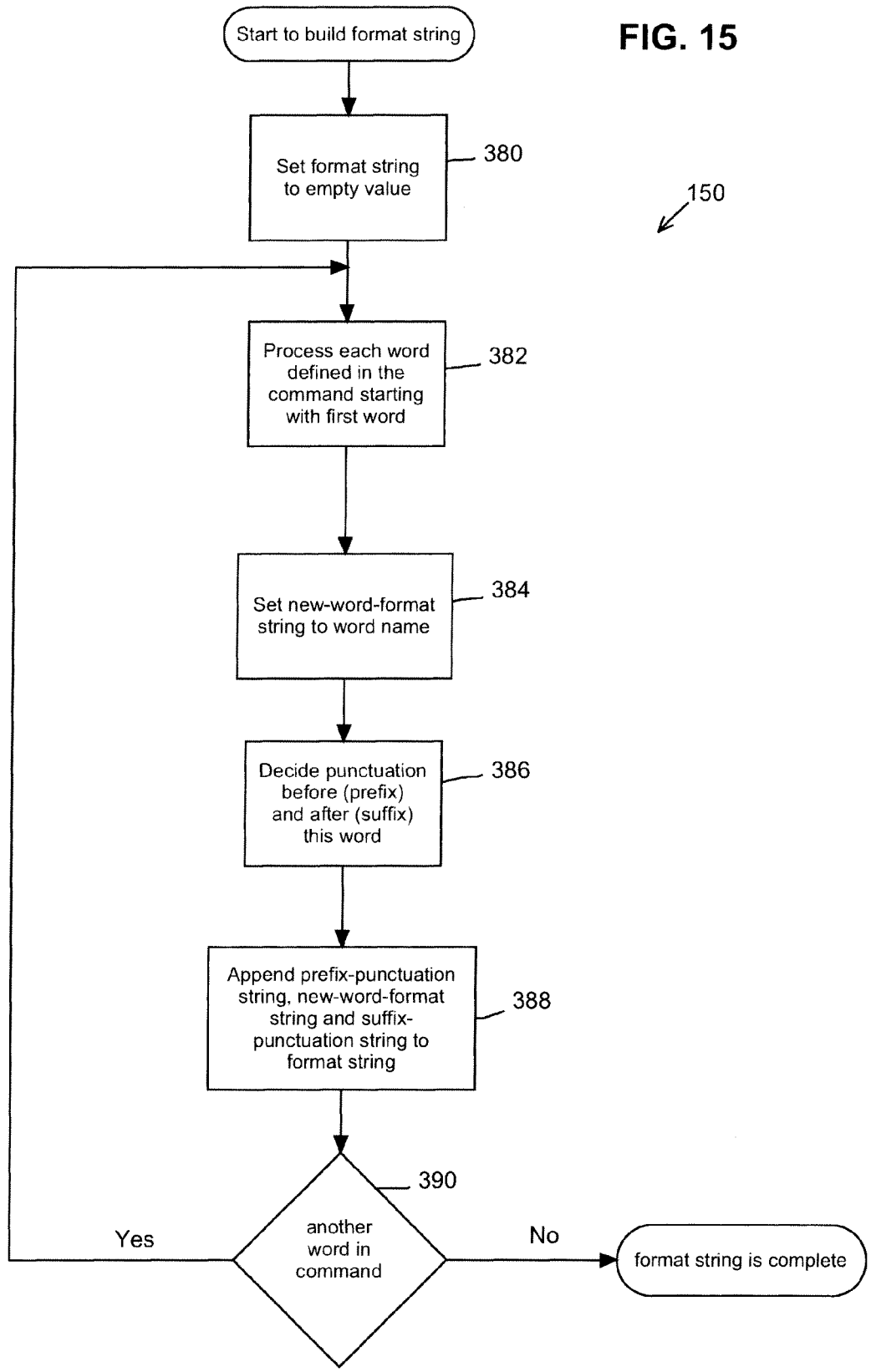
FIG. 15 is a flow diagram of a display process for displaying command definition words in a command format sentence as shown schematically in FIG. 5.

FIG. 15 is a flow diagram depicting an example of a method for displaying words in a command definition within a command format, which may be performed during block 150 as shown schematically in FIG. 5. In order to begin building the format string, the string in which the command format will be stored is set to an empty value at block 380. Next, each word in the defined command, starting with the first word, is converted to a string at block 382. The string representation of a word is its name which is saved in a new-word format string at block 384. Punctuation may be used before and after the word name, as determined at block 386. Punctuation preceding the word name is the prefix-punctuation and includes any punctuation as defined for the word. The prefix-punctuation is saved in a field called the prefix-punctuation field. Punctuation following the word name is the suffix-punctuation which is saved in a suffix-punctuation field at block 388. If no punctuation has been defined and the word is not the first word in the format sentence, a space is added to break out the previous word.

The prefix-punctuation string includes an opening bracket (e.g., "[") if the word as defined is an optional word. Furthermore, the word may begin one or more optional phrases, in which case an opening bracket ("[") is added to the start of the prefix-punctuation string for each optional phrase initiated by the word.

The suffix-punctuation includes closing brackets which represent the end of an optional word or phrase. If the word is defined as an optional word a closing bracket (e.g., "]") is added to the suffix-punctuation string. If the word ends an optional phrase(s) a closing bracket ("]") is added for each optional phrase ended by the word. Finally, a new-line character is appended to the suffix punctuation string, if the word is defined as the last word on a line.

The three strings, prefix-punctuation string, new-word-format string and suffix-punctuation string are concatenated in that order to form the string representing the word. Each word in the command is processed and its concatenated string is appended to the format string at block 388 until all words in the command are represented in the format definition. If another word in the command is to be added, as determined at block 390, the process repeats.

Figure 16:
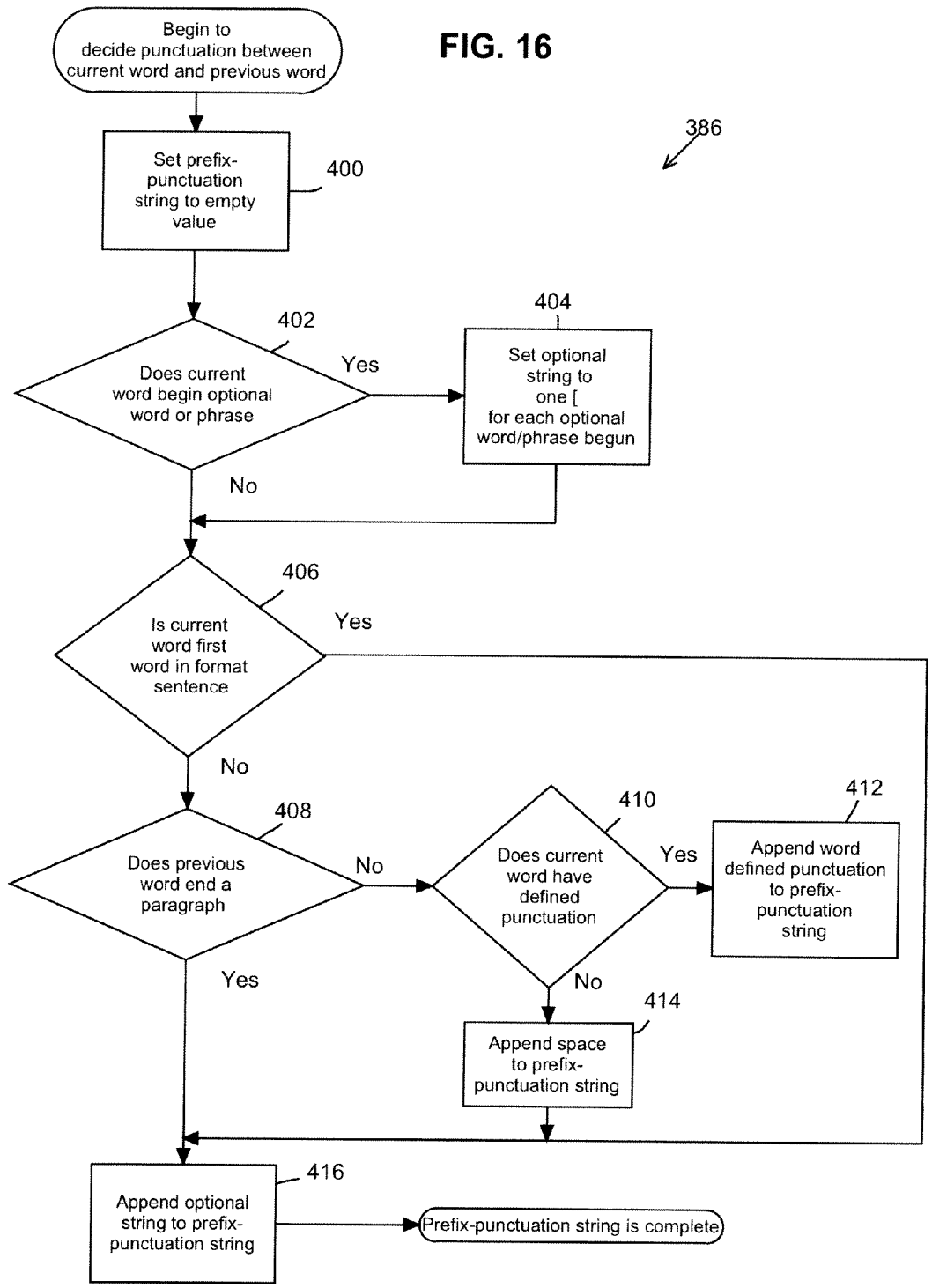
FIG. 16 is a flow diagram of a process for determining punctuation before a word in a command format as shown schematically in FIG. 15.

FIG. 16 is a flow diagram depicting an example of a method for determining the punctuation before a word in a command format, shown schematically in FIG. 15. As such, the process of FIG. 16 may be performed at block 386 of FIG. 15. The process 386 for a prefix-punctuation begins to decide on the punctuation between a current word being defined and a previous word.

At block 400, the prefix-punctuation string is set to an empty value. If the current word begins an optional word or phrase, as determined at block 402, the optional string is set to one opening bracket ("[") at block 404 for each optional word/phrase begun. At block 406, the process 386 determines whether the current word is the first word in format sentence. If not, the process 386 determines whether the previous word ends a paragraph at block 408.

If the previous word does not end a paragraph as determined at block 408, then the process 386 determines whether the current word has defined punctuation at block 410. If so, the word defined punctuation is appended to a prefix-punctuation string at block 412. Otherwise, the process 386 appends a space to prefix-punctuation string at block 414. If an optional string exists from block 404, the optional string is appended to the prefix-punctuation string at block 416, and the prefix-punctuation string is completed.

Figure 17:
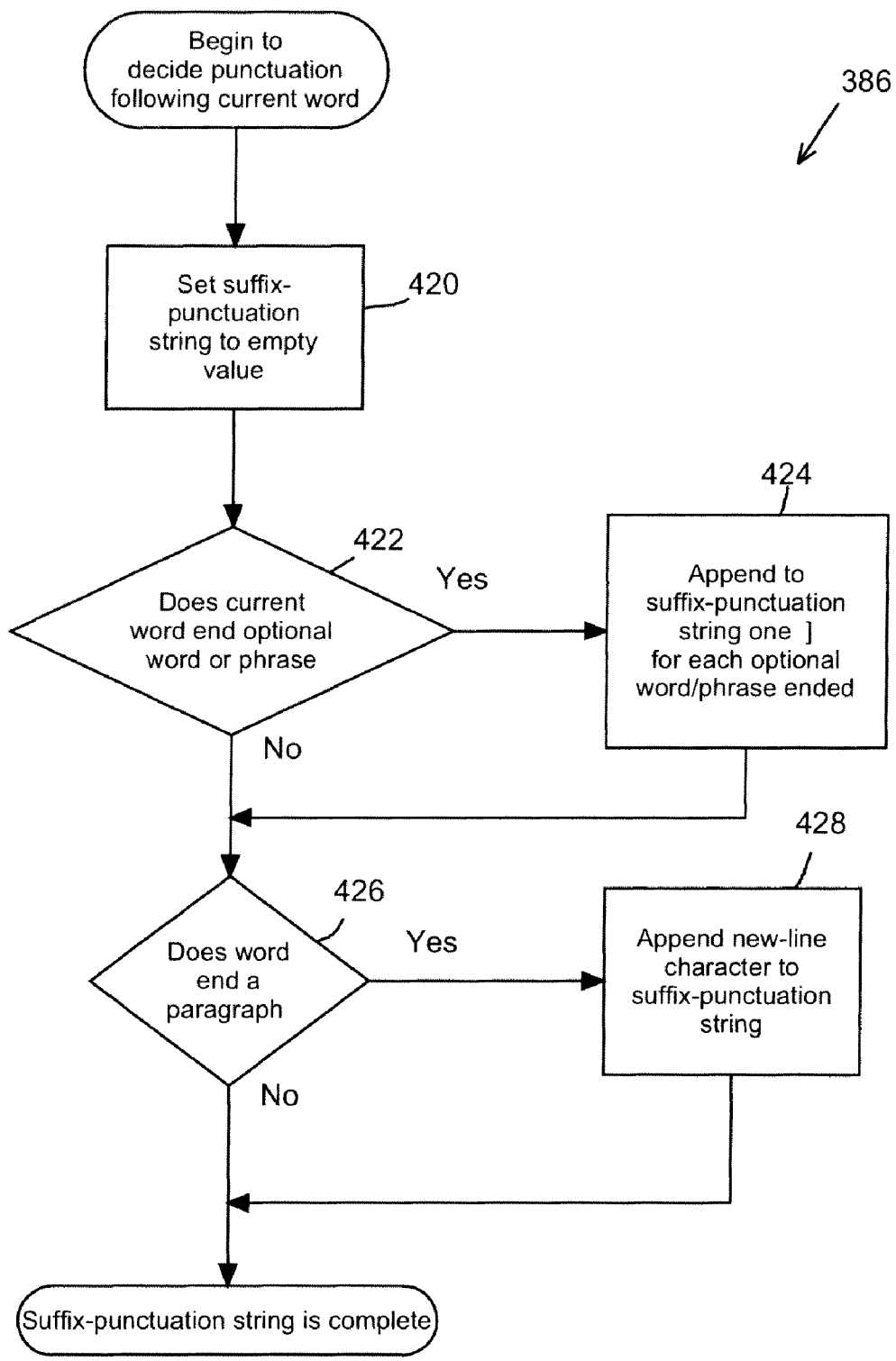
FIG. 17 is a flow diagram of a process for determining punctuation after a word in a command format as shown schematically in FIG. 15.

FIG. 17 is a flow diagram depicting an example of a method for determining the punctuation after a word command format, shown schematically in FIG. 15. The process depicted in FIG. 17 is similar to that of FIG. 16 for determining punctuation before a word command format and may be performed at block 386 of FIG. 15. The process 386 for a suffix-punctuation begins to decide on the punctuation following a current word being defined.

At block 420, the suffix-punctuation string is set to an empty value. If the current word is an optional word or ends an optional phrase, as determined at block 422, the suffix-punctuation string is appended to a closing bracket ("]") at block 424 for each optional word/phrase ended. Otherwise, block 426 determines whether the word ends a paragraph. If so, the new-line character is appended to the suffix-punctuation string at block 428 and the process 386 completes the suffix-punctuation string. If the word does not end a paragraph, the suffix punctuation string is completed.

Figure 18A:
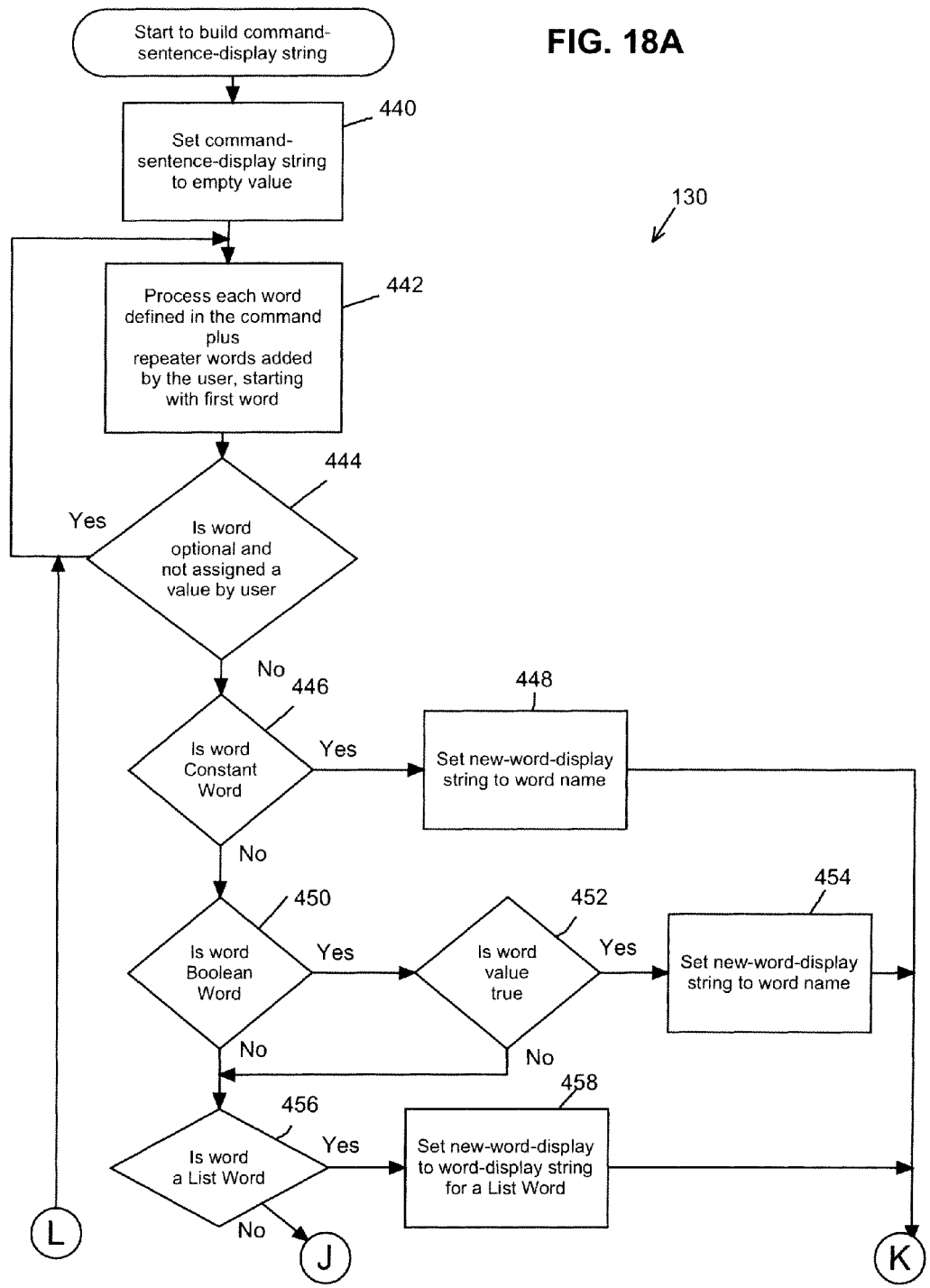
FIG. 18 is a flow diagram of a command sentence display process as shown schematically in FIG. 3.

FIG. 18 is a flow diagram depicting an example of a method for representing the assigned values entered in a command form as a command sentence, which may be performed during block 130 as shown schematically in FIG. 3. The process depicted in FIG. 18 may also be used to represent the command form as a command sentence within the procedure editing process 30 scrollable text area. Using the process depicted in FIG. 18, the command sentence is constructed one word at a time in a string buffer called the command-sentence-display string. Each word in the command, including any repeater words, is converted to a string starting with the first word in the sentence. Optional words that have not been assigned a value are bypassed because they will not be displayed in the command sentence. As will be explained, new-word display strings are created and set to a word display for each different type of word and contains the respective word representations. The word display is dependent on the type of word as defined.

Beginning at block 440, the command-sentence-display string to is set to an empty value. Each word defined in the command, including repeater words, is processed starting with the first word at block 442. If the word is not an optional word and not assigned a value, as determined at block 444, then the process 130 determines whether the word is a constant word at block 446. If so, the new-word-display string is set to a word name at block 448. A word defined as a constant, as determined at block 446, is rendered in the display by its defined word name only. The defined word name for a constant word is the same as the word representation in the command format.

A word defined as a Boolean, as determined at block 450, with an entered value of true (or yes), as determined at block 452, is set to its word defined name at block 454 and displayed by its word defined name. If not assigned a value of true (or yes), a Boolean is not displayed in the command sentence.

A word defined as a list word, as determined at block 456, is represented by a new-word-display string which is set to a word-display string for the list word at block 458. Because there are multiple types of list words, as explained above, different list word display methods may be used, as explained further below.

A word defined as a variable list word, as determined at block 460, is represented by a new-word-string which is set to a word display string for the variable list word at block 462. The word-display string for a variable list word depends on the definition of the words within the list selection. As such, different variable list display methods may be used, as explained further below.

A word defined as a mathematical word, as determined at block 464, causes a new-word-display string to be constructed for the mathematical word, as explained further below. The new-word-display string for the mathematical word is set to a word-display for the mathematical word at block 466.

A word defined as a variable word, as determined at block 468, causes a new-word-display string to be constructed for the variable word, as explained further below. A variable word may be a word having an alpha or numeric value assigned via a textbox. The new-word-display string for the variable word is set to a word-display for the variable word at block 470.

A word defined as a condition word, as determined at block 472, is displayed in the command sentence as explained further below, and the value of the new-word-display string is set to a word-display for the condition word at block 474.

When the new-word-display string is set for the current word at any of blocks 454, 462, 466, 470 and 474, the new-word-display string is combined with punctuation at block 476. The combined word display and punctuation are appended to the command sentence display at block 478. If there is another word in the command, as determined at block 480, the process is repeated. If there are no further words in the command, the display of the command sentence is completed.

Figure 19:
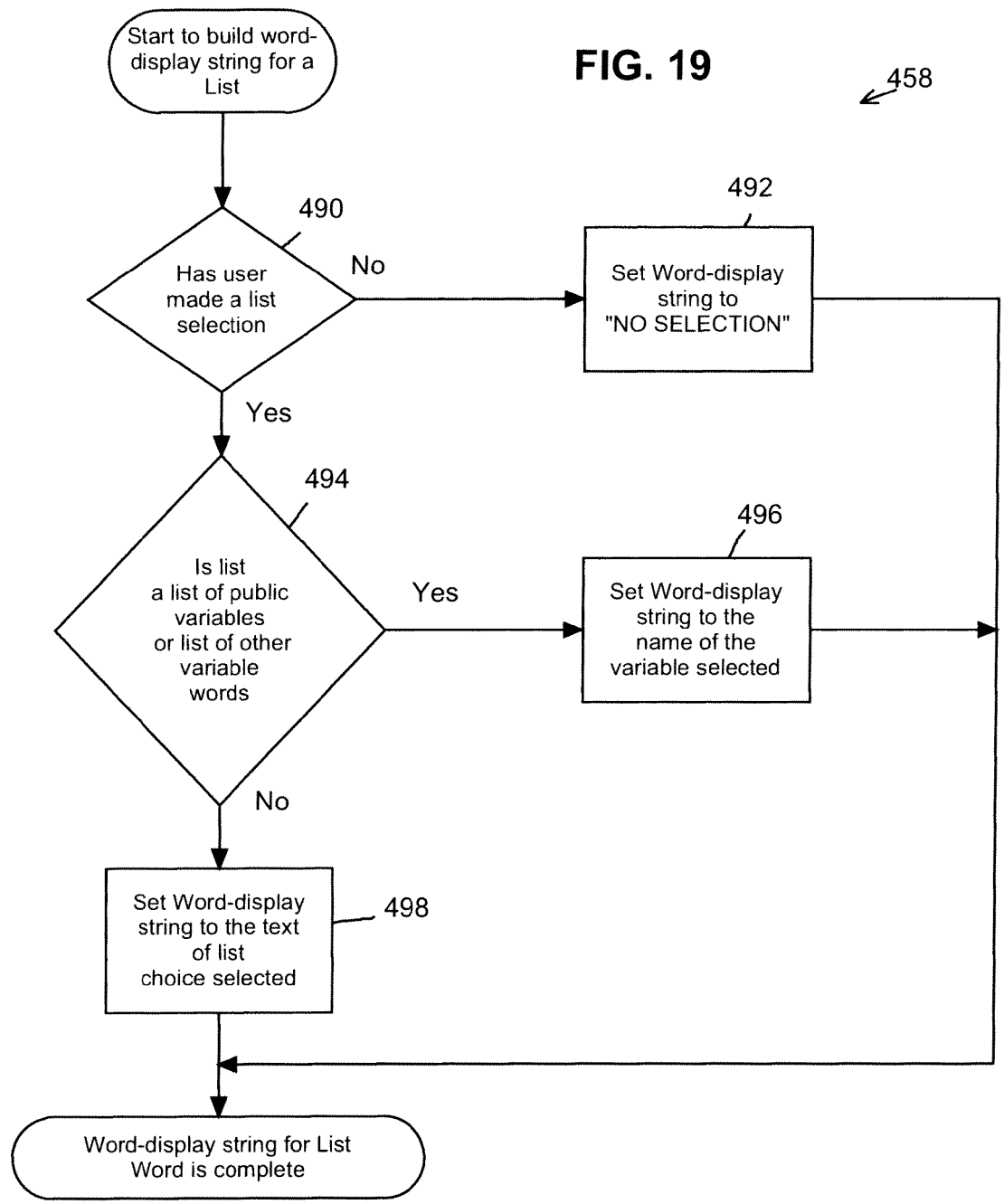
FIG. 19 is a flow diagram of a process for displaying a list word in a command sentence display as shown schematically in FIG. 18.

FIG. 19 is a flow diagram depicting an example of a method of displaying a list word in a command sentence display string 458, shown schematically in FIG. 18. The list word display string process 458 results in a new-word-display string representing the list word. Regardless of the list type, if a selection has not yet been made from the list, as determined at block 490, the word-display string for the list is "No-Selection" as set at block 492. If the list is a list of variables as determined at block 494, such as a public variable list, a procedure variable list or a list of command enterable words, the name of the variable selected from the list becomes the word-display string for the list at block 496. For all other types of lists the word-display string is set at block 498 to the list choice that was selected (i.e. the words of the list selection chosen).

Figure 20:
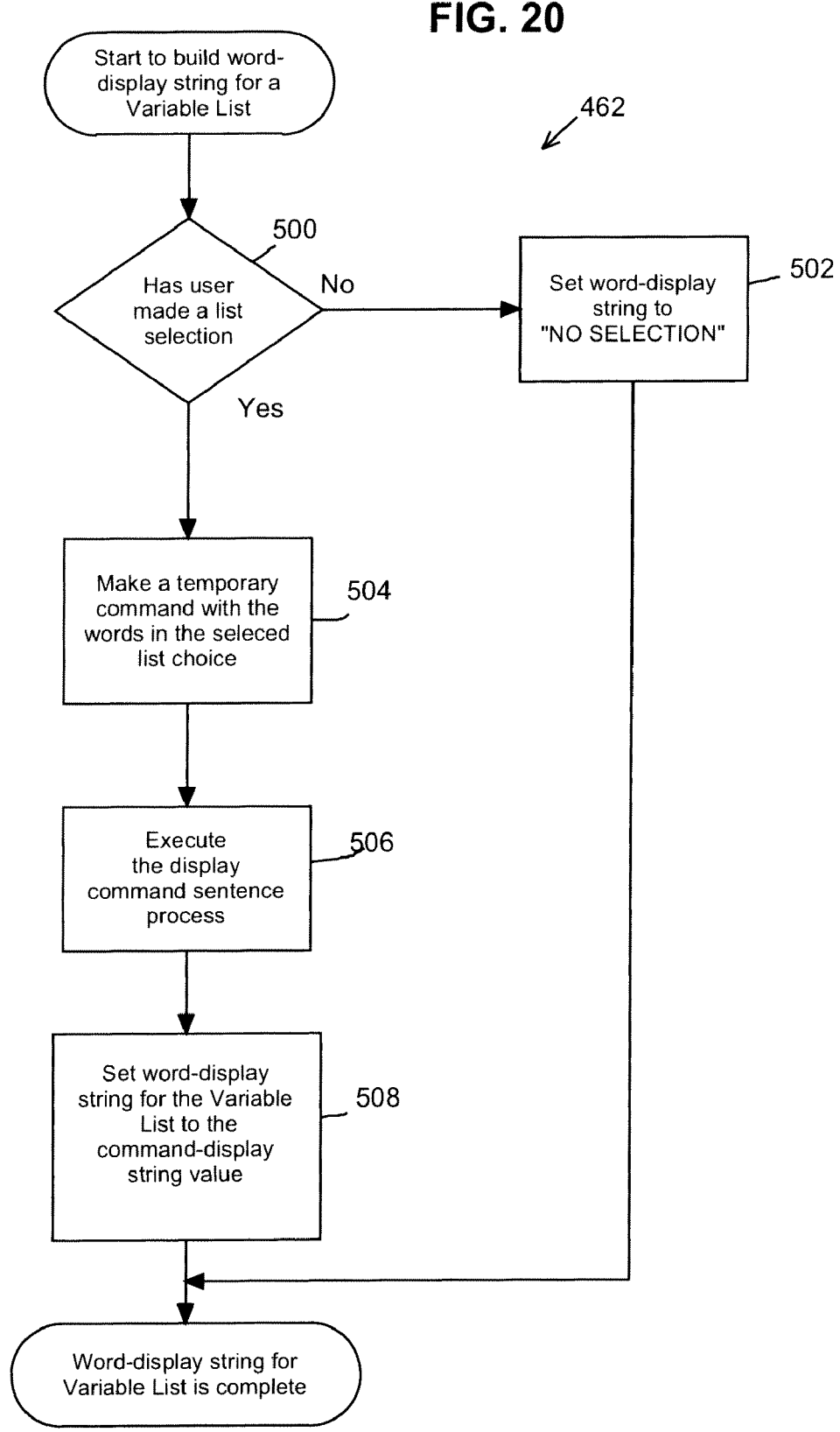
FIG. 20 is a flow diagram of a process for displaying a variable list word in a command sentence display as shown schematically in FIG. 18.

FIG. 20 is a flow diagram depicting an example of a method of displaying a variable list word in a command sentence display string 462, shown schematically in FIG. 18. The variable list word display string process 462 results in a new-word-display string representing the variable list word. If a selection has not yet been made from the list, as determined at block 500, the word-display string for the list is "No-Selection" as set at block 502. When a selection is made, each word in the selected variable list choice is converted to its string representation. With variable list choices, some words will be constant words while others may be variable words. Because a variable list choice may be similar to a command, a temporary command corresponding to the selected variable list choice may be created at block 504. The word-display string for a variable list is set by building a temporary command sentence. For example, if a variable word is embedded in the selected variable list choice, it is represented in the display string by executing the display command sentence process of FIG. 18 at block 506. Likewise, the same methods applied to any form of defined word in a command can be applied to the words defined in the selected choice. The result of processing each word in the variable list selection is placed in the word-display string for a variable list at block 508 and the selection is represented in the command sentence.

Figure 21:
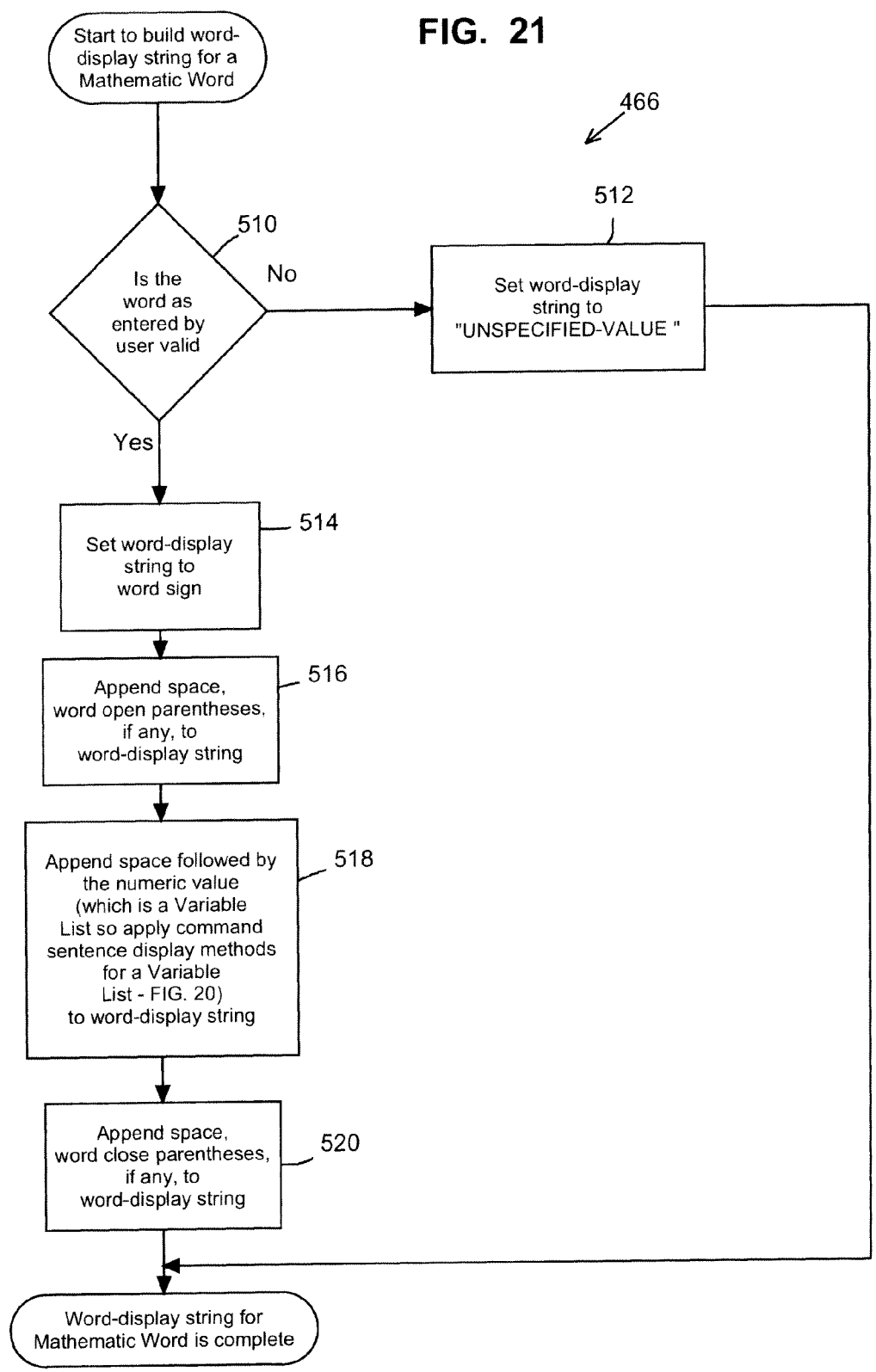
FIG. 21 is a flow diagram of a process for displaying a mathematical word in a command sentence display as shown schematically in FIG. 18.

FIG. 21 is a flow diagram depicting an example of a method of displaying a mathematical word in a command sentence display string 466, shown schematically in FIG. 18. The mathematical word display string process 466 results in a new-word-display string representing the mathematical word. The entry of a mathematical word has four parts: an operator list (+,−,* for multiply, / for divide), open parentheses textbox, a numeric value represented as a variable list and a close parentheses textbox. If a valid mathematical word has not been entered, as determined at block 510, the mathematical word is displayed as "UNSPECIFIED-VALUE" at block 512. Where the mathematical word is valid, the numeric value is represented by retrieving the value of the variable list.

Because the numerical value is retrieved from a variable list, the mathematical word display string process 466 for retrieving the numerical value is similar to the variable list display string process 462 above, and results in a text string called the word-display string for a mathematical word. A selected operator is set at block 514. A space and any open parentheses is appended to the word-display string at block 516. At block 518, a space and the numeric value as represented in the word-display string for a variable list is appended. As a variable list, the variable list display string process 462 is executed at block 518. A space and any close parentheses is appended to the word-display string at block 520. The full display of the mathematical word is a concatenation of the selected operator followed by a space, any open parentheses followed by a space, the numerical value followed by a space and any close parentheses.

Figure 22:
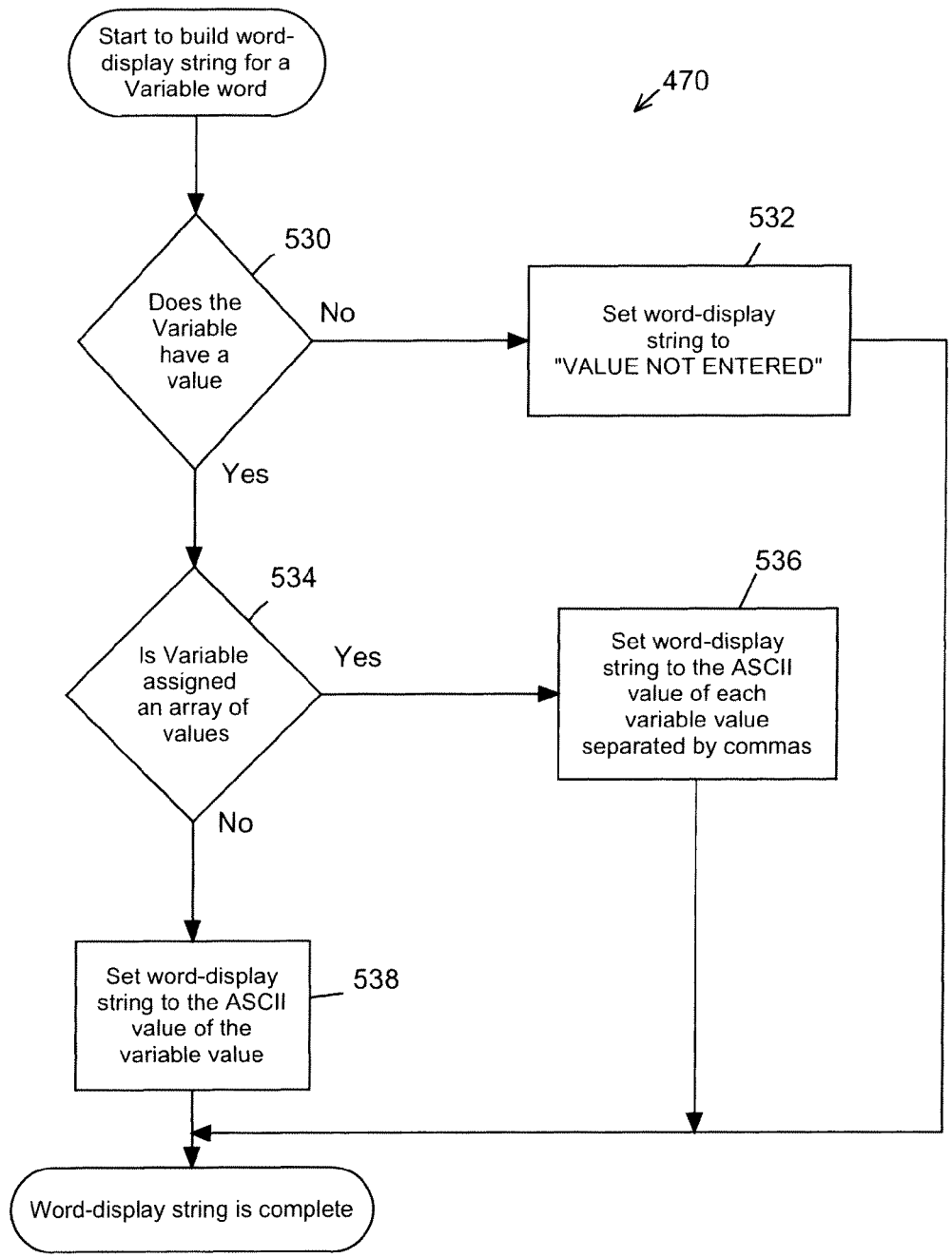
FIG. 22 is a flow diagram of a process for displaying a variable word in a command sentence display as shown schematically in FIG. 18.

FIG. 22 is a flow diagram depicting an example of a method of displaying a variable word in a command sentence display string 470, shown schematically in FIG. 18. The variable word display string process 470 results in a new-word-display string representing the variable word. To start building a word-display string for a variable word, the variable word display string process 470 determines whether the variable has an assigned value at block 530. If not, the word-display string is set to "VALUE NOT ENTERED" at block 532. Otherwise, the variable word display string process determines whether the assigned variable is an array of values at block 534. If the assigned variable is an array of values the word-display string is set to the ASCII value of each variable value separated by commas at block 536. If the assigned variable is not an array of values, the word-display string is set to the ASCII value of the variable value at block 538 before completing the word-display string. As an example, the selected variable may be a string variable named "city" which is represented by a textbox on the command form, with "New York" keyed in the textbox. As such, "New York" becomes the word-display string for the variable word. If there is no entry for the variable word, "VALUE-NOT-ENTERED" is used instead.

Figure 23A:
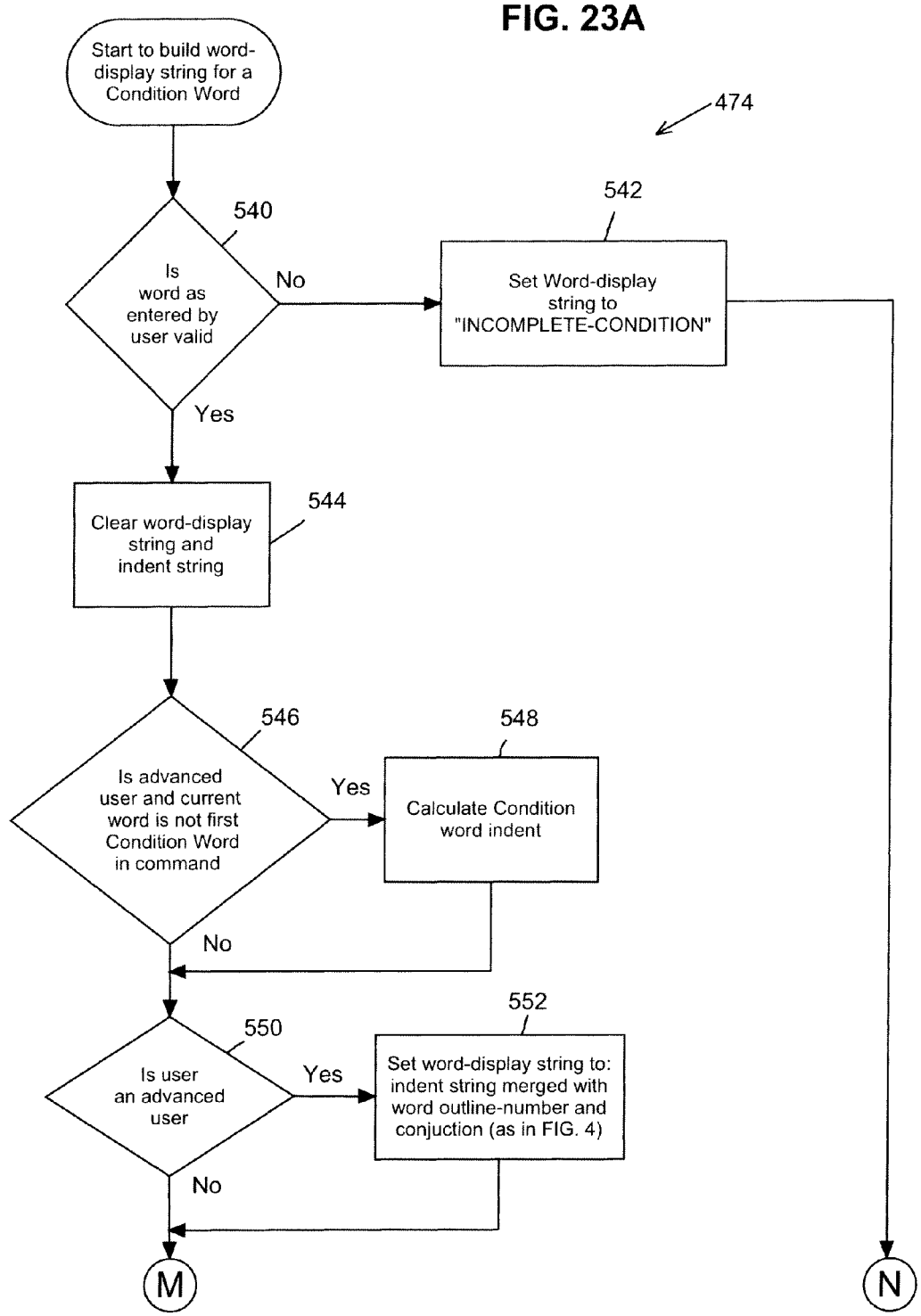
FIG. 23 is a flow diagram of a process for displaying a condition word in a command sentence display as shown schematically in FIG. 18.
Figure 23B:
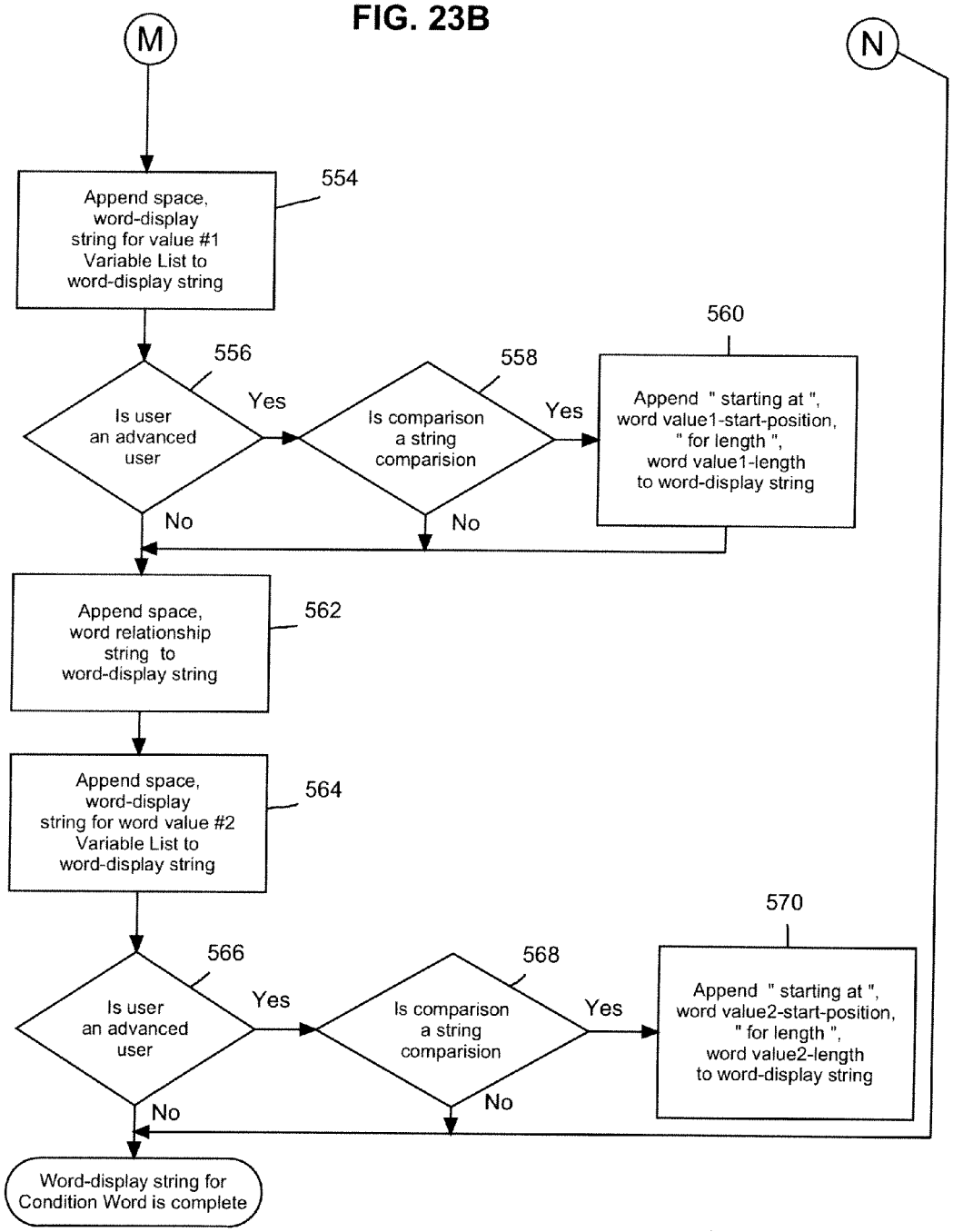

FIG. 23 is a flow diagram depicting an example of a method of displaying a condition word in a command sentence display string 474, shown schematically in FIG. 18. The condition word display string process 474 results in a new-word-display string representing the condition word. The condition word may be a part of a conditional statement comprised of one or more condition words.

To begin building the word-display string for the condition word, the condition word display string process 474 determines at block 540 whether the condition word as entered is valid. If a condition word is not fully entered or has been entered incorrectly, the word is displayed only as "INCOMPLETE-CONDITION" in the command sentence at block 542. If the condition word is valid, the word-display string and indent string are cleared at block 544.

As explained above, advanced users are allowed to form compound conditions. In doing so, an outline number and conjunction are entered for the word, unless the word is the first word in the conditional statement. If an outline number was entered and the word currently being displayed is not the first word in a compound condition as determined at block 546, a left margin indention is determined at block 548. The indention allows for grouped conditions to be more clearly visible to a user. For example in, as seen in FIG. 4, subheadings A1 and A2 are indented farther than the B header. Non-advanced users may only enter one condition, so no indention is required for non-advanced users, whereas indention may be used with advanced users, as determined at block 550.

The word-display string is set to a indent string merged with the word outline number and a conjunction at block 552. As an example, and referring to FIG. 4, the minimum indention for outline number A is 4 spaces, which leaves room in the left margin for the conjunction ("and") along with one space where additional condition words will display a conjunction (e.g., "and B). 5 spaces are appended to the indention string (referred to as "indent-string") for each character in the outline number beyond 1. As a result, the outline number "B1" is assigned 9 spaces to cause the left margin for this word command display text to be indented 9 characters. The first entry in the word-display string for the condition word, if there is an outline number, is a tab so as to cause alignment of all words in the conditional statement. The tab is followed by the indent-string. The command sentence display for the condition word displays the outline number, if any. If there is an outline number, the rightmost character along with a period are appended to the word-display string. For example, if the outline number is B1 the word-display string is "1.". Because the outline number is longer than 1 character, the first character of the outline number is moved to the fifth position of the word-display string. The word-display string now is "B 1.". Next, the conjunction is merged into the word display string to the left of B resulting in "and B1.". If the condition word is the first word in a conditional statement, there is no conjunction. The rest of the condition display is then appended to the word-display string.

If the first value for the condition word is a variable list, the condition word display string process 474 may use the variable list word display string process 462. The resultant word-display string for a variable list of the first value is appended to the word-display string for the condition word along with a space at block 554. For advanced users, as determined at block 556, the string compare box on the command form may be checked to request that the comparison be a string comparison as determined at block 558. As a result, the comparison is designated as case insensitive and/or only a part of the string will be compared. If a number was entered in the first value "start string compare" field then the following are appended to the word-display string at block 560 to produce a word relationship string: "starting at", the first value word start position, "for length" and the first value word length. For example, "(starting at position X for length Z)" may be a resulting word relationship string, where X is the entered position and Z is the entered length. A space is appended to the word relationship string at block 562.

A similar process is performed for the second value of the condition word. If the second value is a variable list, a space and the resultant word-display string for a variable list of the second value is appended to the word-display string for the condition word at block 564. As with the first value, for advanced users, as determined at block 566, the string compare box on the command form may be checked to request that the comparison be a string comparison as determined at block 568. At block 570, "starting at", the second value word start position, "for length" and the second value word length are appended to the word display string to produce a word relationship string. The word-display string for condition word is then completed.

Figure 24:
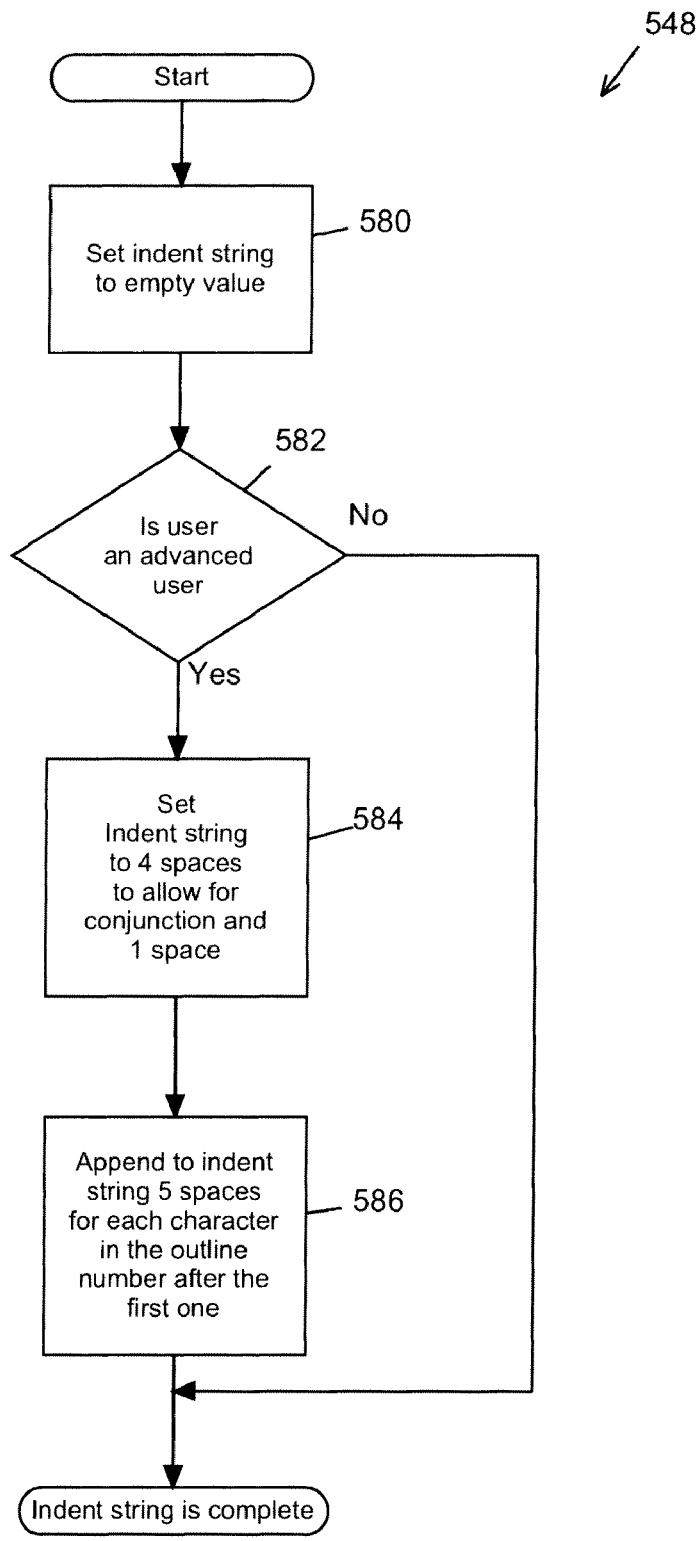
FIG. 24 is a flow diagram of an indention process as shown schematically in FIG. 23.

FIG. 24 is a flow diagram depicting an example of a method of indention 548, shown schematically in FIG. 23. The indention process 548 is used by the condition word display string process 474 to calculate the indentation for a condition word. The indention process 548 sets the indent string to an empty value at block 580. If the user is not an advanced user as determined at block 582, the indent string is complete. If the user is an advanced user, the indent string is set to 4 spaces to allow for conjunction and 1 space at block 584. Block 586 appends to indent string 5 spaces for each character in the outline number after the first one, before completing the indent string.

Figure 25:
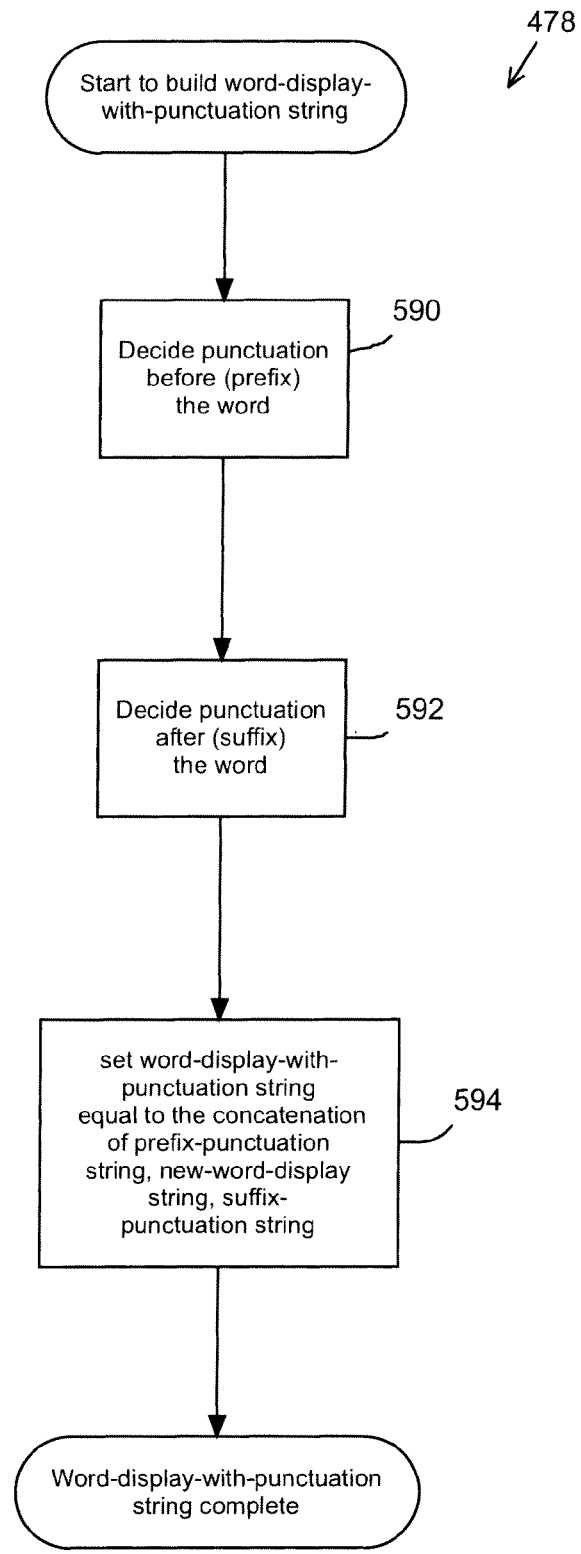
FIG. 25 is a flow diagram of a process for displaying a word in the command sentence with punctuation as shown schematically in FIG. 18.

FIG. 25 is a flow diagram depicting an example of a method for building a word display string with punctuation 478, shown schematically in FIG. 18. Initially, punctuation is decided before the word at block 590 and also after the word at block 592. Once the prefix and suffix punctuation is decided, the word-display-with-punctuation string is set equal to the concatenation of prefix-punctuation string, new-word-display string and suffix-punctuation string at block 594, and the word-display-with-punctuation string is completed.

Figure 26:
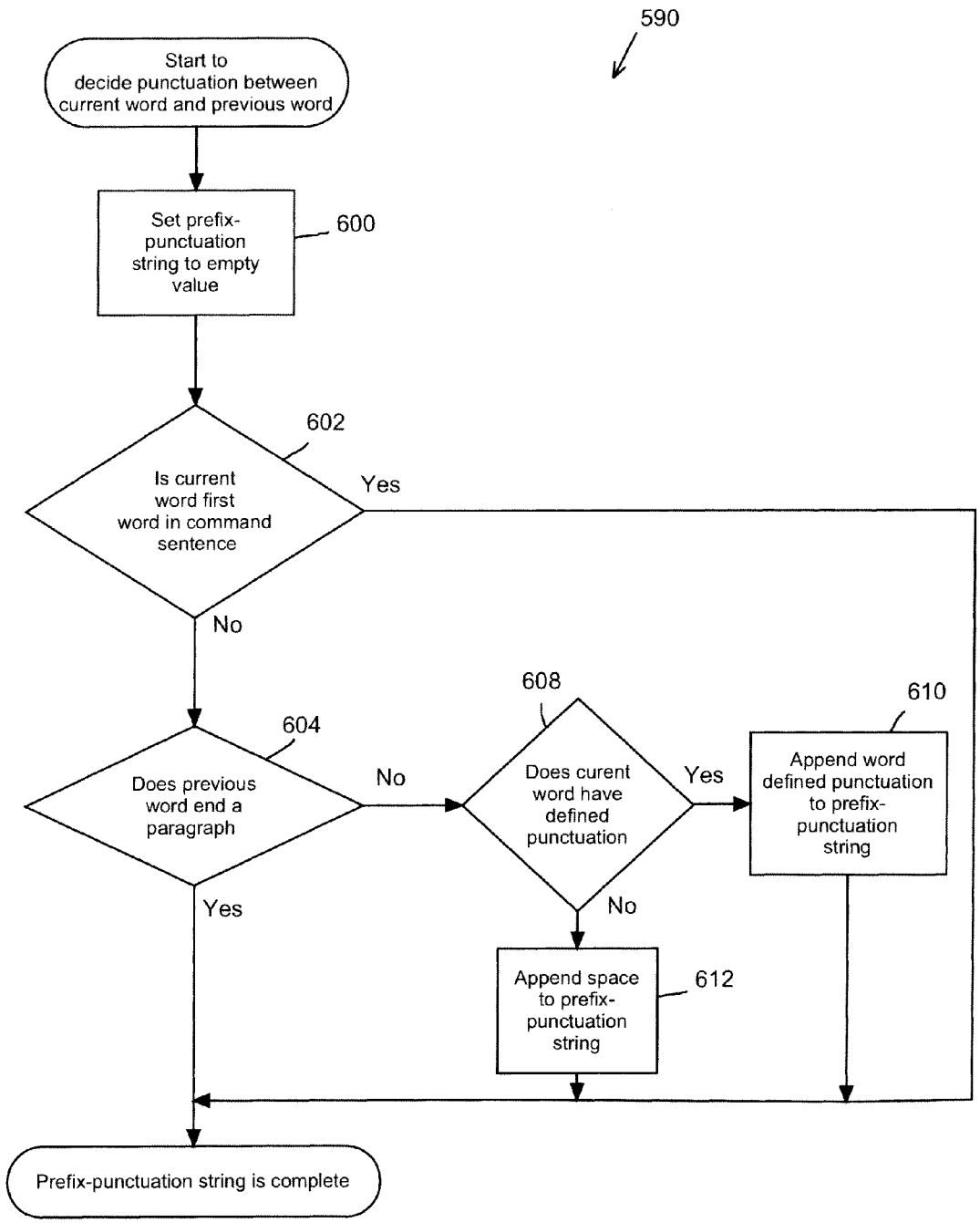
FIG. 26 is a flow diagram of a process for displaying punctuation before a word in a command sentence as shown schematically in FIG. 25.

FIG. 26 is a flow diagram depicting an example of a method for displaying a command sentence when punctuation is decided before a word 590, shown schematically in FIG. 25, and is similar to the method depicted in FIG. 16. As explained above, punctuation before a word is prefix-punctuation, which is saved a prefix-punctuation field and includes any defined punctuation for the word. If no punctuation has been defined and the word is not the first word in the format sentence, a space is added to break out the previous word.

The process 590 begins to decide on the punctuation between a current word and a previous word. At block 600, the prefix-punctuation string is set to an empty value. At block 602, the process 590 determines whether the current word is the first word in command sentence. If so, then the prefix-punctuation string is completed. If not, the process 590 determines whether the previous word ends a paragraph at block 604. If the previous word does not end a paragraph as determined at block 604, then the process 590 determines whether the current word has defined punctuation at block 608. If so, the word defined punctuation is appended to a prefix-punctuation string at block 610. Otherwise, the process 590 appends a space to prefix-punctuation string at block 612.

Figure 27:
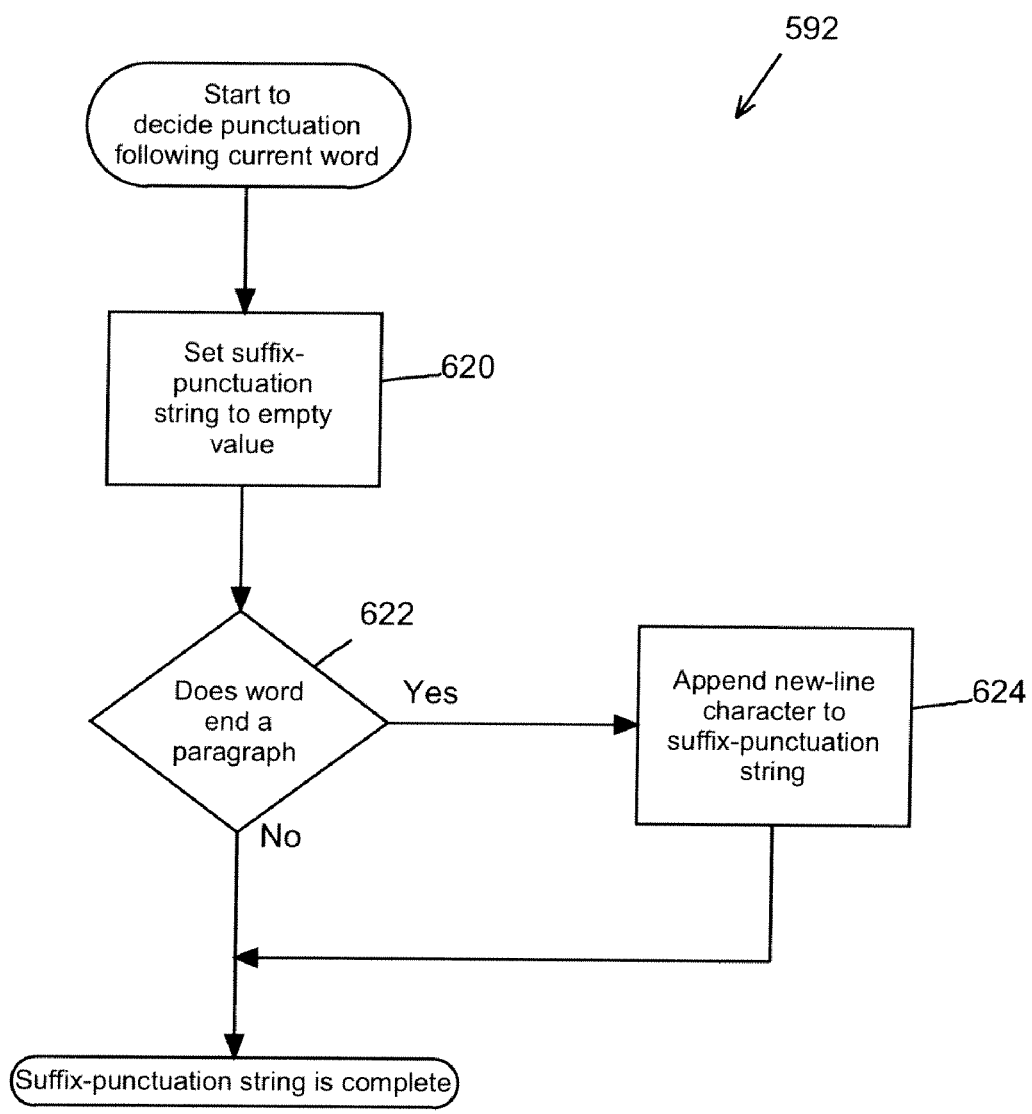
FIG. 27 is a flow diagram of a process for displaying punctuation after a word in a command sentence as shown schematically in FIG. 25.

FIG. 27 is a flow diagram depicting an example of a method for displaying a command sentence when punctuation is decided following a word 592, shown schematically in FIG. 25, and is similar to the method depicted in FIG. 17. The process 592 for a suffix-punctuation begins to decide on the punctuation following a current word being defined. At block 620, the suffix-punctuation string is set to an empty value. If the current word ends a paragraph, as determined at block 622, the new-line character is appended to the suffix-punctuation string at block 624 and the process 592 completes the suffix-punctuation string. If the word does not end a paragraph, the suffix punctuation string is completed.

Having described an example of a procedure editing process 30 above, FIGS. 28-36 are exemplary depictions of various displays that may be generated by the GUI during the procedure editing process 30. In the example shown in FIGS. 28-36, a script is being coded, which includes a command for calculating a discount for shoppers. The discount is 10% for up to the first $100 of purchases, with a 15% discount for purchases above $100.

Figure 28:
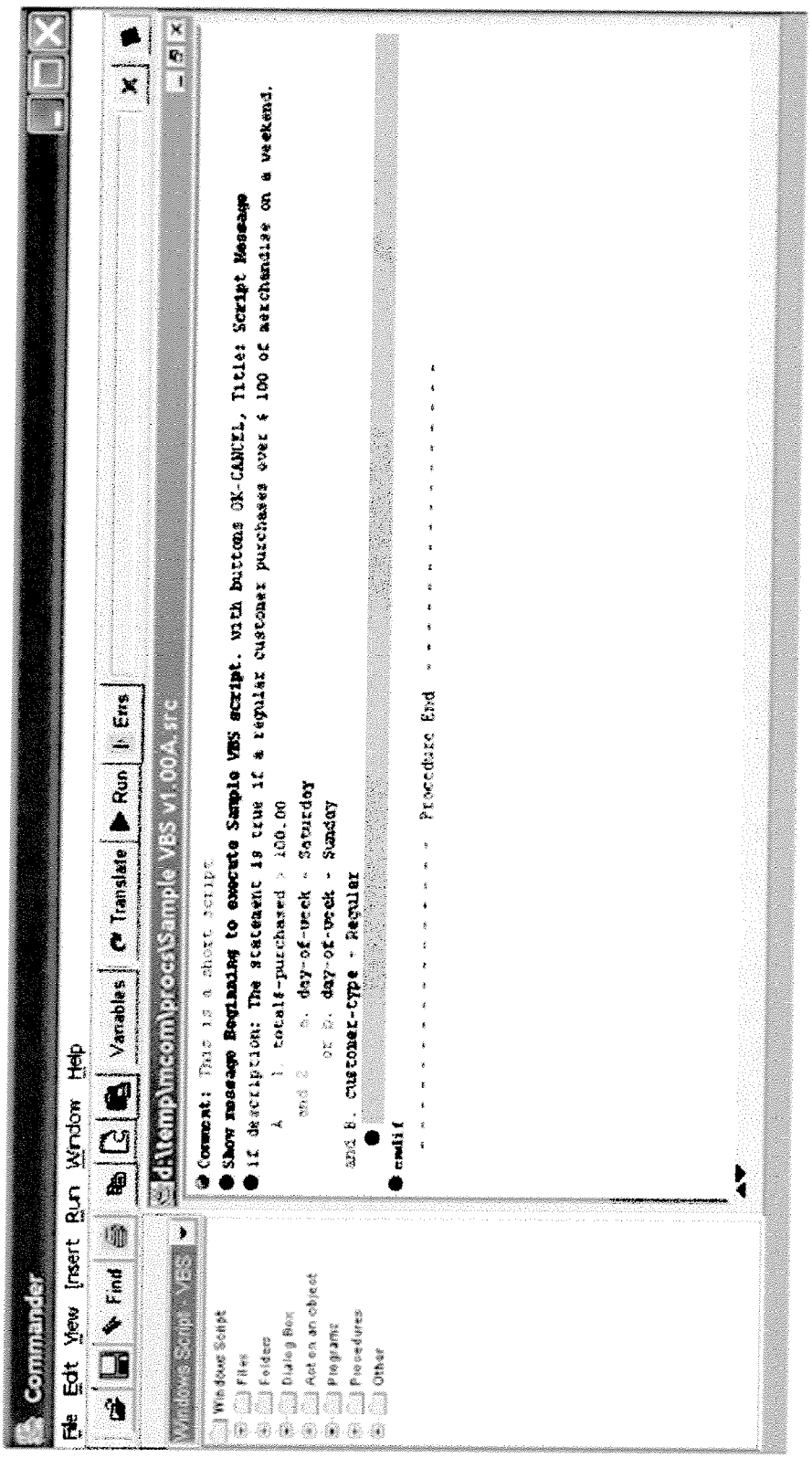
FIGS. 28-36 are exemplary depictions of displays that may be displayed by a graphical user interface during the procedure editing process of FIG. 3.

Referring to FIG. 28, a procedure editing screen is shown with a format similar to that of FIG. 2. In particular, FIG. 28 depicts an example of a script being written using the procedure editing process 30. The command menu panel is shown on the left for selecting commands, and the command sentence is displayed in the scrollable display frame. Various function buttons and a function bar are provided. Each of the items in the command menu, the function buttons and the function bar menu items may be selected using cursor keys on a keyboard, a GUI mouse cursor and computer mouse, voice commands, etc.

Figure 29:
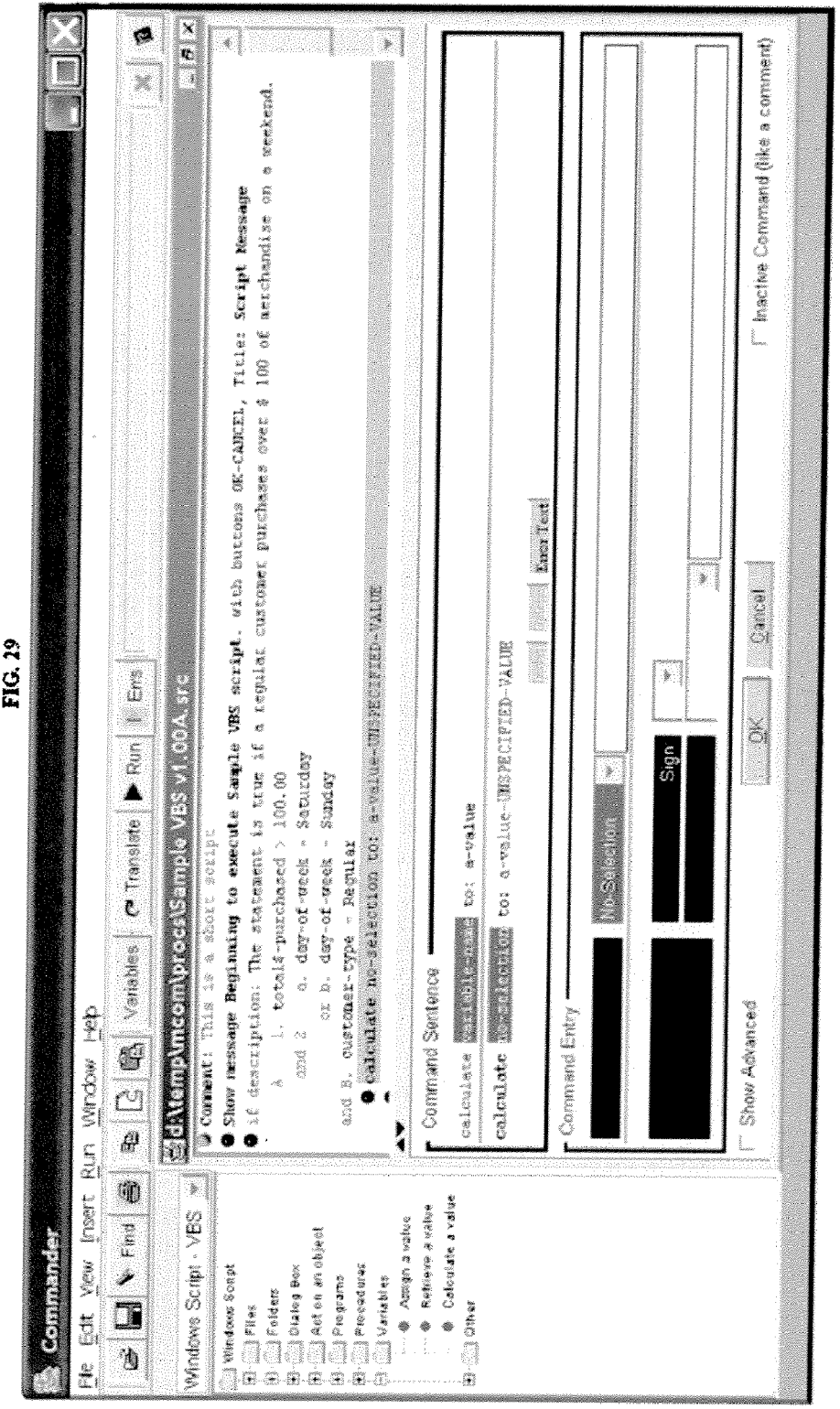

Referring to FIG. 29, a command form is shown with a format similar to that of FIG. 4. In particular, FIG. 29 depicts a command being added to the script of FIG. 28. The command is added by clicking or otherwise selecting "calculate a value" from the command menu, resulting in the display of the command sentence in the scrollable display frame. The newly added command sentence is highlighted, thereby indicating it is selected for editing. In addition, the command form is opened at the bottom of the display. The command form includes the command sentence frame and the command entry frame. The command sentence frame displays two sentences: the command format and the command sentence. As values are provided for the enterable words (represented by input entry components) to code the command, the command sentence changes to reflect the entries. The command entry frame includes the GUI components which relate to the input entry components of the command sentence.

Figure 30:
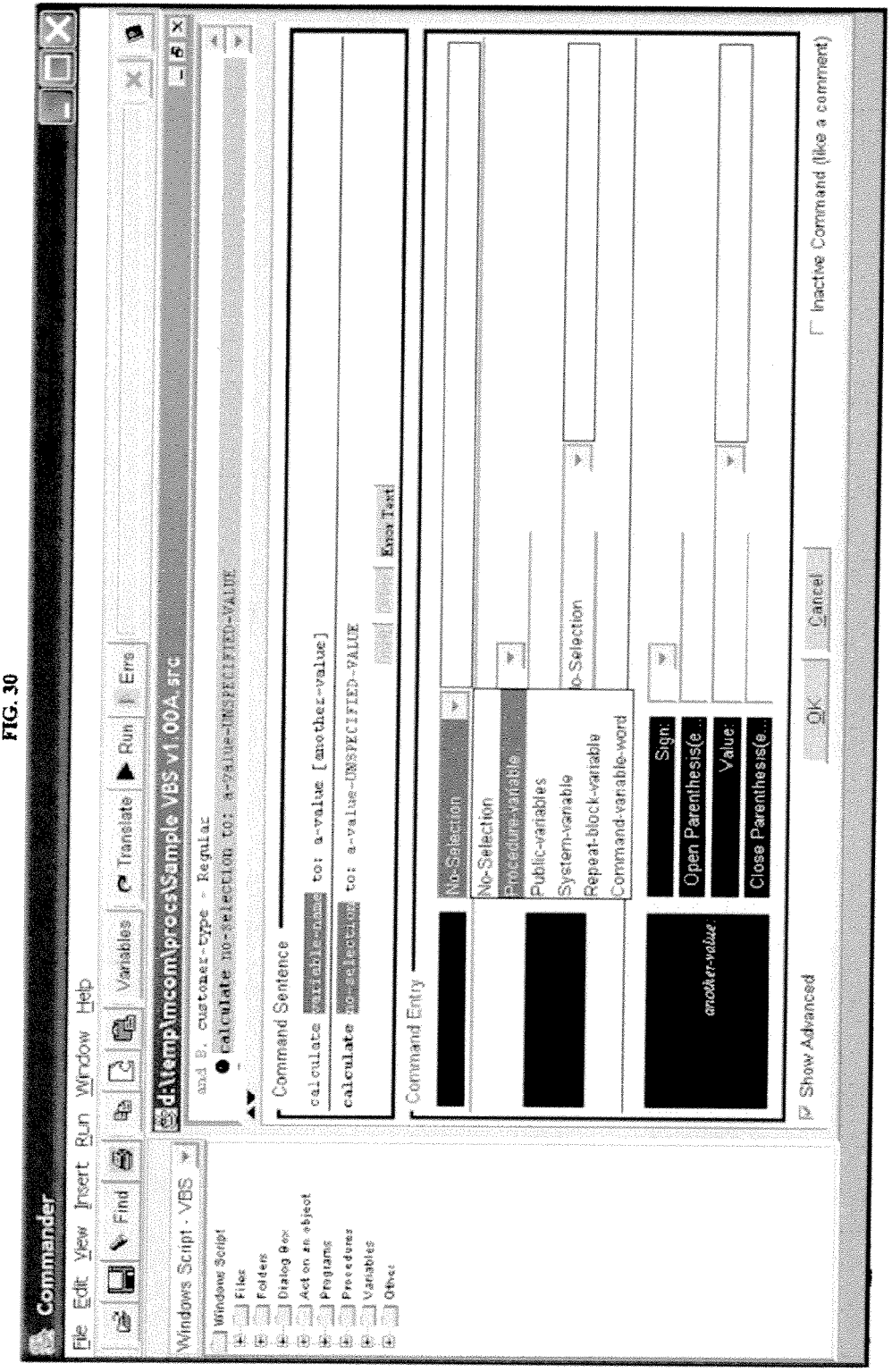

Referring to FIG. 30, a further step in writing the command for the calculation is shown. Each enterable word within the command format is provided with a value by selecting via the command entry frame. For example, "variable-name" is an enterable word and refers to the name of the variable which will be assigned the result of the calculation. The "variable-name" is highlighted to indicate it is currently selected, and the command entry frame below is provided to enter a value (s) for the "variable-name". The "variable-name" enterable word is a variable list word with a variable to be selected from the procedure variables. The variable for the "variable-name" is selected from the pull down list position to the right of the label "variable-name" in the command entry frame.

Figure 31:
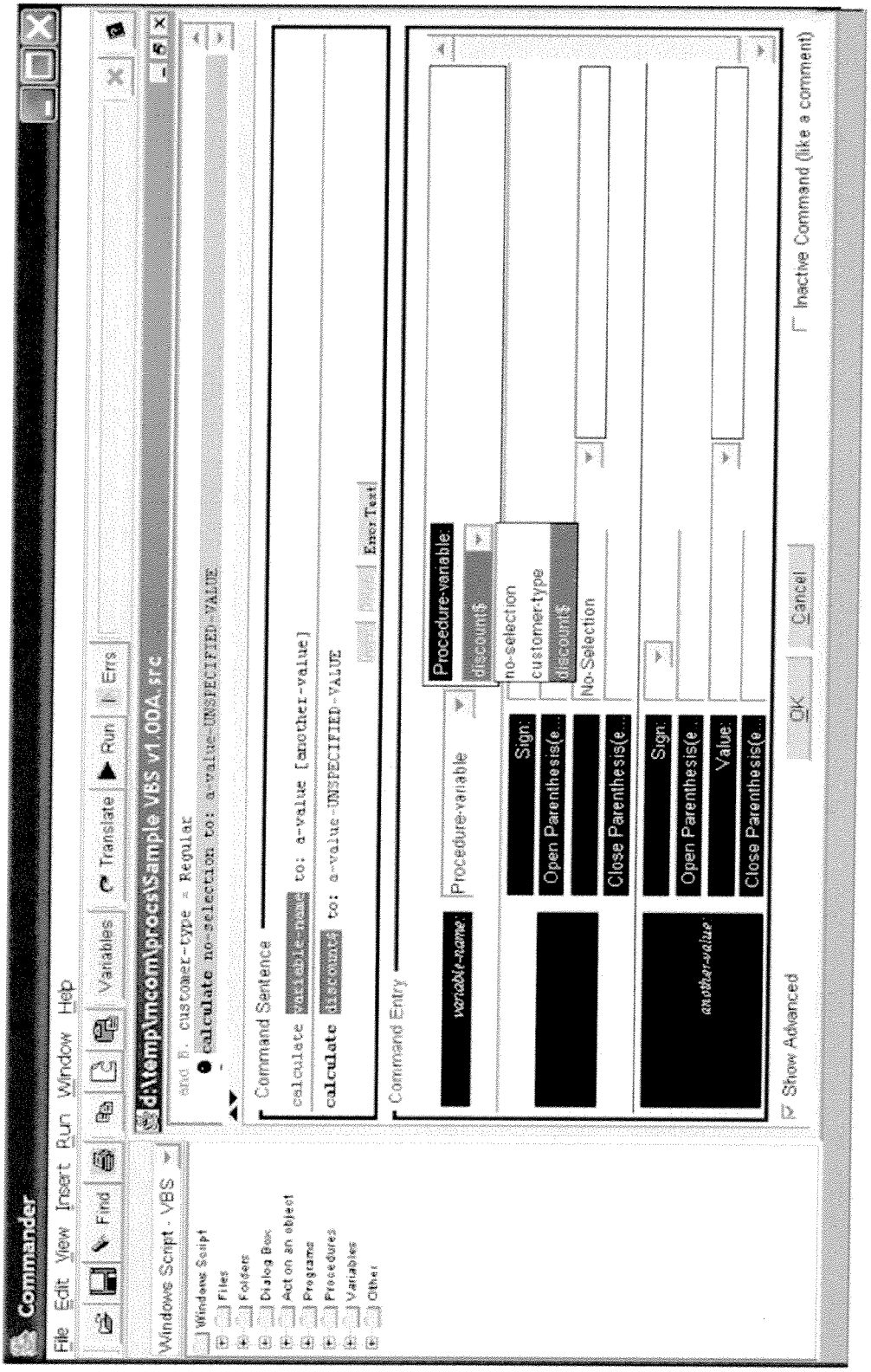

FIG. 31 depicts the completion of the entry of a value for the "variable-name" enterable word. In particular, the "variable-name" is a procedure-variable, and the procedure variable is "discount$" as selected from a pull down list of procedure variables. When "procedure-variable" is selected from the variable list, the procedure editing process 30 inserts another list to the right of the variable list, from which the variable name "discount$" is selected.

Figure 32:
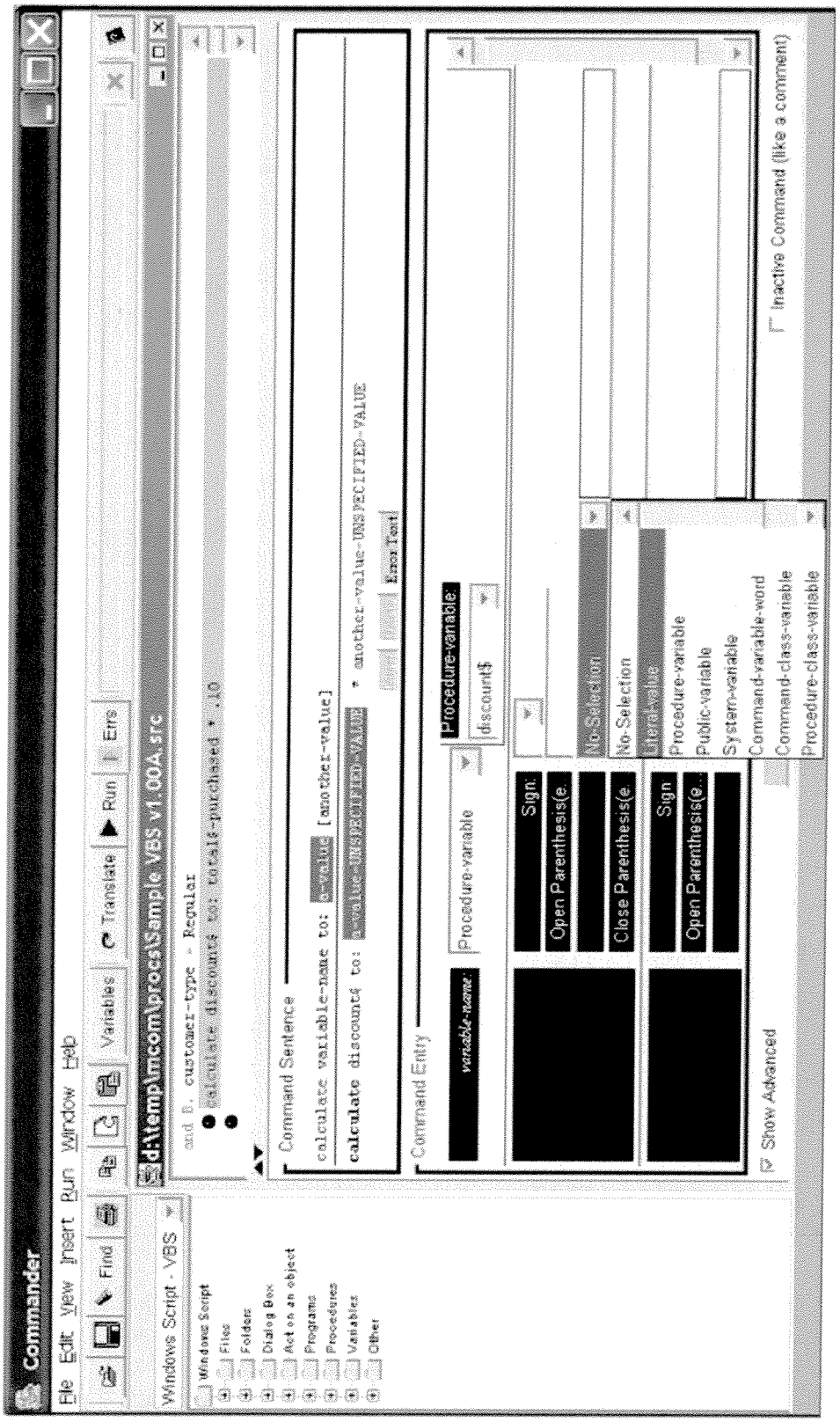

FIG. 32 illustrates the entry of a value for the "a-value" enterable word. The value is entered by selecting "literal-value" from the variable list representing the entry. A textbox is generated to the right to enter a value for the selected "literal value". The textbox is generated as a response to the selection of the "literal-value" from the variable list.

Figure 33:
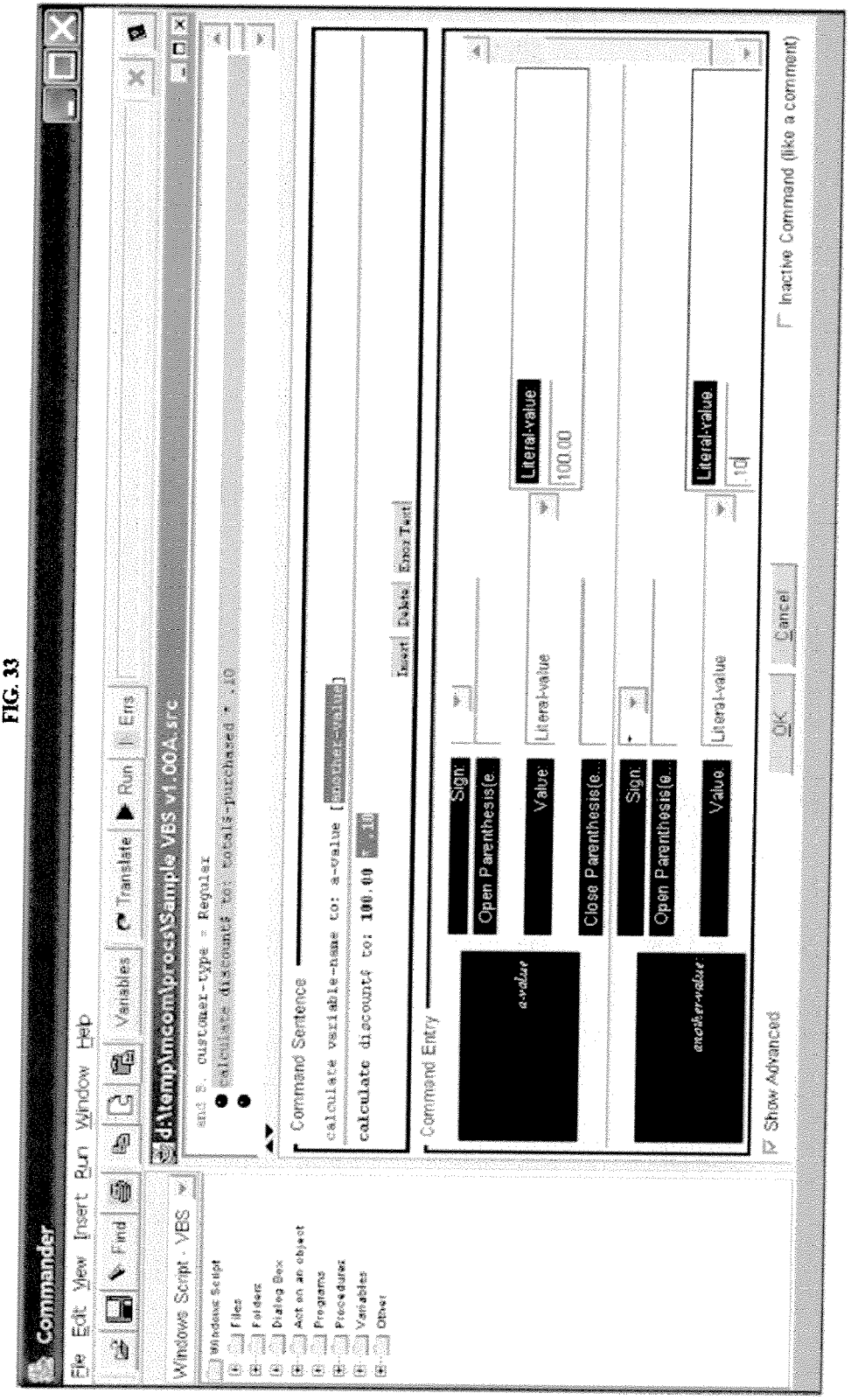

FIG. 33 illustrates entry of a value for the "a-value" and a first repeater word ("another-value") of the command. For the "a-value", a textbox is generated to the right to enter a value for the selected "literal value", which in this example is entered as "$100.00". The first repeater word includes an operator ("*") and a value ("0.10"). The operator is selected from a pull down list of mathematical operators in the command entry frame. The value refers to the first 10% discount. The value is entered by selecting a "literal-value" from the pull down list adjacent the "another-value" label and entering "0.10" into the textbox generated adjacent the selected "literal-value". The textbox is generated as a response to the selection of the "literal-value".

Figure 34:

FIG. 34 illustrates the addition of a second "another-value" repeater word below the first repeater word. In particular, the GUI prompts the user to specify where the second repeater word is to be entered.

Figure 35:
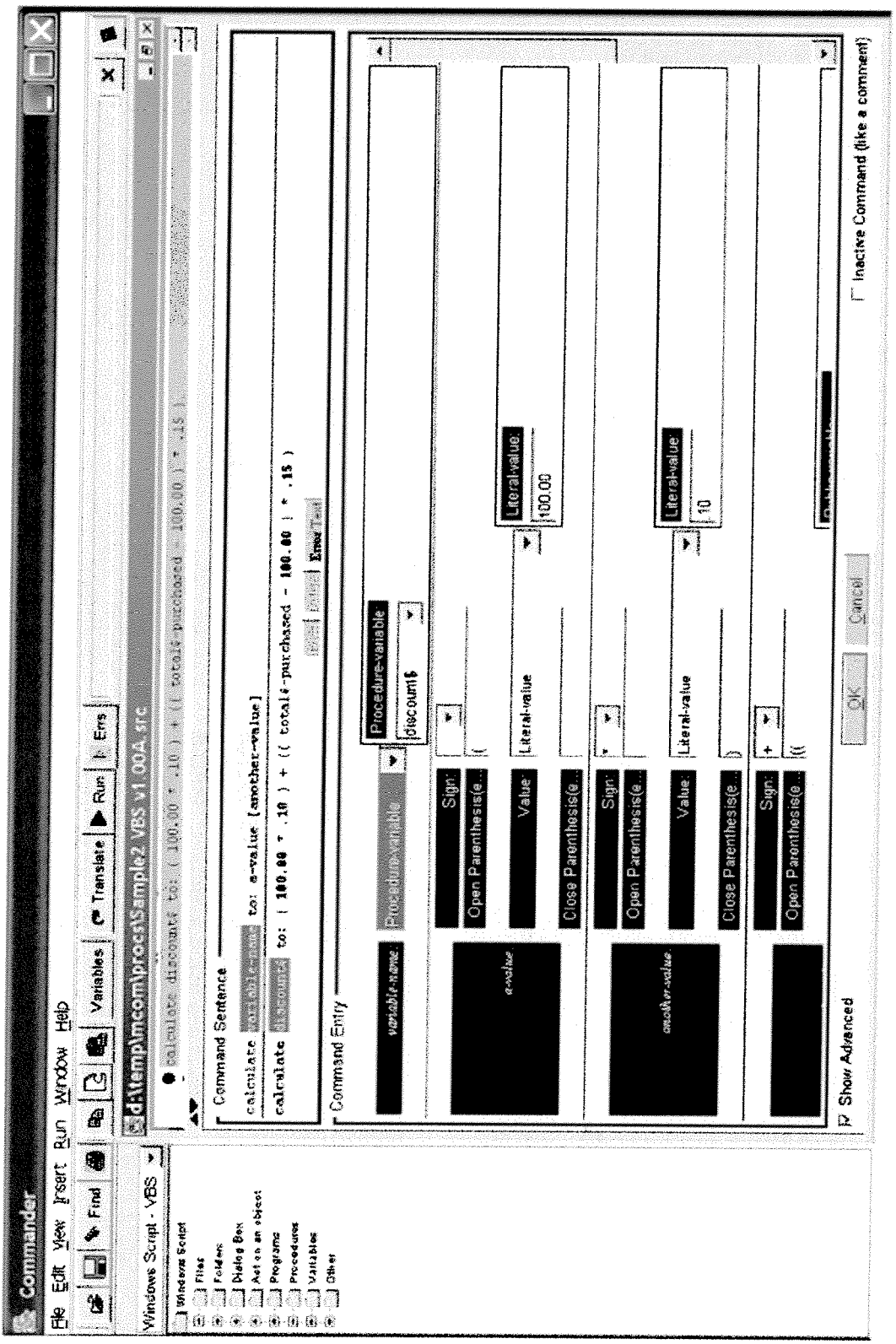
Figure 36:
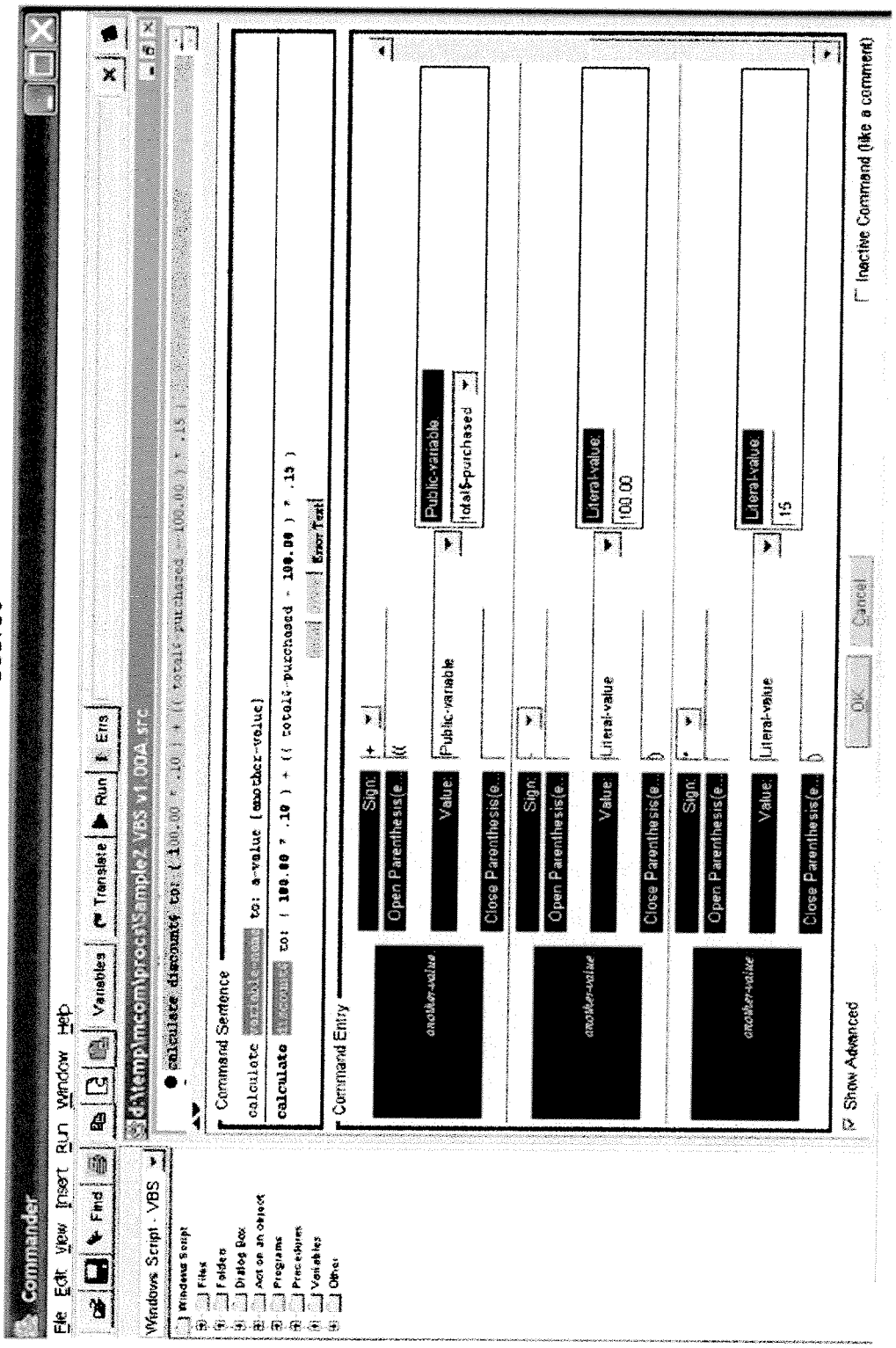

FIGS. 35-36 illustrate the completed command form. In particular, FIG. 35 depicts the top of the scrollable form showing the first three word entries and FIG. 36 depicts the same form scrolled to the bottom to show the last three "another-value" repeater word entries. Opening and closing parentheses have further been entered to specify the appropriate groupings for the calculations.

Figure 37A:
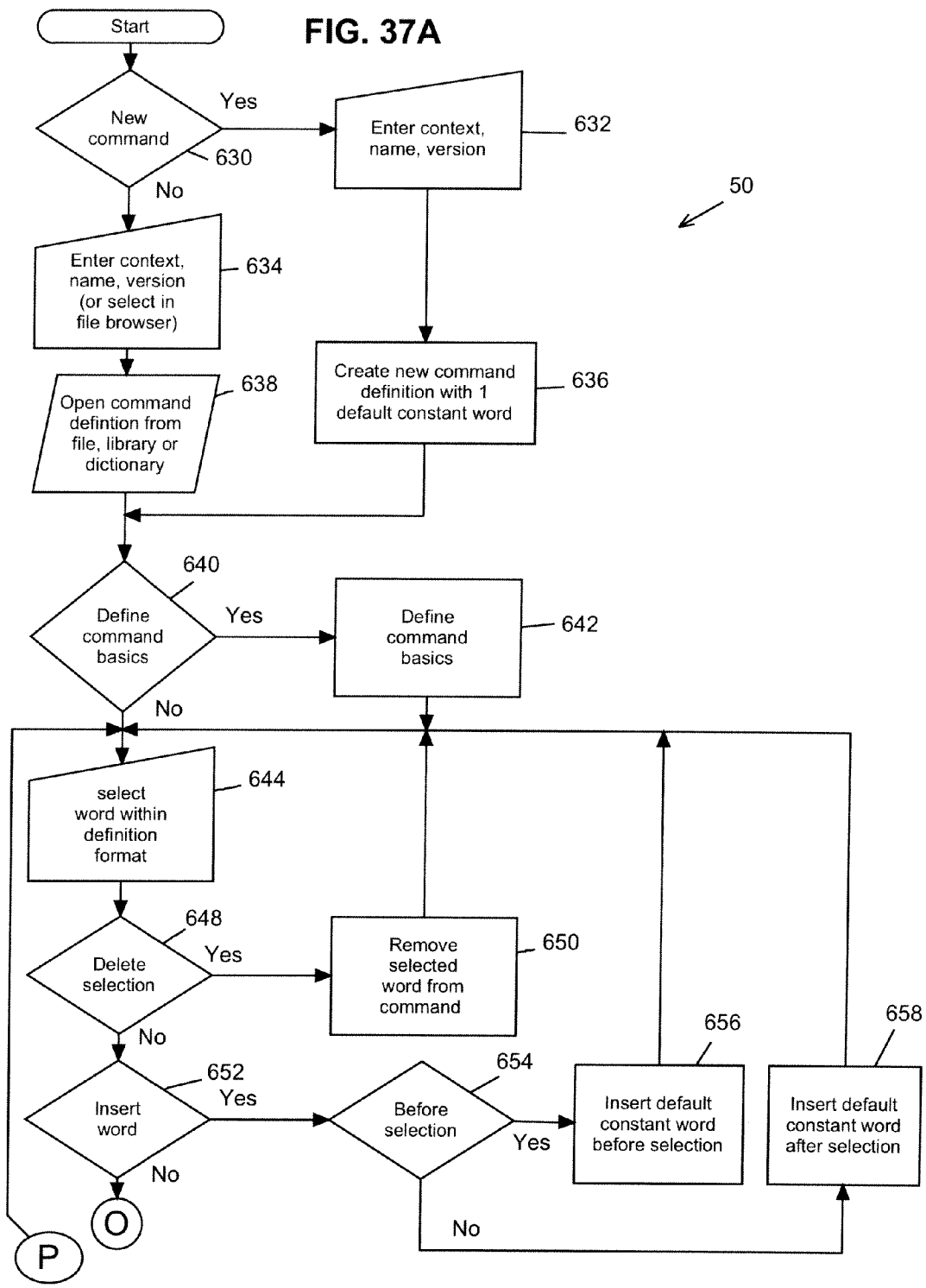
FIG. 37 is a flow diagram is a flow diagram of a command definition process as shown schematically in FIG. 1.
Figure 37B:
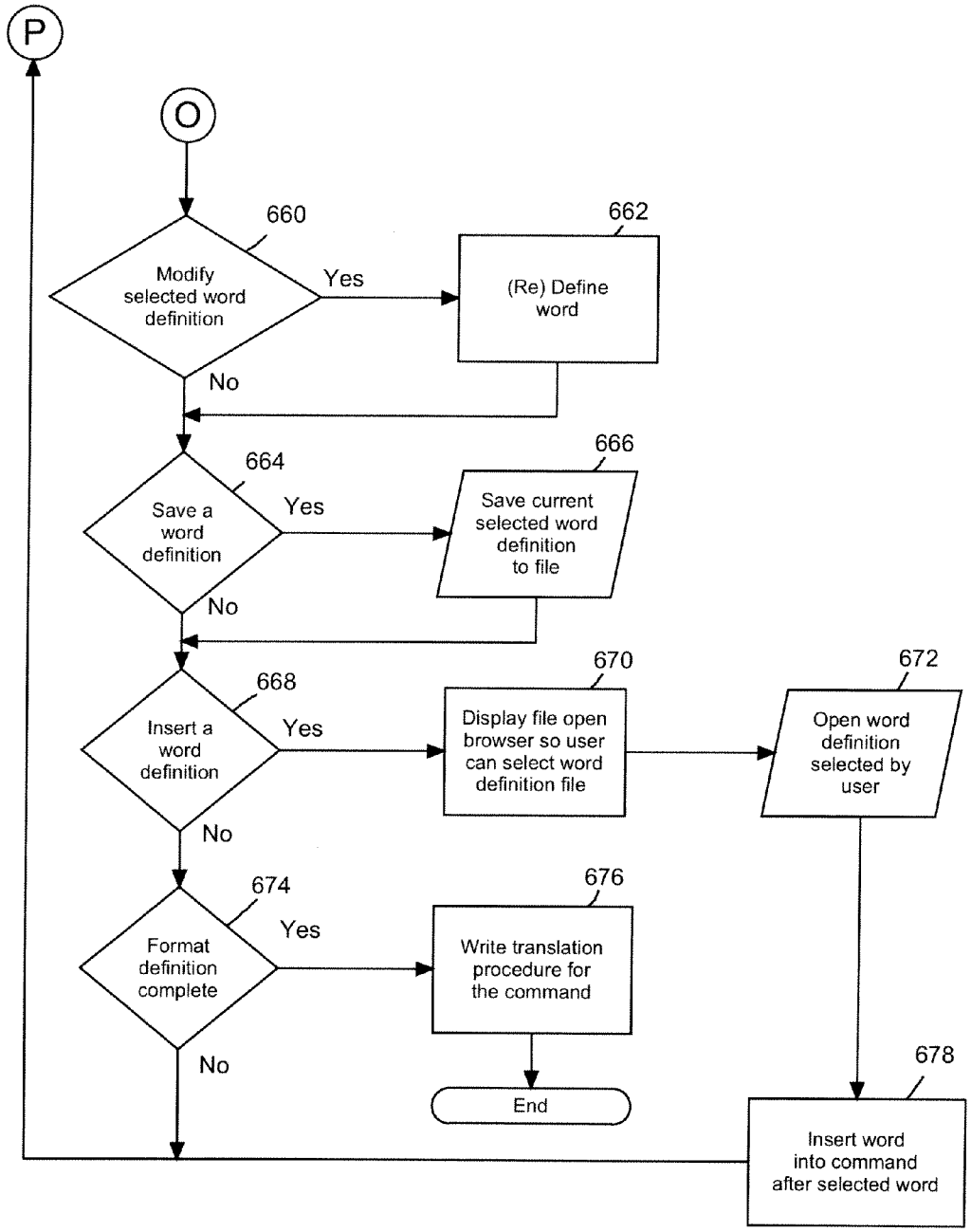
Figure 38:
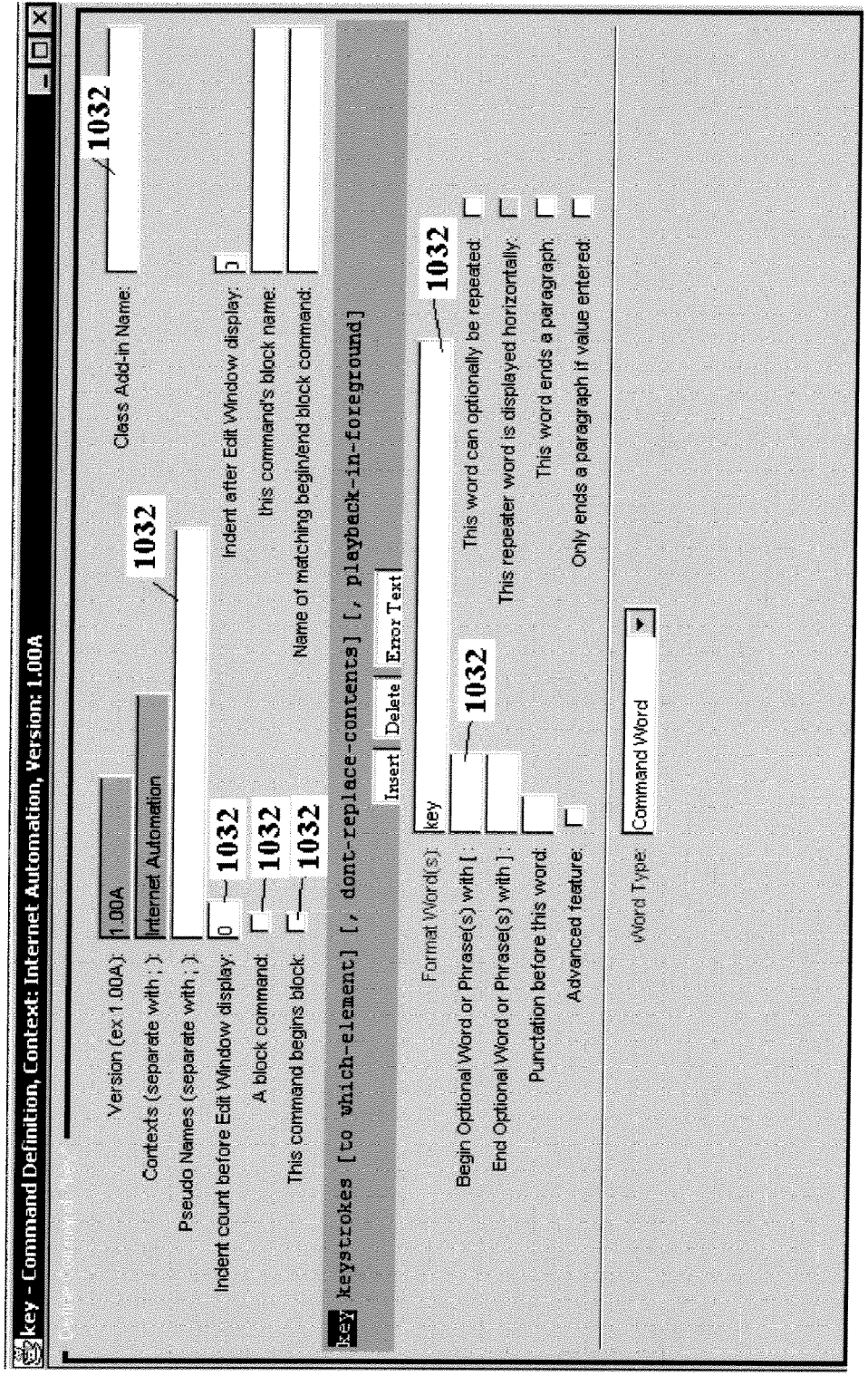
FIG. 38 is an exemplary depiction of a display that may be displayed by a graphical user interface during the command definition process of FIG. 37.
Figure 42:
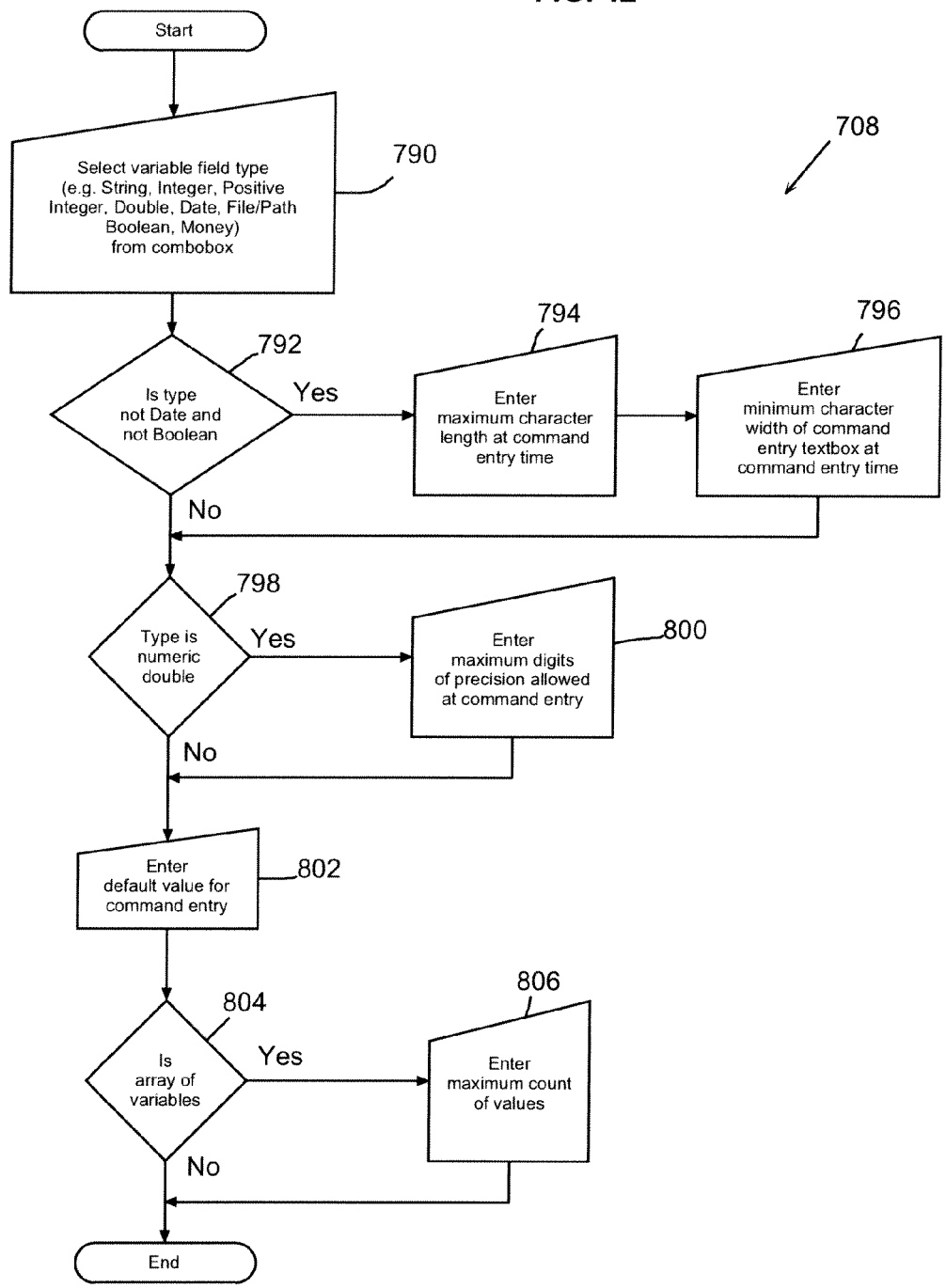
FIG. 42 is a flow diagram of a variable word definition process as shown schematically in FIG. 40.
Figure 43:
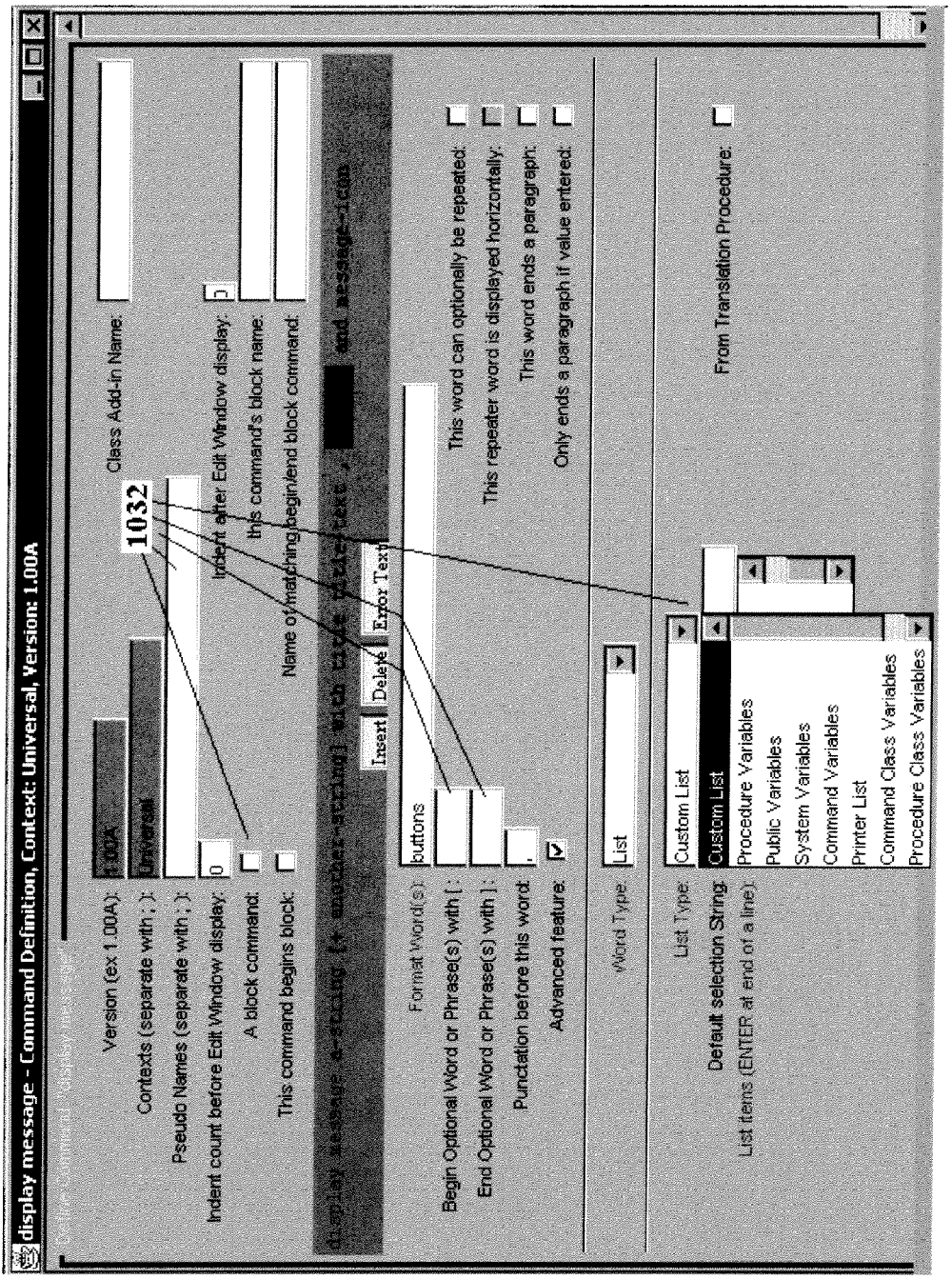
FIG. 43 is an exemplary depiction of a display that may be displayed by a graphical user interface when defining a list word during the list word definition process of FIG. 44.
Figure 45A:
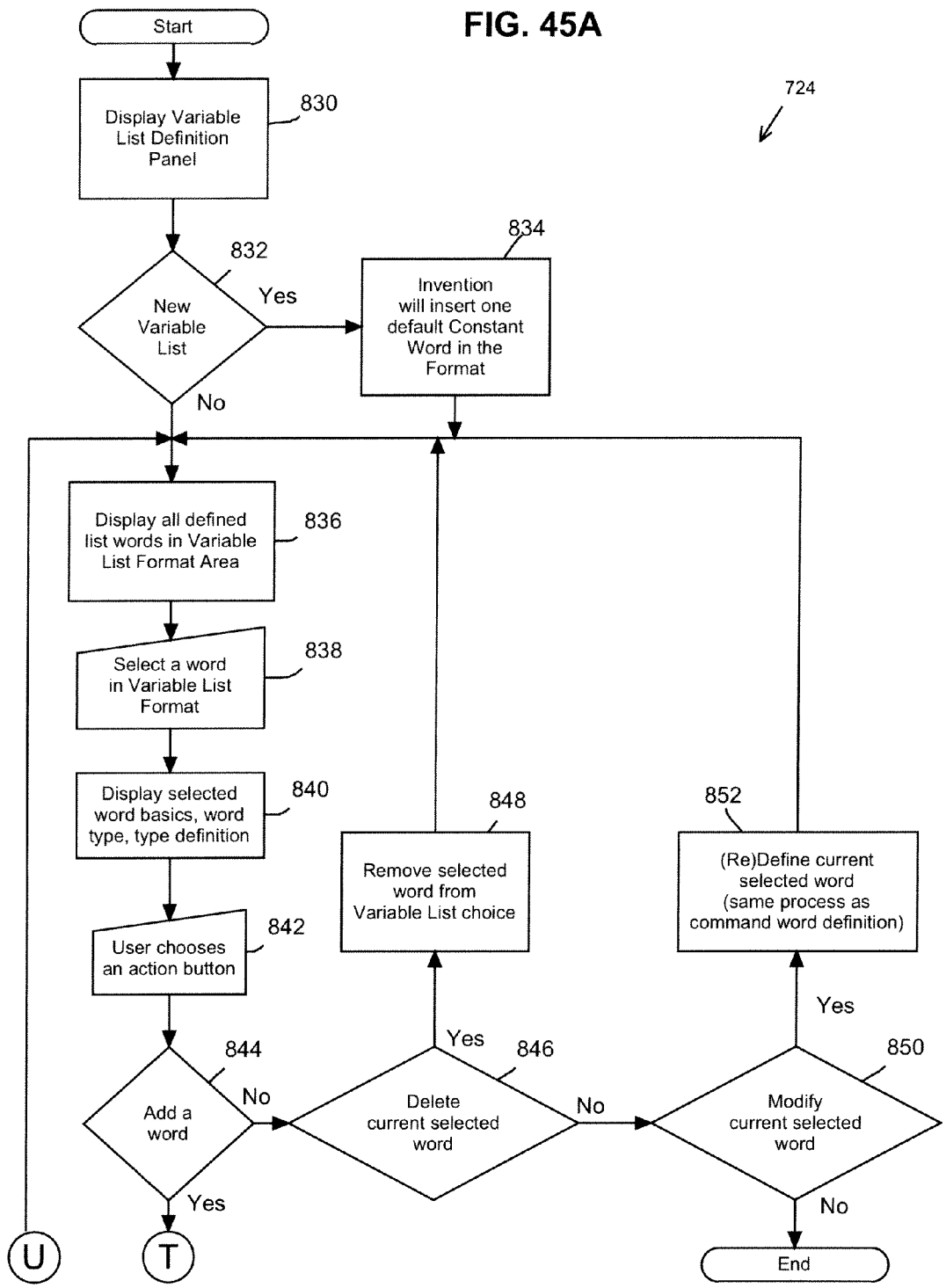
FIG. 45 is a flow diagram of a variable list word definition process as shown schematically in FIG. 40.
Figure 45B:
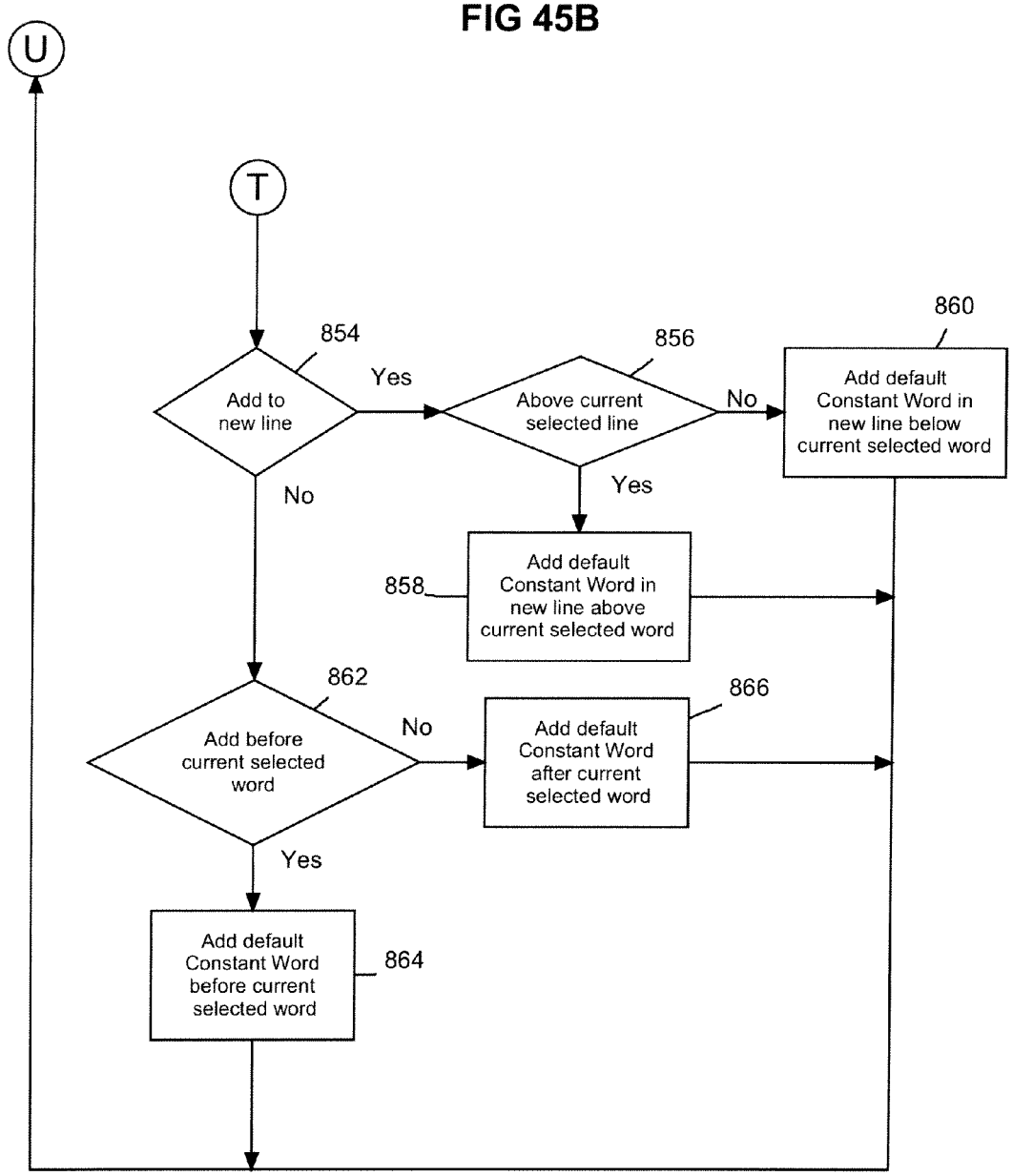
Figure 46:
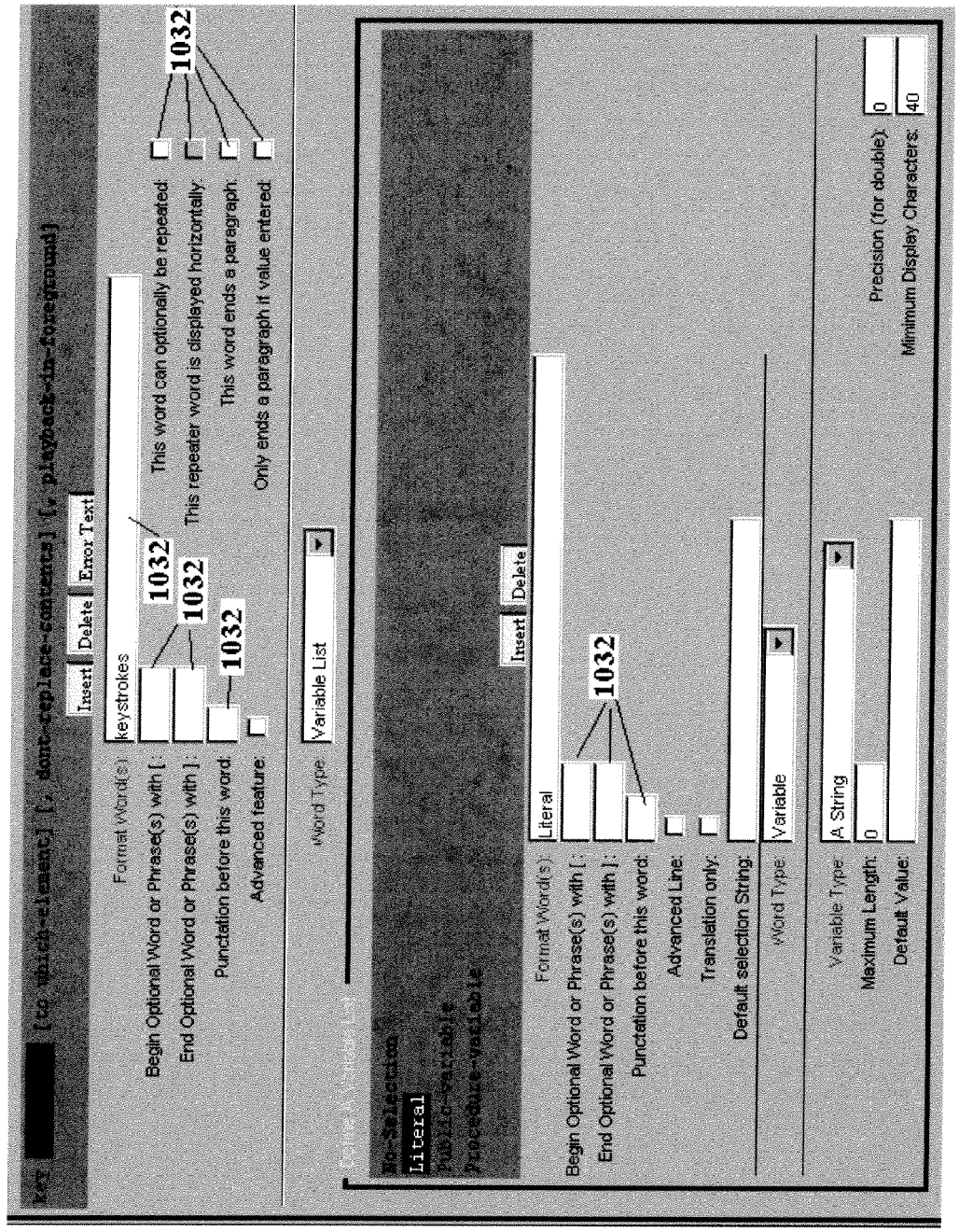
FIG. 46 is an exemplary depiction of a display that may be displayed by a graphical user interface when defining a variable list word during the variable list word definition process of FIG. 45.

FIGS. 38, 43 and 46 are exemplary depictions of displays that may be generated by the GUI when defining commands as shown schematically in FIGS. 37, 39-42 and 44-45 below.

In describing FIGS. 37, 39-42, 44-45 below, reference may be made to FIGS. 38, 43 and 46 when describing entries and selections during the definition of a command. As seen in FIGS. 38, 43 and 46, the displays include several fields 1032 which may be populated by inputting the appropriate data into the appropriate fields 1032 in order to define a command. The fields 1032 may include textboxes wherein an entry may be keyed in by a user, checkboxes which may be selected by a user, dropdown boxes or listboxes containing entries which may be selected by a user, or other GUI components which may be provided for defining the command. The user may enter or select values for each of the fields by typing entries, pointing and clicking with a mouse, using cursor keys, using voice recognition software or any other manner of entering data.

The top panel of the displays of FIGS. 38 and 43 depicts the definition of a command. The middle panel displays the command format. The displays may further include a variety of function buttons which may be selected, for example, by clicking the button with a mouse. For example, a word may be added to the command format by selecting an insert button. Each word may be defined by selecting the word in display of the command format. The components to define the selected word may appear below the command format. These components may be used for a variety of functions, including, but not limited to, marking optional words or phrases, identifying repeater words, identifying words available only to advanced users and defining word types.

FIG. 37 is a flow diagram depicting an example of a method for defining a command 50, shown schematically in FIG. 1. During the command definition process 50, the GUI may generate a display as shown in FIG. 38 which includes several fields 1032 to enter data for defining a command. As will be understood, different screens may be generated in accordance with the command or word being defined. For example, the display depicted in FIG. 38 is a generic display that may be initially presented during the command definition process 50, and may be changed to reflect the user's selections and entries as the command is being defined.

The command definition process 50 defines commands and the resulting command definition is rendered as a sentence called the command format. A command is identified by its context name, command name and version number. The context name identifies the code generator to which the command is assigned. The version number allows for a command definition to evolve over time with different versions. If the command is a new command as determined at block 630, the command is created when the user enters the context name, command name and a version at block 632.

To open an existing command, as determined at block 630, the context name, command name and version number are entered at block 634 into a Command Open Dialog box. Using the Command Open Dialog Box, the command definition file may be opened at block 638 from wherever it is located (e.g., a file, library member, dictionary entry or other form of computer repository). Every command has properties, called command basics, which are entered in the command basic panel as determined at block 640 and defined at block 642.

Because a command is a sentence or sentence fragment, all the words in the sentence are entered during the definition of the command. For example, at block 644 a word is selected (e.g. highlighted via a mouse or keyboard) for insertion or removal. To remove a word at block 648, the word is selected from the command and removed at block 650, by indicating a removal option (e.g., clicking the delete button). To insert a word at block 652, the insert option is signified (e.g., clicking the insert button) and the location of the insertion is selected for either before or after the selected word, as determined at block 654. The location may be selected from a popup list. A default constant word is inserted before the selected word at block 656 or after the selected word at block 658.

Each word within the command is defined. A selected word definition may be modified as determined at block 660, causing the selected word definition to be redefined at block 662. The selected word definition may also be saved as determined at block 664, whereby the selected word definition is saved, along with all properties of the word, to a file, library, dictionary or other data repository at block 666. Further, previously saved word definitions may be inserted, as determined at block 668. Saved word definitions may be selected using a file browser or word definition open dialog box at block 670, and the saved word definition may be opened at block 672. The saved word definition may then be inserted as a new word in the command definition at block 678. When the formatting of the definition is complete as determined at block 674, the translation procedure for the command is written at block 676.

Figure 39:
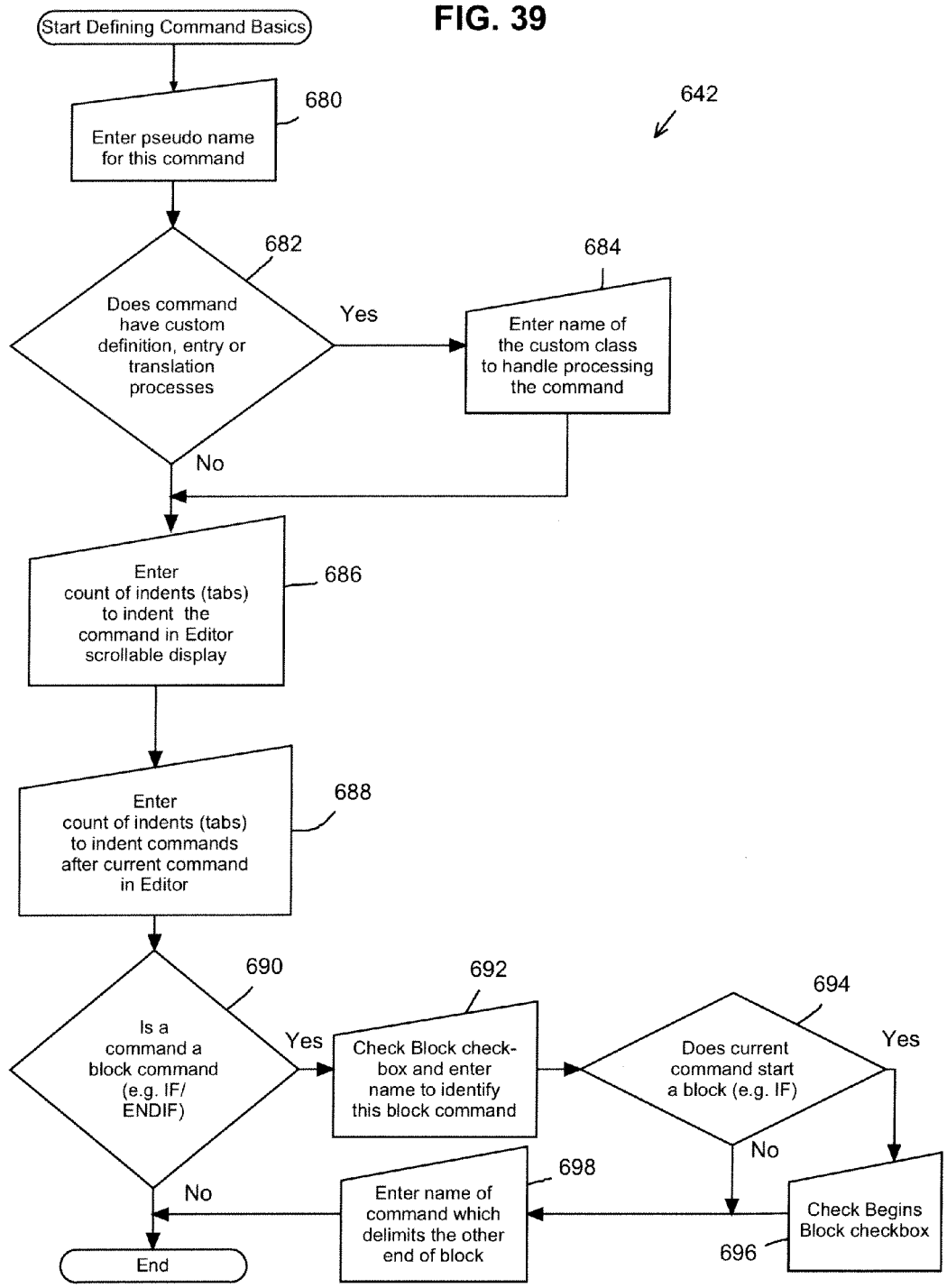
FIG. 39 is a flow diagram of a command basics definition process as shown schematically in FIG. 37.

FIG. 39 is a flow diagram depicting an example of a method for defining the command basics 642, shown schematically in FIG. 37. A pseudo name for the command is entered at block 680. A pseudo name is a name which is the equivalent of the command name and can be used anywhere in place of the command name. As determined at block 682, the command basics definition process 642 may include a class for custom processing of the command. The custom class may replace the standard logic for command form processing and command sentence display, as well as translation. The custom class is entered at block 684.

At block 686, the count of indents to indent command after the current command is entered. The count of indents is the number of tabs used to indent the current command relative to the preceding command. The tabs to indent the command following the current command are entered at block 688.

All the commands within a block command may be indented. A block command initiates or terminates a block of commands. For example, the "if" command starts a block and the "endif" command terminates the block. All the commands between "if" and "endif" belong to the block and may be indented by one tab to mark the block. The commands following an "if" command and above the "endif" command are indented one tab to show they belong to the "if" command block. As another example, a "repeat" command initiates a loop and "end repeat" command terminates the block of commands within the loop.

If the command being defined initiates or terminates a command block as determined at block 690, a "Block Command" checkbox is checked and the block command name is entered at block 692. Normally, the block command name is the same as the command name, but may be different where there are several variations of a command. If the command starts a block as determined at block 694, a "Begins Block" checkbox is checked at block 696. In order to match a beginning block command (e.g., "if") with a matching terminating block command (e.g., "endif), the name of the command which delimits the other end of the block is entered at block 698. All block commands should have a matching block command.

Figure 40A:
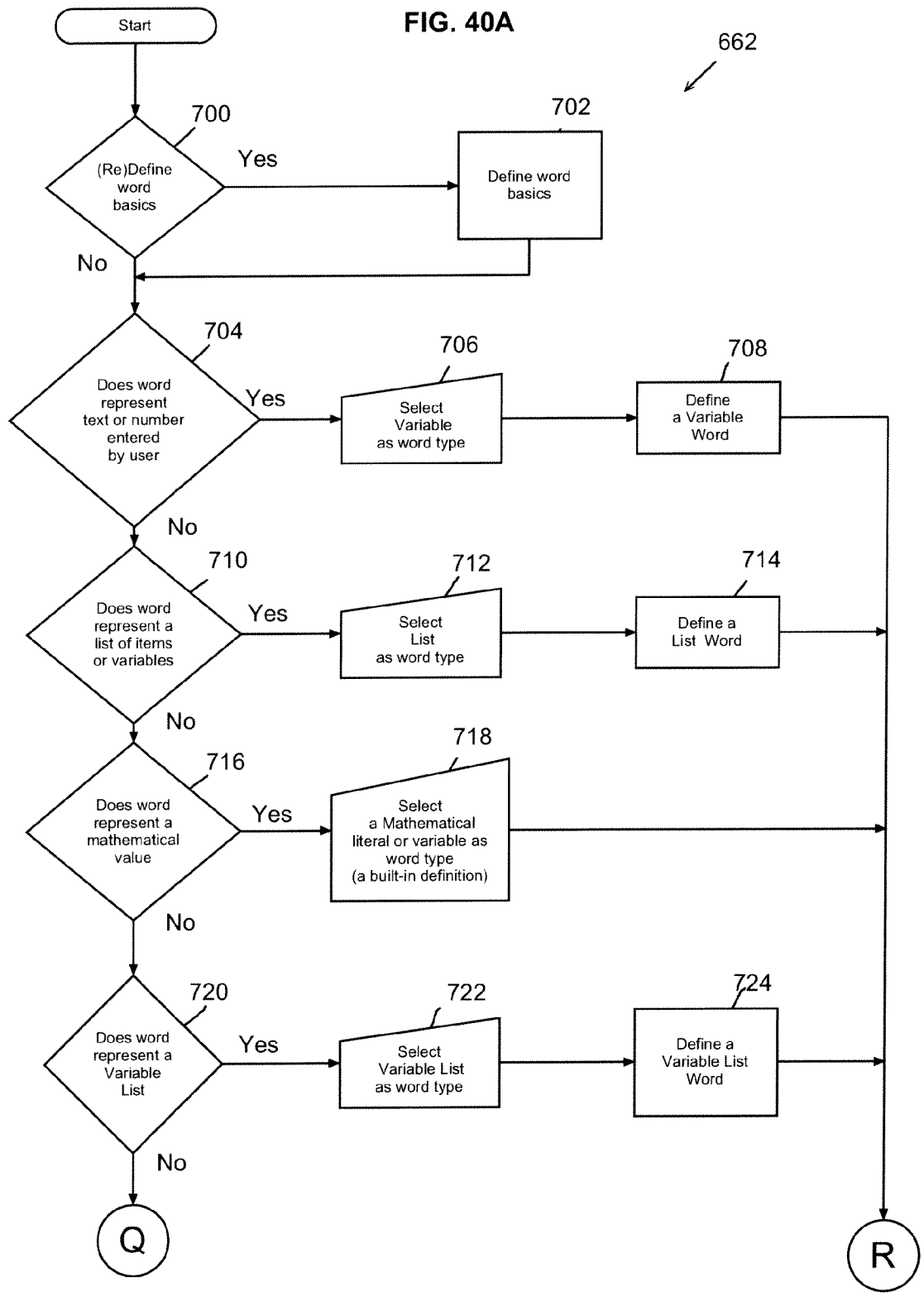
FIG. 40 is a flow diagram of a word definition process as shown schematically in FIG. 37.
Figure 40B:
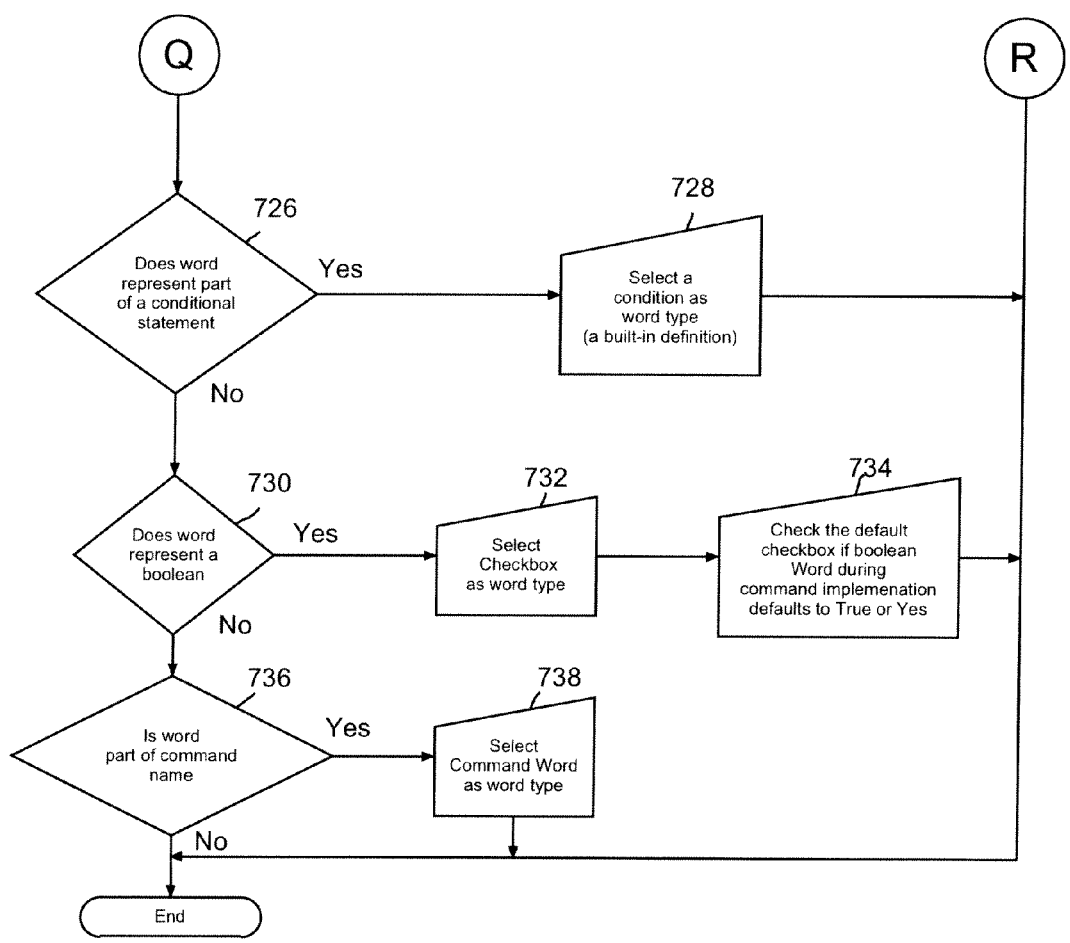

FIG. 40 is a flow diagram depicting an example of a method for defining or redefining a word 662, shown schematically in FIG. 37. Although there are several different types of words, all word types share basic properties, referred to as word basics. Block 700 determines whether to define or redefine the word basics at block 702. Otherwise, the word type is selected, which may be performed by selecting the word type from a word type pull down list.

If the word represents an alphanumeric string or number to be entered as determined at block 704, the variable word type is selected from the word type pull down list at block 706 and a variable word is defined at block 708. If the word type represents a list of items or variables, as determined at block 710, the list word type is selected from the word type pull down list at block 712 and a list word is defined at block 714. If the word represents a mathematic value or term within an equation, as determined at block 716, the mathematical word type (literal or variable) is selected from the word type pull down list at block 718. Because a mathematical word is self-defined, the mathematical words is not defined as with other words types. If the word type represents a variable list, as determined at block 720, the variable list word type is selected from the word type pull down list at block 722 and a variable list word is defined at block 724. If the word type represents part of a condition statement, as determined at block 726, the condition word type is selected from the word type pull down list at block 728. As with mathematical words, conditional words are self-defined and are not defined further as with other word types. If the word type represents a Boolean, as determined at block 730, a checkbox is selected from the word type pull down list at block 732. If the Boolean word defaults to true (or yes) during command implementation, the default checkbox may be checked at block 734. If the word is part of a command name, as determined at block 736, the command word is selected as the word type at block 738.

Figure 41A:
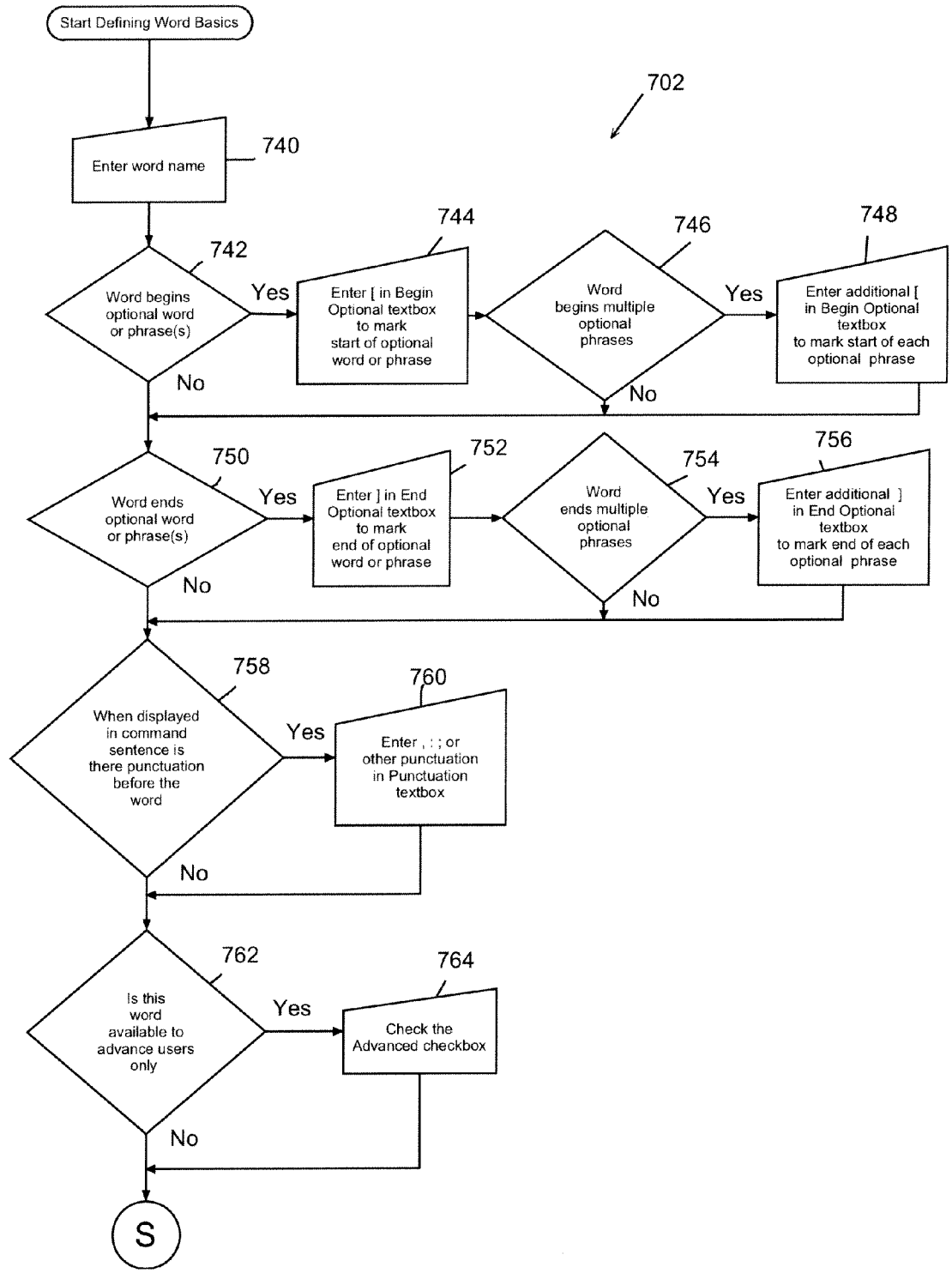
FIG. 41 is a flow diagram of a word basics definition process as shown schematically in FIG. 40.
Figure 41B:
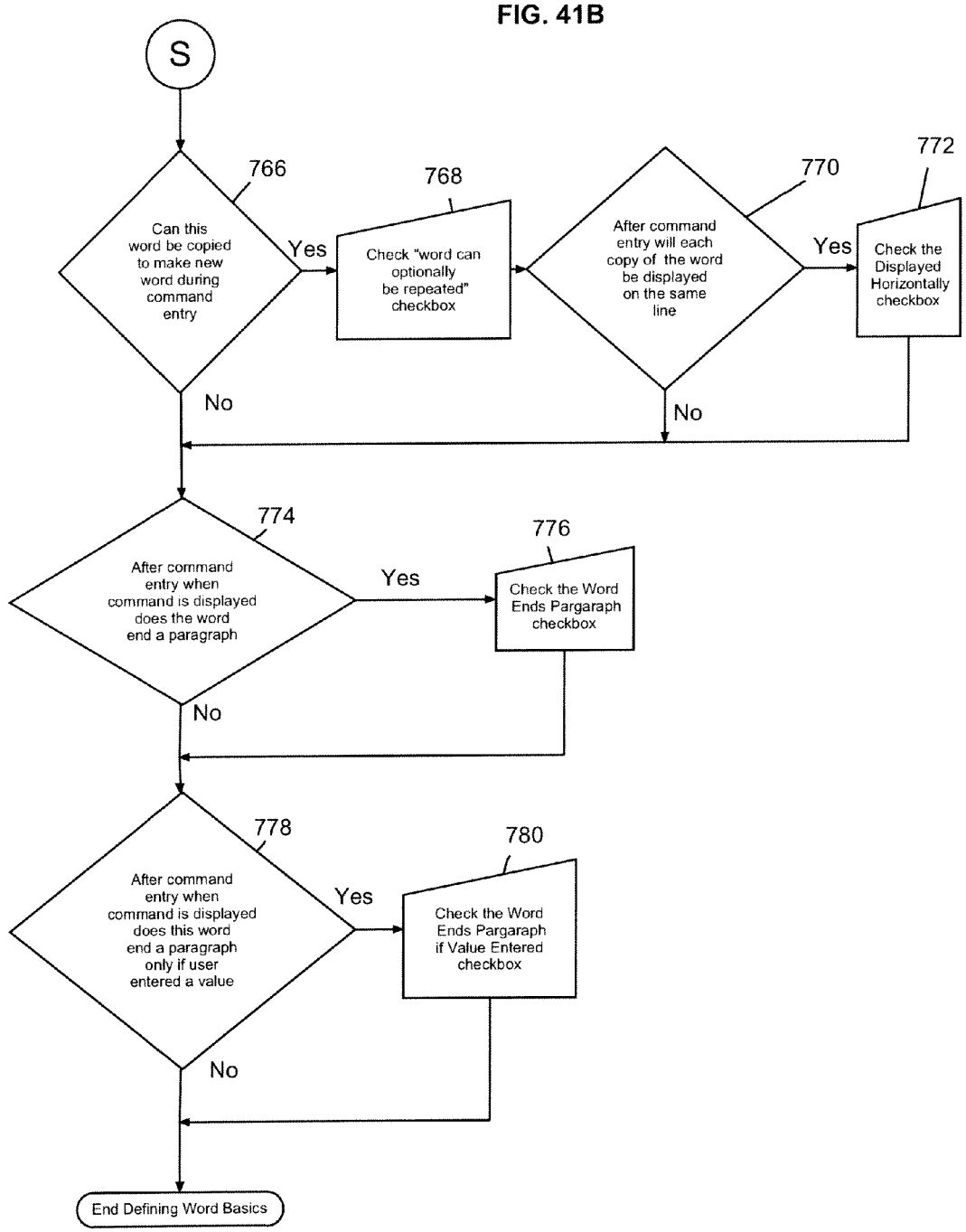

FIG. 41 is a flow diagram depicting an example of a method for defining or redefining the word basics 702, shown schematically in FIG. 40. Reference may also be made to FIG. 37 as an example of a display representing the display of a command basics definition process 642 for word basics.

One of the word basics is the word name as entered at block 740. Generally, the word name is descriptive of the word's purpose in the command. If the word begins an optional word during command form entry or begins an optional phrase during command for entry, an opening bracket ("[") is entered at block 744, in a "begin optional word" textbox. Although a phrase is a group of words, a phrase may be nested within another phrase. As such a word may begin multiple phrases, as determined at block 746, and an opening bracket ("[") is entered at block 748 in the "begin optional word" textbox for each optional phrase that the word initiates.

If a word ends an optional word or phrase, as determined at block 750, a closing bracket ("]") is entered at block 752 into the "end optional textbox". Because a word may also end one or more optional phrases as determined at block 754, a closing bracket ("]") is entered at block 756 in the "end optional word textbox" for each optional phrase that the word terminates.

Punctuation may be included before a word when it is displayed with the command format and command sentence. If punctuation occurs before the word, as determined at block 758, punctuation (e.g., commas, colons, semicolons) is entered into the punctuation textbox at block 760.

Because some words are available only to advanced users in the command form, as determined at block 762, the "advanced" checkbox is checked at block 764. Some words can be repeated (e.g., copied) as many times as needed on the command form, as determined at block 766. If the word is a repeater, the "word can optionally be repeated" checkbox is checked at block 768. The repeater word may be displayed in the command sentence as a separate line, similar to a condition word, or the repeater word may be displayed immediately after the previous word in the sentence on the same line.

As such, if a word is a repeater, the word basics definition process 702 may determine whether each copy of the word will be displayed on the same line at block 770, in which case the "displayed horizontally" checkbox is checked at block 772.

If the word being defined ends a paragraph when displayed in the command sentence as determined at block 774, the "ends a paragraph" checkbox is checked at block 776. When an optional word ends a paragraph, further clarification is required. If the word ends a paragraph only if a value is entered, as determined at block 778, the "only ends paragraph" checkbox is checked at block 780. If a value is not entered for such a word on the command form, then the command sentence will not include a paragraph marker.

FIG. 42 is a flow diagram depicting an example of a method for defining or redefining a variable word 708, shown schematically in FIG. 40. Beginning at block 790, the variable field type (e.g., alphanumeric string, integer, positive integer, double, date, file/path, Boolean, money, etc.) is selected in order to define the type of entry to be entered in the command form. In one example, the command form may include a textbox associated with variable field type, and entries may be keyed into the textbox. If the selected variable field type is neither Boolean nor date, as determined at block 792, the maximum number of characters to be accepted into the textbox is determined at block 794. The minimum size of the textbox is determined at block 796, and may be defined as a number of characters.

If the selected variable type is a numeric double, as determined at block 798, the maximum number of digits of precision to be allowed in the command form is entered at block 800. At block 802, a default entry is determined for the textbox, if no other entry is specified. If the command form includes an array of variables, as determined at block 804, the maximum count of array variables is entered at block 806.

Figure 44:
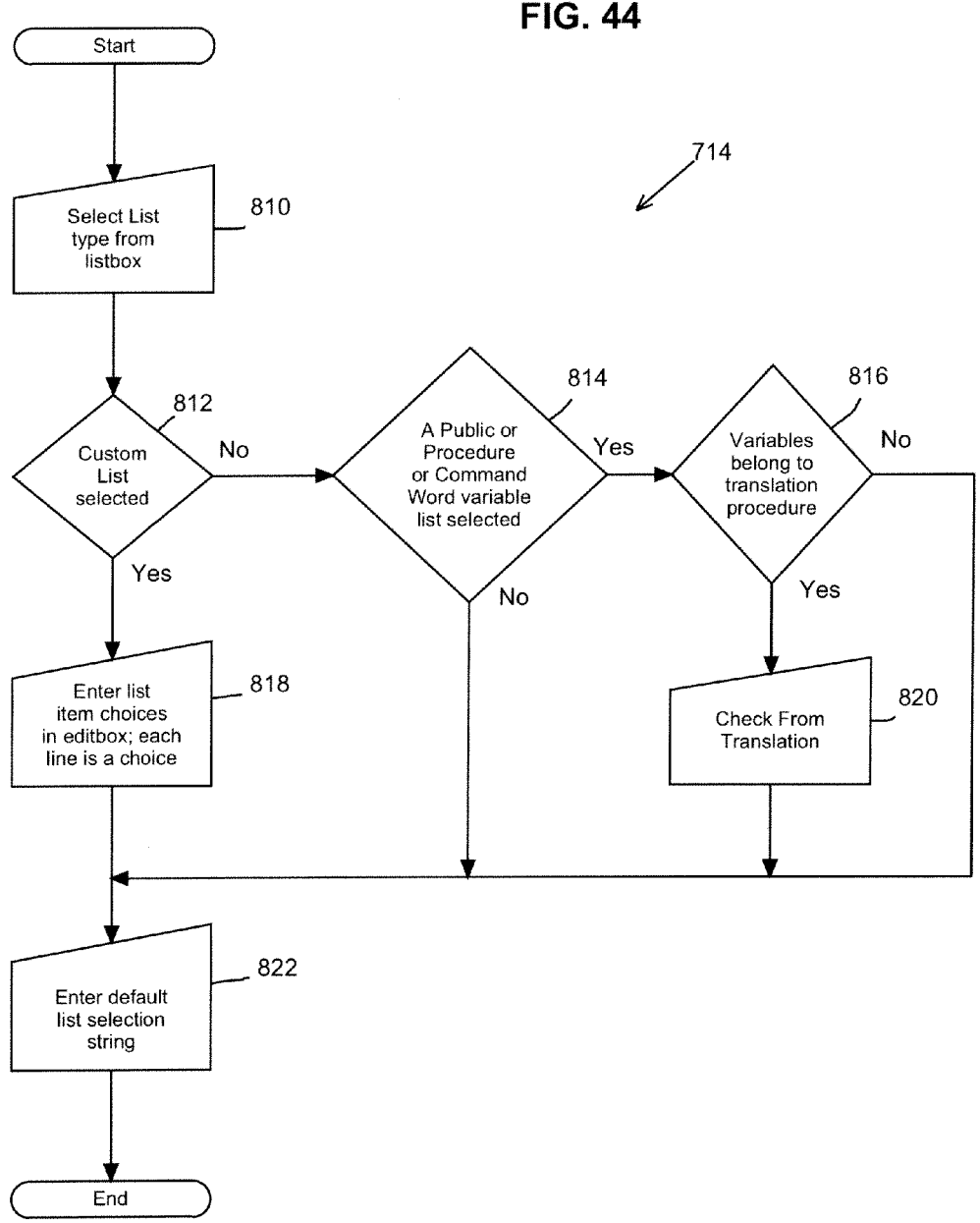
FIG. 44 is a flow diagram of a list word definition process as shown schematically in FIG. 40.

FIG. 44 is a flow diagram depicting an example of a method for defining or redefining a word representing a list of values 714, shown schematically in FIG. 40. During performance of the list word definition process 714, the GUI may generate a display as shown in FIG. 43, in order to provide entries and selections for the definition of a list word. The display shown in FIG. 43 may be generated as a result of selecting a list word from the "Word Type" pulldown menu shown in FIG. 38.

In order to begin the definition of a list, the word type "List" is selected in the "Word Type" listbox presented during the definition process 662 of FIG. 40. Because there are numerous types of lists that may be defined, the type of list is selected from the "List Type" pulldown menu at block 810.

If a custom list is selected from the "List Type" pulldown menu, as determined at block 812, each choice within the list is entered as a string of one or more words in the "List items" editbox at block 818. For a list that is not a custom list, the list items may be generated from another source. For example, a list of public variables is created when the command form is displayed by creating a pull down list with the names of all public variables as declared in the public variable table. Other lists may be created as previously described with reference to the display of the command form. If a custom list is not selected, another list type is selected at block 814, such as a public or procedure or command variable list, in which case the list definition process 714 ascertains whether the variables belong to a translation procedure at block 816.

Translation procedures may access lists created from the translation procedure or the user procedure being translated. For example, a translation procedure may access all procedure variables in the procedure being translated or the procedure variables which belong to the translation procedure itself. In order to clarify the source, the "From Translation Procedure" checkbox is checked on the display of FIG. 43 at block 820. An example of a translation procedure is described in further detail below.

A default selection string may be entered at block 822 so that a new, un-entered list on the command form will have a default selection. The default string matches a list choice of the list, such that a list choice is the default selection.

FIG. 45 is a flow diagram depicting an example of a method for defining or redefining a variable list word 724, shown schematically in FIG. 40. During performance of the variable list word definition process 724, the GUI may generate a display as shown in FIG. 46, in order to provide entries and selections for the definition of a variable list word. The display of a variable list format area, as shown in FIG. 46, may be generated as a result of selecting a variable list word from the "Word Type" pulldown menu shown in FIG. 38. In order to define a variable list word, all list choices are defined because each variable list choice is a sentence fragment in which each word is defined, similar to the definition of a command.

Beginning at block 830, a variable list definition display is generated, an example of which is shown in FIG. 46. The variable list definition display may be generated as a result of selecting "Variable List" from the "Word Type" pulldown menu.

If the variable list is a new variable list as determined at block 832, the new variable list word is assigned a default constant word at block 834 called "New-word". Whenever a change is made to the variable list definition, all the choices are redisplayed in the variable list format area.

To make any modifications, all defined variable list words are displayed in the variable list format area at block 836 and a word is selected at block 838. When a word is selected, its word definition is displayed at block 840 such that the word may be further defined. The word definition display includes a word basics panel, a word type list and a word type panel, all of which are similar to the command definition word display of FIG. 38. Based on a selection at block 842, a word may be deleted, modified or added. The selection at block 842 may be performed by selecting an action button (e.g., insert, delete, etc.) provided on the display of FIG. 46.

If a selected word is to be deleted, as determined at block 846, then the selected word is removed from the variable list at block 848. If a selected word is to be modified, as determined at block 850, the selected word is redefined at block 852, which utilizes the same process 662 used to define a command word, except that words within a variable list may not be a command word and do not end a paragraph. Further, a variable list choice may be designated as visible only within a translation procedure.

If a word is to be added as determined at block 844, several methods may be applied. For example, the word may be added to a new line as determined at block 854. The word and the new line may be added above or below a selected line as determined at block 856. If not added above the selected line, a default constant word is added in the new line above a selected word at block 858. In another example, a word may be added, below a selected line, as determined at block 856, in which case a default constant word is added in the new line below a selected word at block 860.

If a new line is not added, as determined at block 854, then a new word may be added before a selected word, as determined at block 862, thereby adding a default constant word before the selected word at block 864. Alternatively, if a new word is not added before the selected word, a default constant word may be added after a selected word at block 866.

Figure 47:
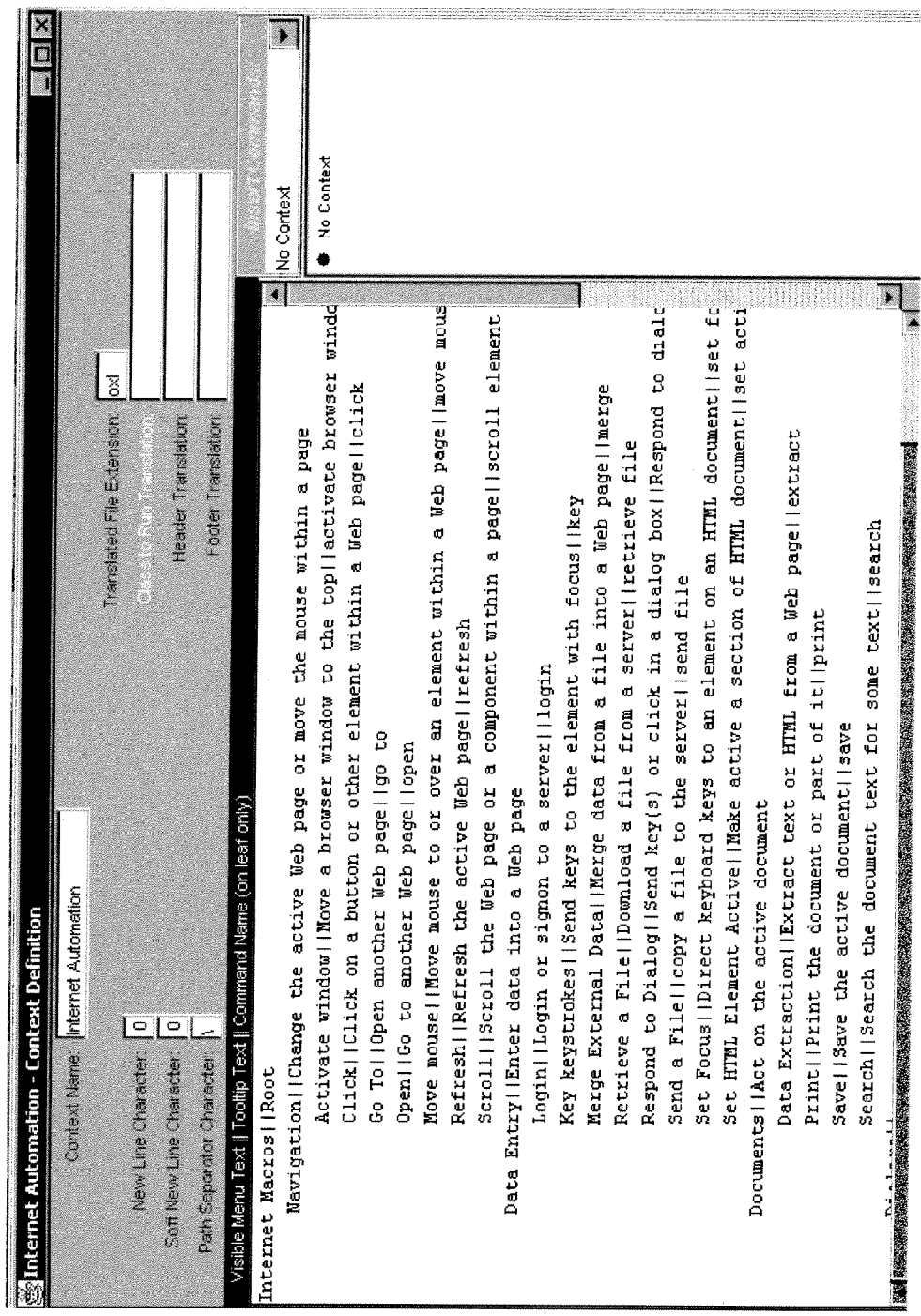
FIG. 47 is an exemplary depiction of a display that may be displayed by a graphical user interface during the context definition process of FIG. 48.
Figure 48:
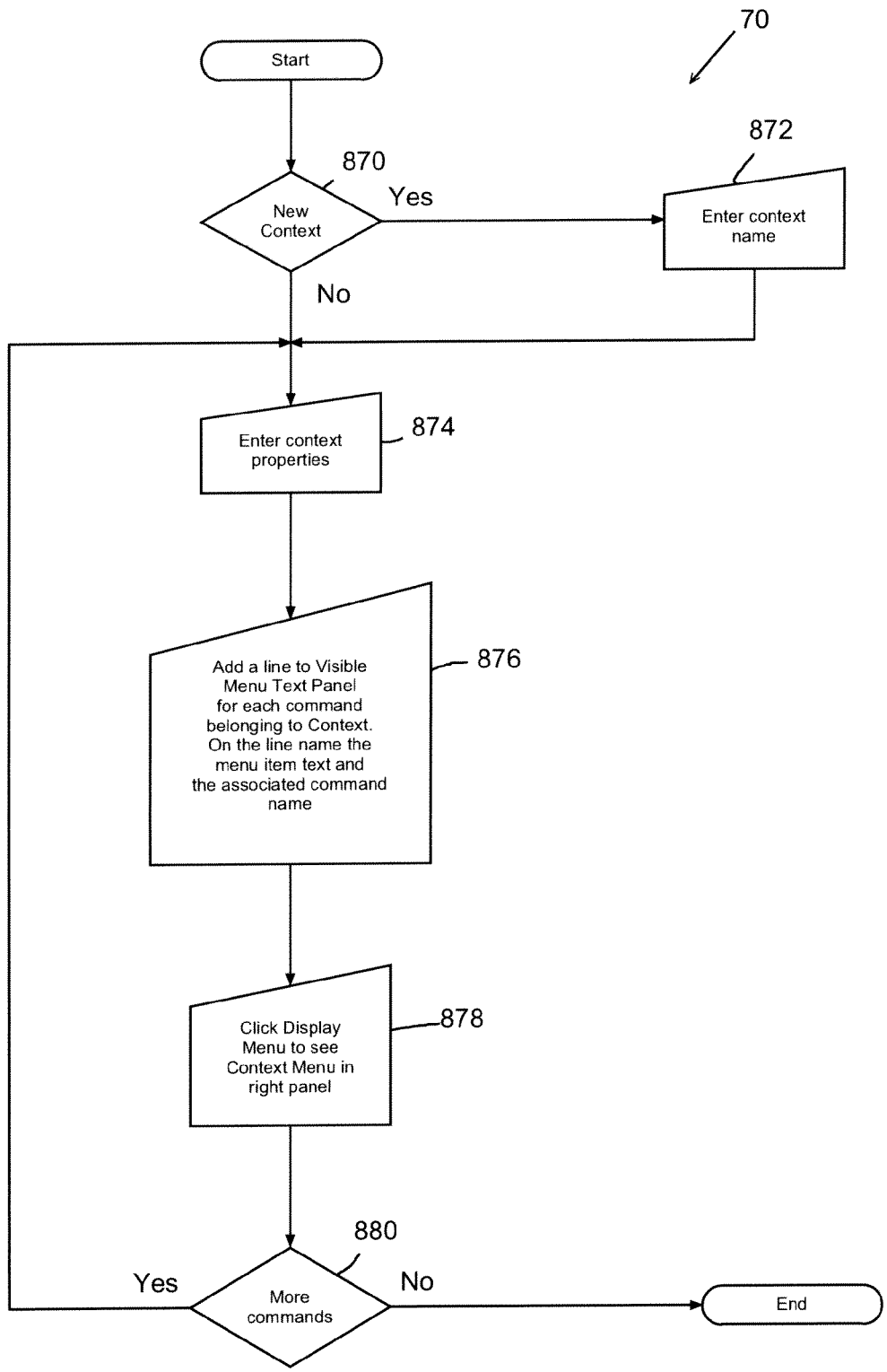
FIG. 48 is a flow diagram of a context definition process as shown schematically in FIG. 1.

FIG. 48 is a flow diagram depicting an example of a method for defining a context 70, shown schematically in FIG. 1. FIG. 47 is an exemplary depiction of a display that may be generated by the GUI during performance of context definition process 70. The GUI may generate the display as shown in FIG. 47, in order to provide entries and selections for the definition of a context. As referred to above, a context refers to a code generator for a specific target language, such as C, C+, Javascript®, for example. The context definition process defines the commands so they can be used to code high level commands within the procedure editing process 30. The translation procedures associated with the commands are coded to convert the defined high level commands to the target source code for the context.

Beginning at block 870, a context may be either defined or redefined. If a new context is being created, a context name for the new context is entered at block 872. After a context name has been provided or to redefine an existing context, the context properties are entered or revised at block 874 in the context properties panel of FIG. 47. A context has its own properties, some of which are common to all contexts. For example, each context has a computer code or set of codes which represent the end of a paragraph, called the new-line character.

A context has a set of commands which are listed in the context menu of the procedure editing process 30 as shown in FIG. 3. To complete the context definition, the command menu is defined in the menu panel by entering a line for each node on the menu tree at block 876. The context menu may be presented by the GUI by clicking the display menu at block 878. Additional commands may be added, as determined at block 880, by completing the process again.

Some lines define the text visible on a branch in the tree. For example, the word "Navigation" in FIG. 2 is a branch 1006. Other lines define a leaf node which represents a command (ex "login" in FIG. 2). To define a leaf node, the text visible on the menu and the command name are entered.

Figure 49:
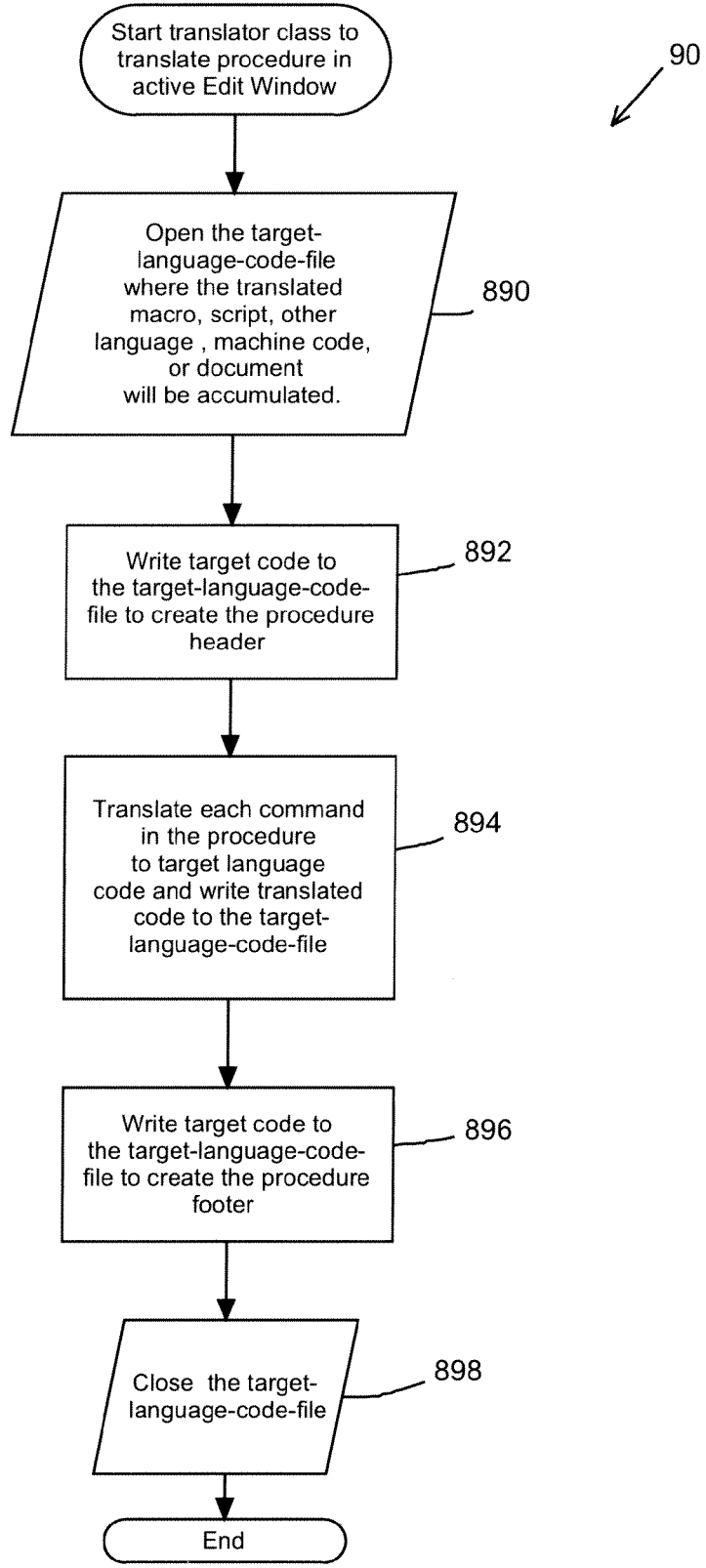
FIG. 49 is a flow diagram of a procedure translation process as shown schematically in FIG. 1.
Figure 50:
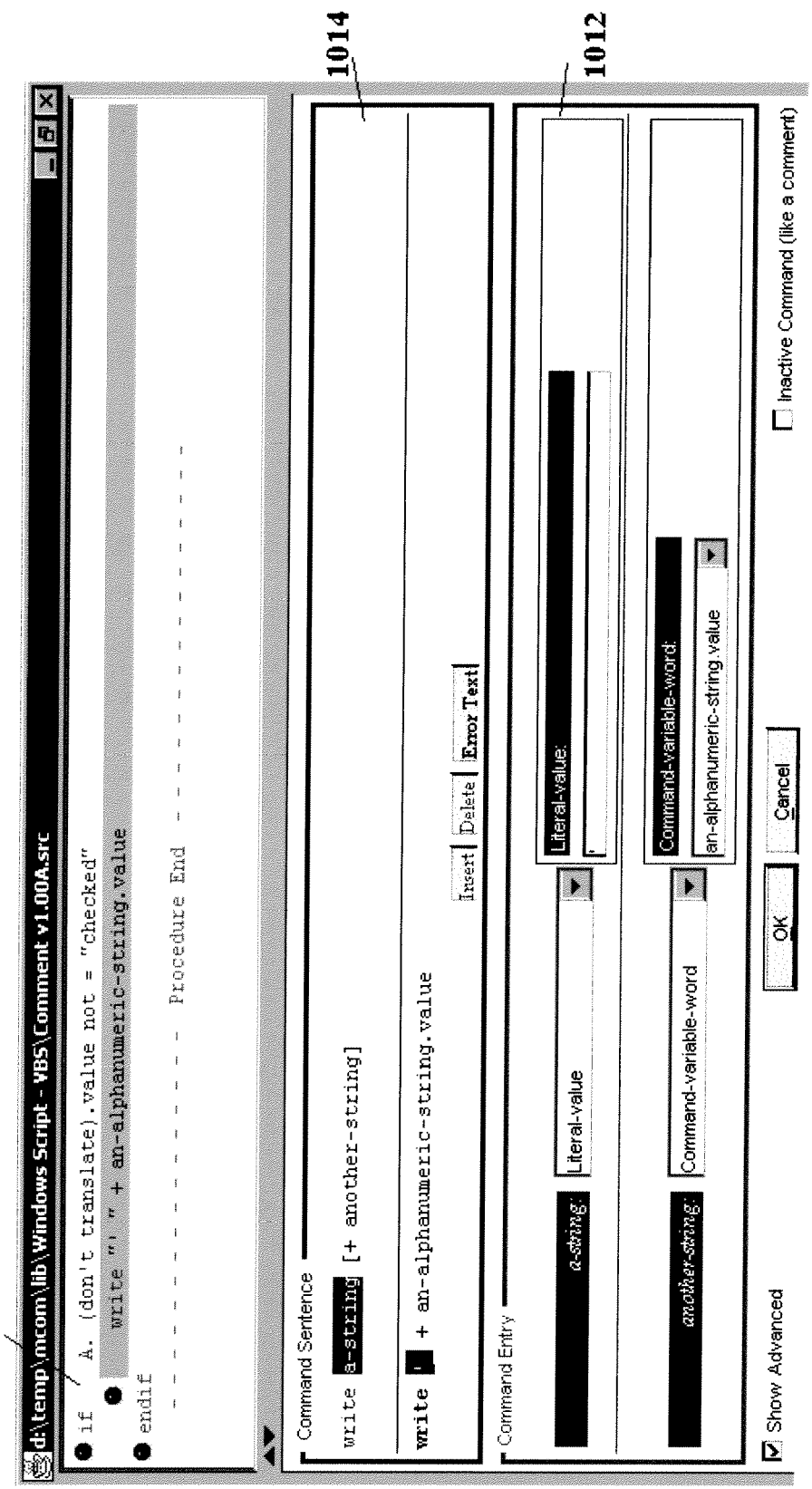
FIG. 50 is an exemplary depiction of a display that may be displayed by a graphical user interface during the coding of a translation procedure executed during the procedure translation process of FIG. 49.

FIG. 49 is a flow diagram depicting an example of a method for translating the commands of a procedure into the target programming language 90, shown schematically in FIG. 1. FIG. 50 is an exemplary depiction of a display that may be generated by the GUI during coding of the translation procedure 90. The display may include a scrollable display frame 1016, a command sentence frame 1014 and a command entry frame 1012. In particular, FIG. 50 depicts the use of repeater words to concatenate strings from a variety of sources. Using the "another-string" repeater word, different strings can be entered, including, but not limited to, literal strings, a string value of a procedure variable and a string value of a repeater command variable.

The command translation procedure 90 interprets the user command form entries for one command producing the desired target language code which is logically equivalent to the command coded by the user. The translation procedure is written using the same methods as any for other procedure, as described above. A translation procedure has access to the command being translated and is written with interpreter commands which are executed by the interpreter to generate the target language code. All of the entries on the command form can be accessed via a command word list, which is a type of list word in which each enterable word name and its properties are listed. Each entry is evaluated by the translation procedure so the appropriate target language code can be generated by the code in the translation procedure and written to the translated code file.

The objective of translation is to make a file comprised of the target language, which could be a macro language such as a word processing macro language, a script language like Javascript®, source code such as C, a 3$^{rd}$, 4$^{th}$ or 5$^{th}$ generation language such as C++, a markup language like HTML or XML, byte code like Java® byte code, a multilevel language like Process and Experiment Automation Real-time Language (PEARL), a computer source code, an object code, native machine language, an interpreted code, a computer document or any other computer based language. The translated procedure(s) may comprise a simple macro, a script, a document, a class, an application program or any other form of program or part of a program. Because a procedure may call another procedure, the collective translated procedures may represent an application or other form of program. The target language code is written to a file by translation procedures. Each command has as part of its definition a translation procedure.

Many languages have a declaration of the procedure and local variables utilized within the procedure at the start of the procedure code. For example, a C++method has a prototype declaration followed by local variable declarations. Furthermore, many languages support global variables or class variables, the code for which must be generated during translation. Each context has a translation procedure that writes the global or class variables, procedure declaration and local variable declaration (called procedure header) to the target-language-code file.

Referring to FIG. 49, the translation process 90 includes starting the translator class to translate the procedure in the active edit window. At block 890, the translation process 90 opens the target-language-code-file where the translated macro, script, other language, machine code or document will be accumulated. Once the target-language-code-file is opened, the target code is written to the target-language-code-file to create the procedure header at block 892. Each command in the active edit window procedure is translated to the target language code and the translated code is written to the target-language-code file at block 894. The target code is written to the target-language-code-file to create the procedure footer at block 896, and the target-language-code-file is closed at block 898.

Figure 51:
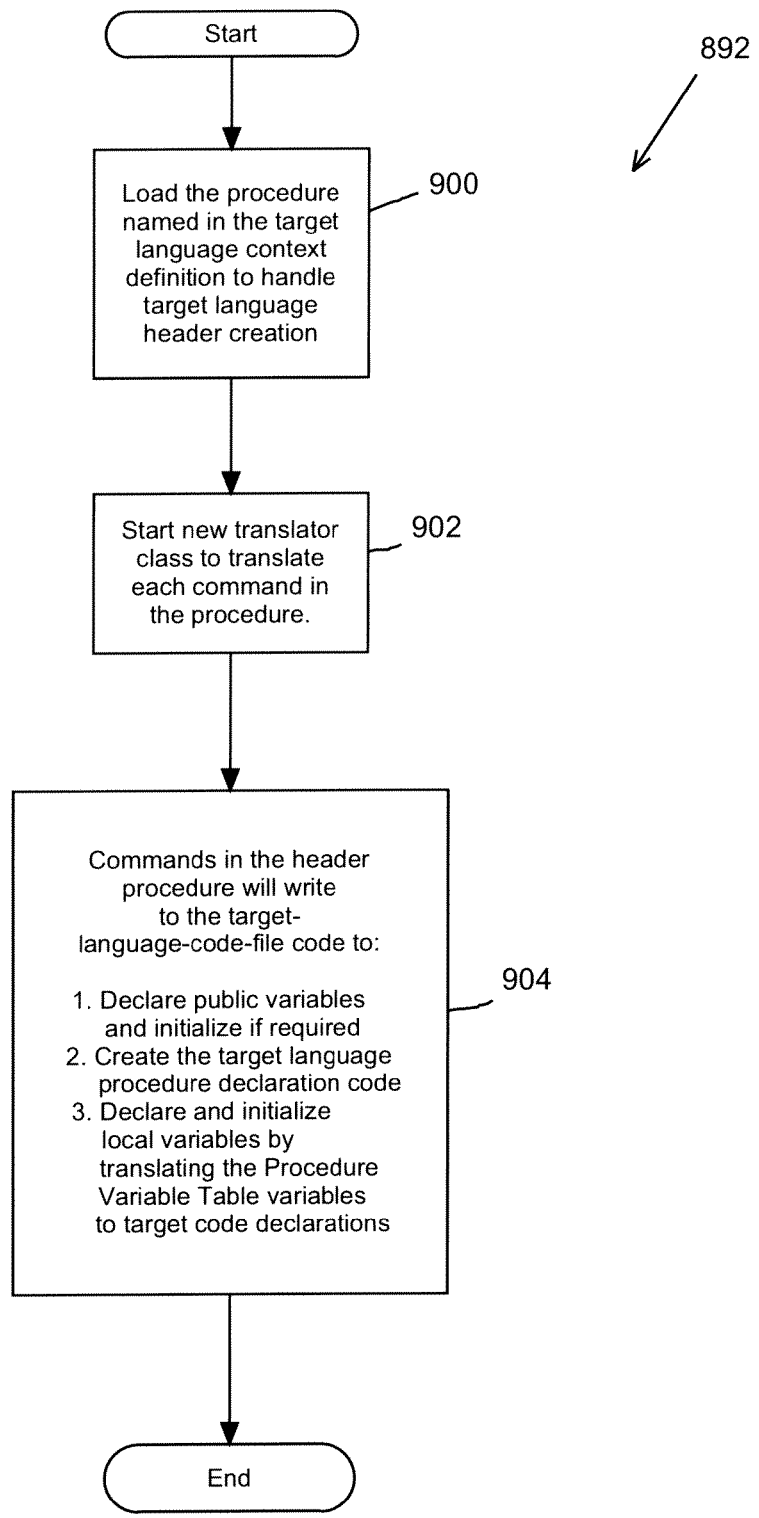
FIG. 51 is a flow diagram of a procedure header translation process as shown schematically in FIG. 49.

FIG. 51 is a flow diagram depicting an example of a method for creating a procedure header 892 when translating a procedure, shown schematically in FIG. 49. The header translation process 892 may be written using the same methods as a translation procedure. Beginning at block 900, the header translation procedure is loaded from a file, library member, dictionary or other computer storage. Because the translator is a class, a new translator class is created and started at block 902 to translate each command in the header translation procedure. Whatever commands are in the header translation procedure will be executed. Normally, the header procedure will request a list of all public variables that are defined in the public variable table of the procedure being translated. For each public variable definition, code is written to the target-language-code-file representing the variable type, characteristics and default value in the format required by the target language. For example, a global variable defined in the procedure editing process 30 as type money and named "payrollTotal" would be represented in Visual Basic as "public payrollTotal as double".

At block 904, the target language procedure or method prototype is written to the target-language-code-file. For example, a user written procedure named "calculatePayroll" in the procedure editing process 30 with one parameter called "employeeNumber" could be translated to a Java® method by writing to the file: "public double calculatePayroll(Integer employeeNumber) {". The variables defined in the editor procedure variable table are translated and represented as local variable declarations in the target-language-code-file.

Figure 52A:
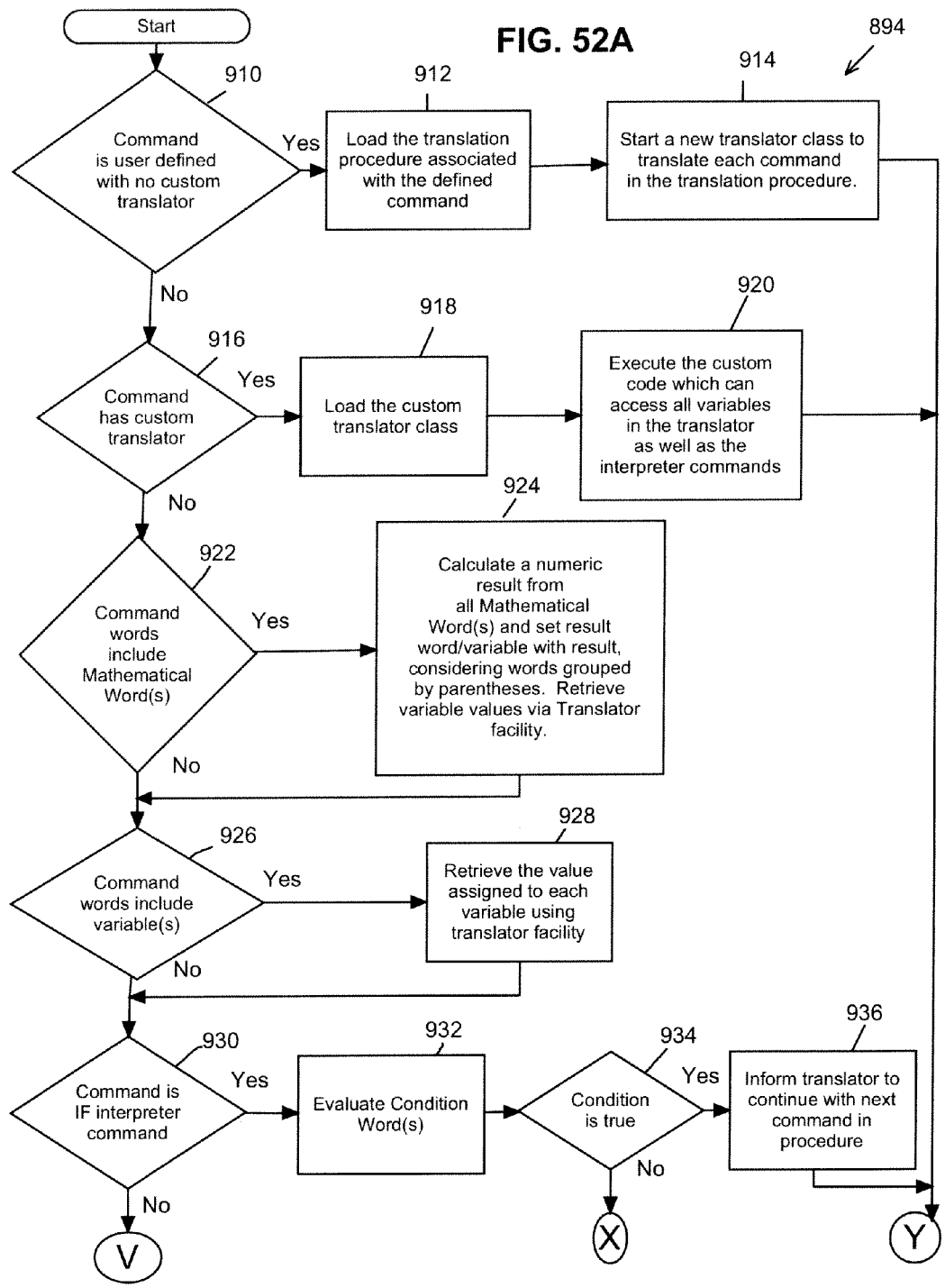
FIG. 52 is a flow diagram of a command translation process as shown schematically in FIG. 49.

FIG. 52 is a flow diagram depicting an example of a method for translating a command 894, shown schematically in FIG. 49. After translating the header, each command written by the user is translated to the target language code and written to the target-language-code-file. The process of translating a command may vary by the type of command. For the purpose of translation, there are three command types: a user defined command, a command defined with a custom class and interpreter commands. A user defined command is defined with the command definition process 50 of FIG. 37. A custom class can perform the translation. All other commands in a translation procedure are interpreter commands which are executed by the interpreter.

If a defined command does not have a defined custom translator as determined at block 910, the translation procedure associated with the defined command is loaded at block 912, and a new translator class is started at block 914 to translate each command in the translation procedure. A defined command without a custom translator class has a translation procedure associated with it during the command definition. To translate such a command, the associated translation procedure is executed at block 914. In other words, each command within the associated translation procedure is executed in the same translation process as being described herein.

If a custom translation is defined for the command as determined at block 916, the custom translator class is provided access to all command words and procedure variables as well as the target-language-code-file to which the custom class can write target code. The custom class is loaded at block 918 and executed at block 920.

A built-in command is processed by the interpreter. The interpreter operates much like existing interpreters except its objective is to execute commands written within the invention so as to translate the written command to another language. During interpretation, if there are any mathematical words within the translation procedure, as determined at block 922, the mathematical words are used to calculate a result at block 924. For example, if the command was "indent-count=indent-count+1", the indent refers to the block indentation (i.e., the count of tabs used to indent a block of code). The indent-count value is calculated by the interpreter. In this example, the system variable named "indent-count" is retrieved during the calculation and reset to a value of plus one.

Another variation is if the command words include variables, as determined at block 926. If the command words include variables, then the value assigned to each variable is retrieved at block 928 using the translator facility. If the command words do not include variables, the command translator process 894 determines whether the command is an "if" interpreter command at block 930.

If there is an "if" command, the interpreter evaluates the condition word(s) at block 932 and determines whether the conditional statement is true or false at block 934. If the conditional statement is true, the translator continues execution of the translation procedure at the next command in the procedure at block 936. If the conditional statement is false, the translator will continue with the first command after the "else" command associated with the "if" command just evaluated. If there is no associated "else" command the translator skips to first command following the "endif" command at block 938.

If the command to be interpreted is a "repeat block" command at block 940, its condition word(s) are evaluated at block 942 by the interpreter and the command translator process 894 determines if the conditional statement is true or false at block 944. When the condition word(s) are evaluate as true, the interpreter informs the translator to continue execution in the translation procedure at the next command following the "repeat block" command at block 946. If the evaluation is false, the translator will continue execution on the first command after the associated "end repeat" block command at block 948.

If the command is a "write" command as determined at block 950, meaning write to the target-language-code-file, the interpreter retrieves the string values of all variables in the command at block 952 and evaluates all the words in the command that evaluate to a string which is written to the target-language-code-file at block 954. For example, the write command shown in FIG. 50 writes a concatenated string of Visual Basic® code.

If the command is a "set-variable" value interpreter command as determined at block 956, the variable to be set from the translator facilitator is retrieved at block 958, and the variable is set to a new value via the translator facility at block 960, which may be performed similar to the indent explained above. When all commands are processed, the footer of the procedure is written to the target-language-code-file.

Figure 53:
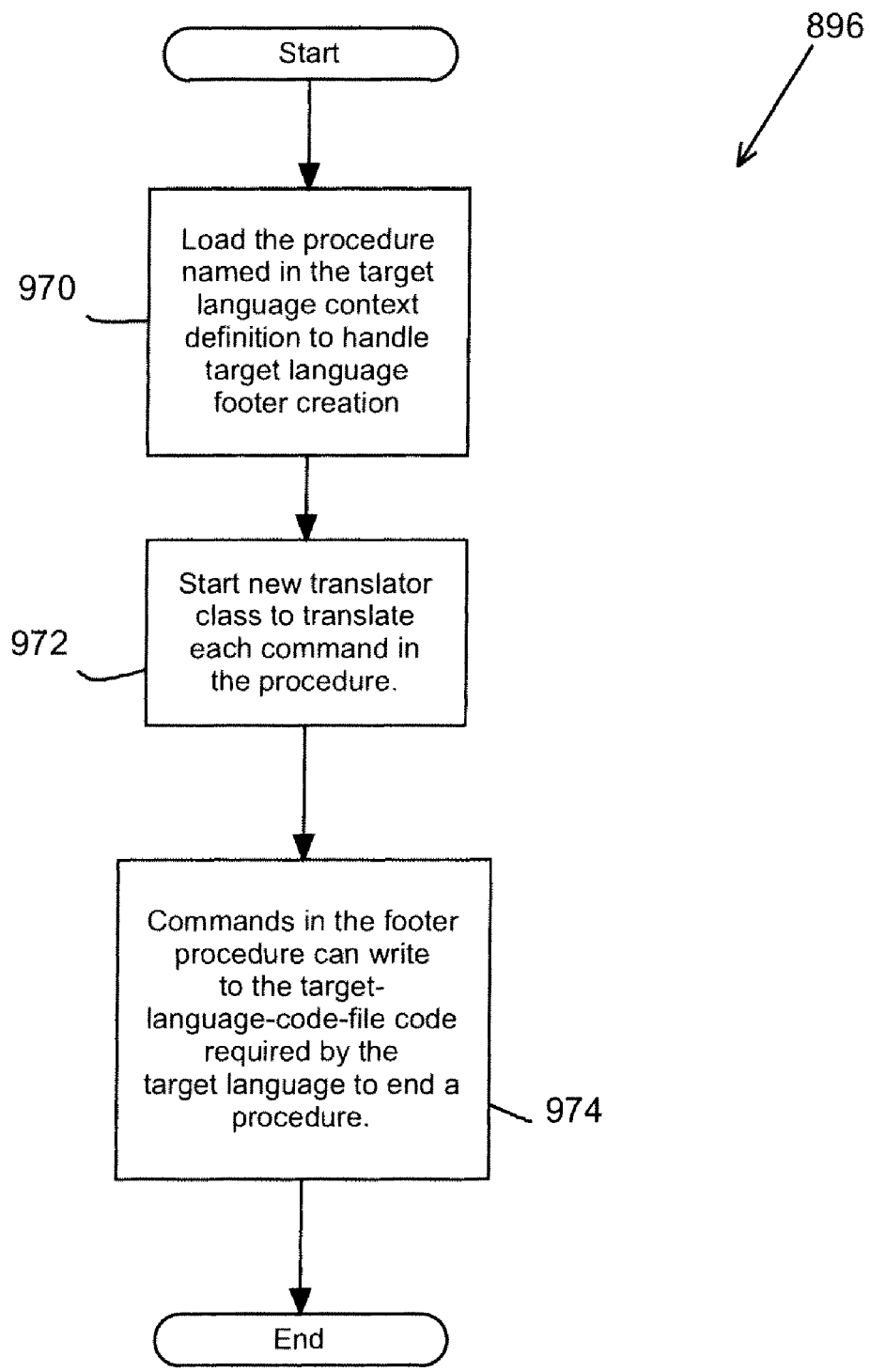
FIG. 53 is a flow diagram of a procedure footer translation process as shown schematically in FIG. 49.

FIG. 53 is a flow diagram depicting an example of a method for creating a procedure footer 896, shown schematically in FIG. 49. The procedure to handle footer code is defined during the context definition of FIG. 48. The procedure is a user written translation procedure using the procedure editing process 30 which applies to the procedures having been described herein. That translation procedure is loaded at block 970 and a translator class is started at block 972 to execute the translation procedure. Whatever commands are written in that procedure are executed to translate each command in the procedure at block 974, thereby writing target code to the target-language-code-file to end a procedure An example of closing the target language procedure or method can be found in Visual C++® or Java® wherein a catch statement may be written to the target-language-code-file if a try statement was generated in the procedure header code. Then, the procedure or method is closed with a "}" for Visual C++® or Java®. After the target-language-code-file is closed, if the user requests the target-language-code-file to be executed, it will be executed. How the file is executed is defined in the context. For example, a translated Visual Basic Script macro is executed by requesting the Windows® shell execute it.

While the procedure editing process 30, the command definition process 50, the context definition process 70, the command translation process 90 and other process elements have been described as preferably being implemented in software, they may be implemented in hardware, firmware, etc., and may be implemented by any other processor, including, but not limited to, processors utilized in personal computers, laptop computers, desktop computers, mainframes, cellular phones and any other electronic device which utilizes computer code or documents. Thus, the elements described herein may be implemented in a standard multi-purpose CPU or on specifically designed hardware or firmware such as an application-specific integrated circuit (ASIC). When implemented in software, the software routine may be stored in any computer readable memory such as on a magnetic disk, a laser disk, or other storage medium, in a RAM or ROM of a computer or processor, in any database, etc. Likewise, this software may be delivered to a user via any known or desired delivery method including, for example, on a computer readable disk or other transportable computer storage mechanism or over a communication channel such as a telephone line, the internet, wireless communication, etc. (which are viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A tangible computer-readable medium having computer-executable instructions for implementing a method of computer programming for a target programming language, wherein the computer programming includes at least one programming command, the computer executable instructions comprising instructions for:
   providing a predefined command sentence, the predefined command sentence comprising at least a portion of a programming command and a structure other than a syntax of the target programming language;
   defining the programming command as the predefined command sentence, wherein the programming command comprises at least one word;
   providing an entry component corresponding to at least one word in the predefined command sentence;
   receiving data relating to an input value for the entry component; and
   converting the predefined command sentence and the input value for the entry component into a completed command sentence, wherein the programming command comprises the completed command sentence,
   wherein the computer executable instructions for defining the programming command comprise instructions for:
   inserting a word into the programming command;
   deleting a word from the programming command;
   modifying a definition of a word of the programming command; and
   writing a translation procedure for the programming command.

2. The tangible computer-readable medium having computer-executable instructions of claim 1 wherein the predefined command sentence comprises an enterable word and a constant word, wherein the entry component corresponds to the enterable word.

3. The tangible computer-readable medium having computer-executable instructions of claim 2 wherein the enterable word comprises one of the following: an optional word wherein the input value is optional or a required word wherein the input value is required.

4. The tangible computer-readable medium having computer-executable instructions of claim 3 wherein the predefined command sentence comprises a first optional word and a second optional word, the computer executable instructions further comprising instructions for:
   receiving data relating to an input value for the first optional word; and
   causing the second optional word to become a required word based on the input value for the first optional word.

5. The tangible computer-readable medium having computer-executable instructions of claim 2 wherein the enterable word comprises a repeatable word, the computer executable instructions further comprising instructions for inserting the repeatable word one or more times within the command sentence.

6. The tangible computer-readable medium having computer-executable instructions of claim 5 wherein the predefined command sentence comprises at least one of the group consisting of: a mathematical equation, a string concatenation and a conditional statement.

7. The tangible computer-readable medium having computer-executable instructions of claim 5 wherein the repeatable word comprises at least one of the group consisting of: a Boolean, a list word, a variable list word, a condition word, a mathematical word and a variable word.

8. The tangible computer-readable medium having computer-executable instructions of claim 2 wherein the enterable word comprises a Boolean word and wherein the input value comprises a true/false value.

9. The tangible computer-readable medium having computer-executable instructions of claim 2 wherein the enterable word comprises a list word comprising two or more options, and wherein the input value comprises an option selected from the list word.

10. The tangible computer-readable medium having computer-executable instructions of claim 9 wherein the option selected from the list word represents at least one of the group consisting of: a procedure variable, a public variable and a repeat block loop variable.

11. The tangible computer-readable medium having computer-executable instructions of claim 2 wherein the enterable word comprises a variable list word comprising two or more options with at least one option comprising an enterable word, and wherein the input value comprises an option selected from the variable list word, the computer executable instructions further comprising instructions for:
    providing an entry component corresponding to the enterable word of the selected option; and
    receiving data relating to an input value for the entry component corresponding to the enterable word of the selected option.

12. The tangible computer-readable medium having computer-executable instructions of claim 2 wherein the enterable word comprises a condition word comprising a first condition value logically related to a second condition value.

13. The tangible computer-readable medium having computer-executable instructions of claim 12 wherein the programming command comprises a compound condition comprising a first condition word related to a second condition word.

14. The tangible computer-readable medium having computer-executable instructions of claim 13 wherein the programming command comprises a conditional statement comprising a first compound condition related to a second compound condition.

15. The tangible computer-readable medium having computer-executable instructions of claim 14 further comprising instructions for:
    organizing the condition words of the first compound condition according to a first outline;
    organizing the condition words of the second compound condition according to a second outline; and
    relating the first outline to the second outline.

16. The tangible computer-readable medium having computer-executable instructions of claim 2 wherein the enterable word comprises a mathematical word, and wherein the input value comprises a numeric value.

17. The tangible computer-readable medium having computer-executable instructions of claim 16 wherein the programming command comprises a mathematical equation comprising a first mathematical word mathematically related to a second mathematical word.

18. The tangible computer-readable medium having computer-executable instructions of claim 2 wherein the enterable word comprises a variable word, and wherein the input value comprises at least one of the group consisting of: a string, an integer, a floating point number, an alphanumeric, a date, a data file location, an object, a Boolean and an array.

19. The tangible computer-readable medium having computer-executable instructions of claim 1 wherein converting the predefined command sentence and the input value for the entry component into a completed programming command comprises converting the input value for the entry component into at least one of the following: a word of the programming command, a phrase of the programming command or a clause of the programming command.

20. The tangible computer-readable medium having computer-executable instructions of claim 1, further comprising instructions for:
    providing a menu comprising plurality of selectable programming commands;
    receiving data relating to a programming command selected from the plurality of programming commands; and
    providing the selected programming command as the predefined command sentence.

21. The tangible computer-readable medium having computer-executable instructions of claim 1, further comprising instructions for:
    analyzing the completed programming command for errors; and
    providing notification of an occurrence of an error.

22. The tangible computer-readable medium having computer-executable instructions of claim 1 wherein defining the programming command further comprises defining each word within the programming command.

23. The tangible computer-readable medium having computer-executable instructions of claim 22 wherein defining a word comprises:
    selecting a word type; and
    defining the word as the selected word type.

24. The tangible computer-readable medium having computer-executable instructions of claim 1, further comprising instructions for translating the completed programming command to the target programming language.

25. The tangible computer-readable medium having computer-executable instructions of claim 24 wherein translating the completed programming command to the target programming language comprises converting the completed programming command into one or more instructions in the target programming language.

26. The tangible computer-readable medium having computer-executable instructions of claim 24 wherein translating the completed programming command to the target programming language comprises utilizing a code generator assigned to the programming command.

27. The tangible computer-readable medium having computer-executable instructions of claim 24 wherein translating the completed programming command to the target programming language comprises translating the completed programming command to at least one of the group consisting of: a hypertext markup language, an extensible markup language, C or other 3rd generation programming language, C++ or other 4th/5th generation programming language, Pearl, Javascript® or other script language, and a word processing macro language or other macro language.

28. The tangible computer-readable medium having computer-executable instructions of claim 1 wherein the target programming language comprises at least one of the group consisting of: a macro, a script, a computer source code, an object code, a machine code, and interpreted code, a markup language and a computer document.

29. A tangible computer-readable medium having computer-executable instructions for implementing a method of creating computer code for a target programming language, the computer executable instructions comprising instructions for:
- defining a programming command as a predefined command sentence comprising at least one constant word and at least one enterable word, wherein the predefined command sentence comprises a structure other than a syntax of the target programming language and wherein the computer executable instructions for defining the programming command comprise instructions for:
  - inserting a word into the programming command;
  - deleting a word from the programming command;
  - modifying a definition of a word of the programming command; and
  - writing a translation procedure for the programming command;
- receiving data relating to an input value for the enterable word; and
- converting the predefined command sentence and the input value for the enterable word into a completed programming command.

30. The tangible computer-readable medium having computer-executable instructions of claim 29 wherein the predefined command sentence comprises at least a portion of the programming command.

31. The tangible computer-readable medium having computer-executable instructions of claim 29 wherein defining the programming command further comprises defining a command block comprising a plurality of programming commands.

32. The tangible computer-readable medium having computer-executable instructions of claim 29 wherein defining the programming command further comprises defining each word within the programming command.

33. The tangible computer-readable medium having computer-executable instructions of claim 32 wherein defining a word comprises defining a word as a constant word or an enterable word.

34. The tangible computer-readable medium having computer-executable instructions of claim 32 wherein defining a word comprises:
- selecting a word type; and
- defining the word as the selected word type.

35. The tangible computer-readable medium having computer-executable instructions of claim 34 wherein the word type comprises a variable word and wherein defining the word as a variable word comprises defining the input value type for the variable word.

36. The tangible computer-readable medium having computer-executable instructions of claim 35 wherein the input value type comprises at least one of the following: a string, an integer, a floating point number, an alphanumeric, a date, a data file location, an object, a Boolean or an array.

37. The tangible computer-readable medium having computer-executable instructions of claim 34 wherein the word type comprises a list word comprising two or more options and wherein defining the word as a list word comprises defining each option within the list word.

38. The tangible computer-readable medium having computer-executable instructions of claim 34 wherein the word type comprises a variable list word comprising two or more options with at least one option comprising an enterable word, and wherein defining the word as a variable list word comprises defining the enterable word for the at least one option.

39. The tangible computer-readable medium having computer-executable instructions of claim 29 wherein the enterable word comprises one of the following: an optional word wherein the input value is optional or a required word wherein the input value is required.

40. The tangible computer-readable medium having computer-executable instructions of claim 29 wherein the enterable word comprises a repeatable word, the computer executable instructions further comprising instructions for inserting the repeatable word one or more times within the predefined command sentence.

41. The tangible computer-readable medium having computer-executable instructions of claim 29 wherein the enterable word comprises a Boolean word and wherein the input value comprises a true/false value.

42. The tangible computer-readable medium having computer-executable instructions of claim 29 wherein the enterable word comprises a list word comprising two or more options, and wherein the input value comprises an option selected from the list word.

43. The tangible computer-readable medium having computer-executable instructions of claim 29 wherein the enterable word comprises a variable list word comprising two or more options with at least one option comprising an enterable word, and wherein the input value comprises an option selected from the variable list word, the computer executable instructions further comprising instructions for:
- providing an entry component corresponding to the enterable word of the selected option; and
- receiving data relating to an input value for the entry component corresponding to the enterable word of the selected option.

44. The tangible computer-readable medium having computer-executable instructions of claim 29 wherein the enterable word comprises a condition word comprising a first condition value logically related to a second condition value.

45. The tangible computer-readable medium having computer-executable instructions of claim 29 wherein the enterable word comprises a mathematical word, and wherein the input value comprises a numeric value.

46. The tangible computer-readable medium having computer-executable instructions of claim 29 wherein the enterable word comprises a variable word, and wherein the input value comprises an alphanumeric value.

47. The tangible computer-readable medium having computer-executable instructions of claim 29 further comprising instructions for:
- analyzing the completed programming command for errors; and
- providing notification of an occurrence of an error.

48. The tangible computer-readable medium having computer-executable instructions of claim 29 further comprising instructions for translating the completed programming command to the target programming language.

49. The tangible computer-readable medium having computer-executable instructions of claim 48 wherein translating the completed programming command to the target programming language comprises converting the completed programming command into one or more instructions in the target programming language.

50. The tangible computer-readable medium having computer-executable instructions of claim 48 wherein translating the completed programming command to the target programming language comprises utilizing a code generator assigned to the programming command.

51. The tangible computer-readable medium having computer-executable instructions of claim 48 wherein translating the completed programming command to the target programming language comprises translating the completed programming command to at least one of the group consisting of: a hypertext markup language, an extensible markup language, C or other 3rd generation programming language, C++ or other 4th/5th generation programming language, Pearl, Javascript® or other script language, and a word processing macro language or other macro language.

52. The tangible computer-readable medium having computer-executable instructions of claim 29 wherein the target programming language comprises at least one of the group consisting of: a macro, a script, a computer source code, an object code, a machine code, and interpreted code, a markup language and a computer document.

53. A tangible computer-readable medium having computer-executable instructions for implementing a method of computer programming for a target computer language, the computer executable instructions comprising instructions for:
  defining a programming command to provide a command definition;
  generating a form from the command definition, wherein the form comprises a command format corresponding to at least a portion of the programming command and an entry component corresponding to at least one word in the programming command;
  displaying the form;
  receiving data relating to an input value for the entry component;
  merging the input value and the command format to create a programming command sentence; and
  translating the programming command sentence into the target computer language,
  wherein the programming command comprises at least one word and wherein the computer executable instructions for defining the programming command comprise instructions for:
  inserting a word into the programming command;
    deleting a word from the programming command;
    modifying a definition of a word of the programming command; and
    writing a translation procedure for the programming command.

54. The tangible computer-readable medium having computer-executable instructions of claim 53 wherein defining the programming command further comprises defining a command block comprising a plurality of programming commands.

55. The tangible computer-readable medium having computer-executable instructions of claim 53 wherein defining the programming command further comprises defining each word within the programming command.

56. The tangible computer-readable medium having computer-executable instructions of claim 55 wherein defining a word comprises defining a word as at least one of the group consisting of: a constant word, an enterable word, an optional word, a required word, a repeatable word, a variable word, a list word, a variable list word, a Boolean word, a condition word and a mathematical word.

57. The tangible computer-readable medium having computer-executable instructions of claim 53 wherein the entry component corresponds to a list word comprising two or more options, and wherein the input value comprises an option selected from the list word.

58. The tangible computer-readable medium having computer-executable instructions of claim 53 wherein the entry component corresponds to a variable list word comprising two or more options with at least one option comprising an enterable word, and wherein the input value comprises an option selected from the variable list word, the computer executable instructions further comprising instructions for:
  providing an entry component corresponding to the enterable word of the selected option; and
  receiving data relating to an input value for the entry component corresponding to the enterable word of the selected option.

59. The tangible computer-readable medium having computer-executable instructions of claim 53 wherein the entry component corresponds to a condition word comprising a first condition value logically related to a second condition value.

60. The tangible computer-readable medium having computer-executable instructions of claim 53 wherein the entry component corresponds to a mathematical word, and wherein the input value comprises a numeric value.

61. The tangible computer-readable medium having computer-executable instructions of claim 53 wherein the entry component corresponds to a variable word, and wherein the input value comprises an alphanumeric value.

62. The tangible computer-readable medium having computer-executable instructions of claim 53 further comprising instructions for:
  analyzing the programming command sentence for errors; and
  providing notification of an occurrence of an error.

63. The tangible computer-readable medium having computer-executable instructions of claim 53 wherein translating the programming command sentence into the target programming language comprises converting the programming command sentence into one or more instructions in the target programming language.

64. The tangible computer-readable medium having computer-executable instructions of claim 53 wherein translating the programming command sentence into the target programming language comprises utilizing a code generator assigned to the programming command.

65. The tangible computer-readable medium having computer-executable instructions of claim 53 wherein translating the programming command sentence into the target programming language comprises translating the programming command sentence into at least one of the group consisting of: a macro, a script, a computer source code, an object code, a machine code, and interpreted code, a markup language or a computer document.

* * * * *